United States Patent
Soykan et al.

(10) Patent No.: US 12,551,259 B2
(45) Date of Patent: Feb. 17, 2026

(54) SYSTEMS AND METHODS FOR TREATMENT OF OBSTRUCTIVE SLEEP APNEA

(71) Applicant: CRYOSA, INC., Arden Hills, MN (US)

(72) Inventors: Orhan Soykan, Lino Lakes, MN (US); Mark Christopherson, Shoreview, MN (US); Donald A. Gonzales, Folsom, LA (US); Stefan Skorich, St. Louis Park, MN (US); Guy Vanney, Blaine, MN (US); Douglas Krone, Shoreview, MN (US)

(73) Assignee: CRYOSA, INC., Arden Hills, MN (US)

( * ) Notice: Subject to any disclaimer, the term of this patent is extended or adjusted under 35 U.S.C. 154(b) by 536 days.

(21) Appl. No.: 17/793,154

(22) PCT Filed: Feb. 19, 2021

(86) PCT No.: PCT/US2021/018926
§ 371 (c)(1),
(2) Date: Jul. 15, 2022

(87) PCT Pub. No.: WO2021/168367
PCT Pub. Date: Aug. 26, 2021

(65) Prior Publication Data
US 2023/0069123 A1    Mar. 2, 2023

Related U.S. Application Data

(60) Provisional application No. 63/132,869, filed on Dec. 31, 2020, provisional application No. 62/978,653, filed on Feb. 19, 2020.

(51) Int. Cl.
*A61B 18/02*    (2006.01)
*A61B 17/24*    (2006.01)
(Continued)

(52) U.S. Cl.
CPC .......... *A61B 18/0206* (2013.01); *A61B 17/24* (2013.01); *A61F 7/12* (2013.01);
(Continued)

(58) Field of Classification Search
CPC ................ A61B 18/0206; A61B 17/24; A61B 2017/00106; A61B 2018/00577;
(Continued)

(56) References Cited

U.S. PATENT DOCUMENTS 3,712,306 A    1/1973    Bryne
5,245,023 A    9/1993    Peoples et al.
(Continued)

FOREIGN PATENT DOCUMENTS

AU    2011279923 B2    2/2016
AU    2018226785 A1    10/2019
(Continued)

OTHER PUBLICATIONS

Avram et al., Cryolipolysis for Subcutaneous Fat Layer Reduction, Lasers in Surgery and Medicine, 41: 703-708; Dec. 2009.
(Continued)

*Primary Examiner* — Tigist S Demie
(74) *Attorney, Agent, or Firm* — Perkins Coie LLP

(57) ABSTRACT

Methods, devices, and systems employ cryolysis of oropharyngeal adipose tissues to selectively remove fat cells from the tissues causing obstructive sleep apnea. In various embodiments, a chilled liquid—e.g., a liquid or air—is applied to the target tissue at a temperature and for a duration sufficient to cause cryolysis.

18 Claims, 37 Drawing Sheets

(51) Int. Cl.
*A61F 7/12* (2006.01)
*A61B 17/00* (2006.01)
*A61B 18/00* (2006.01)

(52) U.S. Cl.
CPC .............. *A61B 2017/00106* (2013.01); *A61B 2018/00577* (2013.01); *A61B 2018/00714* (2013.01); *A61B 2018/00875* (2013.01); *A61B 2018/0212* (2013.01); *A61B 2018/0262* (2013.01)

(58) Field of Classification Search
CPC .. A61B 2018/00875; A61B 2018/0212; A61B 2018/0262; A61F 7/12
See application file for complete search history.

(56) References Cited

U.S. PATENT DOCUMENTS

| | | |
|---|---|---|
| 5,250,430 A | 10/1993 | Peoples et al. |
| 5,534,432 A | 7/1996 | Peoples et al. |
| 5,663,063 A | 9/1997 | Peoples et al. |
| 5,743,904 A | 4/1998 | Edwards |
| 5,800,379 A | 9/1998 | Edwards |
| 6,017,337 A | 1/2000 | Pira |
| 6,032,675 A | 3/2000 | Rubinsky |
| 6,041,787 A | 3/2000 | Rubinsky |
| 6,045,549 A | 4/2000 | Smethers et al. |
| 6,126,657 A | 10/2000 | Edwards et al. |
| 6,245,537 B1 | 6/2001 | Williams et al. |
| 6,316,262 B1 | 11/2001 | Huisman et al. |
| 6,378,525 B1 | 4/2002 | Beyar et al. |
| 6,408,851 B1 | 6/2002 | Karell |
| 6,514,515 B1 | 2/2003 | Williams |
| 6,548,569 B1 | 4/2003 | Williams et al. |
| 6,555,123 B2 | 4/2003 | Williams et al. |
| 6,585,994 B2 | 7/2003 | Williams et al. |
| 6,592,892 B1 | 7/2003 | Williams |
| 6,593,116 B1 | 7/2003 | Huisman et al. |
| 6,607,517 B1 | 8/2003 | Dae et al. |
| 6,610,764 B1 | 8/2003 | Martin et al. |
| 6,623,749 B2 | 9/2003 | Williams et al. |
| 6,689,589 B2 | 2/2004 | Huisman et al. |
| 6,746,447 B2 | 6/2004 | Davison et al. |
| 6,746,685 B2 | 6/2004 | Williams et al. |
| 6,770,071 B2 | 8/2004 | Woloszko et al. |
| 6,828,357 B1 | 12/2004 | Martin et al. |
| 6,838,493 B2 | 1/2005 | Williams et al. |
| 6,867,247 B2 | 3/2005 | Williams et al. |
| 6,867,248 B1 | 3/2005 | Martin et al. |
| 6,878,758 B2 | 4/2005 | Martin et al. |
| D568,258 S | 5/2008 | Adam |
| 7,367,341 B2 | 5/2008 | Anderson et al. |
| 7,458,932 B2 | 12/2008 | Sun |
| 7,507,235 B2 | 3/2009 | Keogh et al. |
| 7,575,870 B1 | 8/2009 | Lalvani et al. |
| 7,713,266 B2 | 5/2010 | Elkins et al. |
| 7,842,029 B2 | 11/2010 | Anderson et al. |
| 7,850,683 B2 | 12/2010 | Elkins et al. |
| 7,854,754 B2 | 12/2010 | Ting et al. |
| 7,862,558 B2 | 1/2011 | Elkins et al. |
| 7,998,137 B2 | 8/2011 | Elkins et al. |
| 8,192,474 B2 | 6/2012 | Levinson |
| 8,275,442 B2 | 9/2012 | Allison |
| 8,285,390 B2 | 10/2012 | Levinson et al. |
| 8,287,579 B2 | 10/2012 | Nimitz |
| 8,298,216 B2 | 10/2012 | Burger et al. |
| 8,337,539 B2 | 12/2012 | Ting et al. |
| 8,409,185 B2 | 4/2013 | Burger et al. |
| 8,523,927 B2 | 9/2013 | Levinson et al. |
| 8,603,073 B2 | 12/2013 | Allison |
| 8,676,338 B2 | 3/2014 | Levinson |
| 8,702,774 B2 | 4/2014 | Baker et al. |
| 8,715,275 B2 | 5/2014 | Burger et al. |
| 8,768,468 B2 | 7/2014 | Garcia et al. |
| 8,834,547 B2 | 9/2014 | Anderson et al. |
| 8,840,608 B2 | 9/2014 | Anderson et al. |
| 9,033,966 B2 | 5/2015 | McKay |
| 9,039,688 B2 | 5/2015 | Palmer et al. |
| 9,072,498 B2 | 7/2015 | Elkins et al. |
| 9,078,634 B2 | 7/2015 | Gonzales et al. |
| 9,101,346 B2 | 8/2015 | Burger et al. |
| 9,113,855 B2 | 8/2015 | Burger et al. |
| 9,254,162 B2 | 2/2016 | Burger et al. |
| 9,295,512 B2 | 3/2016 | Allison et al. |
| 9,308,120 B2 | 4/2016 | Anderson et al. |
| 9,314,290 B2 | 4/2016 | Fourkas et al. |
| 9,345,526 B2 | 5/2016 | Elkins et al. |
| 9,402,676 B2 | 8/2016 | Babkin et al. |
| 9,408,745 B2 | 8/2016 | Levinson et al. |
| 9,439,805 B2 | 9/2016 | Gonzales et al. |
| 9,545,523 B2 | 1/2017 | Nanda |
| 9,610,112 B2 | 4/2017 | Karnik et al. |
| 9,844,461 B2 | 12/2017 | Levinson et al. |
| 9,861,421 B2 | 1/2018 | O'Neil et al. |
| 9,907,693 B2 | 3/2018 | Burger et al. |
| 9,980,765 B2 | 5/2018 | Avram et al. |
| 10,085,881 B2 | 10/2018 | Karnik et al. |
| 10,092,346 B2 | 10/2018 | Levinson et al. |
| 10,111,774 B2 | 10/2018 | Gonzales et al. |
| 10,201,380 B2 | 2/2019 | DeBenedictis et al. |
| 10,213,244 B2 | 2/2019 | Fourkas et al. |
| 10,363,080 B2 | 7/2019 | Elkins et al. |
| 10,441,459 B2 | 10/2019 | Aronhalt et al. |
| 10,470,813 B2 | 11/2019 | Allison et al. |
| 10,568,759 B2 | 2/2020 | Yee et al. |
| 10,575,890 B2 | 3/2020 | DeBenedictis et al. |
| 10,582,960 B2 | 3/2020 | Avram et al. |
| 10,596,030 B2 | 3/2020 | Karnik et al. |
| 10,646,666 B2 | 5/2020 | Cohn et al. |
| 10,675,178 B2 | 6/2020 | Levinson et al. |
| 10,806,500 B2 | 10/2020 | DeBenedictis et al. |
| 10,864,112 B2 | 12/2020 | Burger et al. |
| 10,869,779 B2 | 12/2020 | Burger et al. |
| 10,888,366 B2 | 1/2021 | Allison et al. |
| 10,912,599 B2 | 2/2021 | O'Neil et al. |
| 10,939,947 B2 | 3/2021 | Burger et al. |
| 11,076,879 B2 | 8/2021 | Yee et al. |
| 11,116,566 B2 | 9/2021 | Dinger et al. |
| 11,154,418 B2 | 10/2021 | Frangineas |
| 11,253,393 B2 | 2/2022 | Karnik et al. |
| 11,272,972 B2 | 3/2022 | Allison et al. |
| 11,284,934 B2 | 3/2022 | Lazarus et al. |
| 11,324,673 B2 | 5/2022 | Velis et al. |
| 11,419,757 B2 | 8/2022 | Gonzales et al. |
| 11,437,150 B2 | 9/2022 | Rondoni et al. |
| 11,439,532 B2 | 9/2022 | Velis |
| 11,446,175 B2 | 9/2022 | Jimenez Lozano et al. |
| 11,446,178 B2 | 9/2022 | Velis |
| D967,164 S | 10/2022 | Mairs et al. |
| 11,457,971 B2 | 10/2022 | Wolf et al. |
| 11,478,643 B2 | 10/2022 | Verzal et al. |
| 11,504,322 B2 | 11/2022 | Garibyan et al. |
| 11,510,722 B2 | 11/2022 | Wolf et al. |
| 11,511,117 B2 | 11/2022 | Ni et al. |
| D971,935 S | 12/2022 | Mairs et al. |
| D971,936 S | 12/2022 | Mairs et al. |
| D971,937 S | 12/2022 | Mairs et al. |
| D971,950 S | 12/2022 | Mairs et al. |
| 11,517,365 B1 | 12/2022 | Mazor et al. |
| 11,583,438 B1 | 2/2023 | Levinson et al. |
| 2002/0026226 A1 | 2/2002 | Ein |
| 2002/0062831 A1 | 5/2002 | Beyar et al. |
| 2002/0164729 A1 | 11/2002 | Skral et al. |
| 2003/0060685 A1 | 3/2003 | Houser |
| 2003/0069572 A1 | 4/2003 | Wellman |
| 2003/0220374 A1 | 11/2003 | Needleman |
| 2003/0220674 A1 | 11/2003 | Anderson et al. |
| 2004/0234576 A1 | 11/2004 | Martin et al. |
| 2004/0249416 A1 | 12/2004 | Yun et al. |
| 2005/0043682 A1 | 2/2005 | Kucklick |
| 2005/0133026 A1 | 6/2005 | Seleznev et al. |
| 2006/0235264 A1 | 10/2006 | Vassallo |
| 2007/0010861 A1 | 1/2007 | Anderson et al. |
| 2007/0129714 A1 | 6/2007 | Elkins et al. |

(56) References Cited

U.S. PATENT DOCUMENTS

| | | |
|---|---|---|
| 2007/0144539 A1 | 6/2007 | van der Burg et al. |
| 2007/0154538 A1 | 7/2007 | Neuberger et al. |
| 2007/0163603 A1 | 7/2007 | Sikora |
| 2007/0198071 A1 | 8/2007 | Ting et al. |
| 2007/0255362 A1 | 11/2007 | Levinson et al. |
| 2007/0270925 A1 | 11/2007 | Levinson |
| 2008/0023012 A1 | 1/2008 | Dineen et al. |
| 2008/0058584 A1 | 3/2008 | Hirotsuka et al. |
| 2008/0066769 A1 | 3/2008 | Dineen et al. |
| 2008/0066864 A1 | 3/2008 | Ballantine et al. |
| 2008/0077201 A1 | 3/2008 | Levinson et al. |
| 2008/0077202 A1 | 3/2008 | Levinson et al. |
| 2008/0077211 A1 | 3/2008 | Levinson et al. |
| 2008/0083461 A1 | 4/2008 | Viken |
| 2008/0132891 A1 | 6/2008 | Nobis |
| 2008/0183164 A1 | 7/2008 | Elkins et al. |
| 2008/0188947 A1 | 8/2008 | Sanders |
| 2008/0200910 A1 | 8/2008 | Bur er et al. |
| 2008/0287839 A1 | 11/2008 | Rosen et al. |
| 2009/0014012 A1 | 1/2009 | Sanders |
| 2009/0018623 A1 | 1/2009 | Levinson et al. |
| 2009/0018624 A1 | 1/2009 | Levinson et al. |
| 2009/0018625 A1 | 1/2009 | Levinson et al. |
| 2009/0018626 A1 | 1/2009 | Levinson et al. |
| 2009/0018627 A1 | 1/2009 | Levinson et al. |
| 2009/0107001 A1 | 4/2009 | McCarthy |
| 2009/0118722 A1 | 5/2009 | Ebbers et al. |
| 2009/0120446 A1 | 5/2009 | Vaska et al. |
| 2009/0123886 A1 | 5/2009 | Vaska et al. |
| 2009/0149929 A1 | 6/2009 | Levinson et al. |
| 2009/0192504 A1 | 7/2009 | Askew |
| 2009/0287060 A1 | 11/2009 | Pell et al. |
| 2009/0287210 A1 | 11/2009 | Kauphusman |
| 2010/0057065 A1* | 3/2010 | Krimsky ............ A61B 18/0218 606/21 |
| 2010/0081971 A1 | 4/2010 | Allison |
| 2010/0100089 A1 | 4/2010 | Niethammer |
| 2010/0152824 A1 | 6/2010 | Allison |
| 2010/0280582 A1 | 11/2010 | Baker |
| 2011/0066216 A1 | 3/2011 | Ting et al. |
| 2011/0155143 A1 | 6/2011 | Shantha |
| 2011/0166598 A1 | 7/2011 | Gonazles et al. |
| 2011/0224761 A1 | 9/2011 | Manstein |
| 2011/0238050 A1 | 9/2011 | Allison et al. |
| 2011/0238051 A1 | 9/2011 | Levinson et al. |
| 2011/0300079 A1 | 12/2011 | Martens et al. |
| 2012/0022518 A1 | 1/2012 | Levinson et al. |
| 2012/0085174 A1 | 4/2012 | Urbano |
| 2012/0239123 A1 | 9/2012 | Weber et al. |
| 2012/0265186 A1 | 10/2012 | Burger |
| 2013/0066309 A1 | 3/2013 | Levinson et al. |
| 2013/0079684 A1 | 3/2013 | Rosen et al. |
| 2013/0116758 A1 | 5/2013 | Levinson et al. |
| 2013/0116759 A1 | 5/2013 | Levinson et al. |
| 2013/0158440 A1 | 6/2013 | Allison |
| 2013/0158636 A1 | 6/2013 | Ting et al. |
| 2013/0245731 A1 | 9/2013 | Allison |
| 2013/0253384 A1 | 9/2013 | Anderson et al. |
| 2013/0253494 A1 | 9/2013 | Anderson et al. |
| 2013/0253495 A1 | 9/2013 | Anderson et al. |
| 2013/0253496 A1 | 9/2013 | Anderson et al. |
| 2014/0005760 A1 | 1/2014 | Levinson et al. |
| 2014/0067025 A1 | 3/2014 | Levinson et al. |
| 2014/0257443 A1 | 9/2014 | Baker et al. |
| 2014/0277219 A1 | 9/2014 | Nanda |
| 2014/0277302 A1* | 9/2014 | Weber .................. A61F 7/0085 607/104 |
| 2014/0316393 A1 | 10/2014 | Levinson et al. |
| 2015/0047301 A1 | 2/2015 | Messersi' |
| 2015/0148791 A1 | 5/2015 | Birdsall et al. |
| 2015/0216719 A1 | 8/2015 | DeBenedictis et al. |
| 2015/0216720 A1 | 8/2015 | DeBenedictis et al. |
| 2015/0216816 A1 | 8/2015 | O'Neil et al. |
| 2015/0251120 A1 | 9/2015 | Jakop |
| 2016/0022345 A1 | 1/2016 | Baust et al. |
| 2016/0051401 A1 | 2/2016 | Yee et al. |
| 2016/0183997 A1 | 6/2016 | Burnett et al. |
| 2016/0324576 A1 | 11/2016 | Ebbutt |
| 2016/0338752 A1 | 11/2016 | Sperling |
| 2016/0354234 A1 | 12/2016 | Dabrowiak |
| 2016/0354237 A1* | 12/2016 | Gonzales ............... A61M 19/00 |
| 2017/0079833 A1 | 3/2017 | Frangineas et al. |
| 2017/0105869 A1 | 4/2017 | Frangineas |
| 2017/0196731 A1 | 7/2017 | DeBenedictis et al. |
| 2017/0239079 A1 | 8/2017 | Root et al. |
| 2017/0246032 A1 | 8/2017 | Gonzales et al. |
| 2017/0325992 A1 | 11/2017 | DeBenedictis et al. |
| 2017/0325993 A1 | 11/2017 | Jimenez Lozano et al. |
| 2017/0326042 A1 | 11/2017 | Zeng et al. |
| 2017/0326346 A1 | 11/2017 | Jimenez Lozano et al. |
| 2018/0185081 A1 | 7/2018 | O'Neil et al. |
| 2018/0206900 A1 | 7/2018 | Sperling |
| 2018/0235805 A1 | 8/2018 | Burger et al. |
| 2019/0069949 A1* | 3/2019 | Vrba ...................... A61B 18/02 |
| 2019/0151006 A1 | 5/2019 | Fourkas et al. |
| 2019/0192873 A1 | 6/2019 | Schwarz et al. |
| 2019/0197361 A1 | 6/2019 | Gonzales et al. |
| 2019/0254867 A1 | 8/2019 | Gonzales et al. |
| 2019/0290347 A1 | 9/2019 | Elkins et al. |
| 2020/0046552 A1 | 2/2020 | Velis et al. |
| 2020/0069458 A1 | 3/2020 | Pham |
| 2020/0138501 A1 | 5/2020 | DeBenedictis et al. |
| 2020/0206024 A1 | 7/2020 | Karnik et al. |
| 2020/0222103 A1 | 7/2020 | Manstein |
| 2020/0268439 A1 | 8/2020 | Frazier et al. |
| 2020/0323682 A1 | 10/2020 | O'Connor et al. |
| 2020/0375647 A1 | 12/2020 | Alphandery et al. |
| 2021/0030457 A1 | 2/2021 | Avram et al. |
| 2021/0038278 A1 | 2/2021 | DeBenedictis et al. |
| 2021/0128219 A1 | 5/2021 | Allison et al. |
| 2021/0186585 A1 | 6/2021 | Burger et al. |
| 2021/0282829 A1 | 9/2021 | O'Neil et al. |
| 2021/0315626 A1 | 10/2021 | Xiao et al. |
| 2021/0322084 A1 | 10/2021 | Velis et al. |
| 2021/0353351 A1 | 11/2021 | Mazor et al. |
| 2022/0008110 A1 | 1/2022 | Velis et al. |
| 2022/0047315 A1 | 2/2022 | Baker et al. |
| 2022/0071802 A1 | 3/2022 | Christopherson et al. |
| 2022/0125630 A1 | 4/2022 | Karnik et al. |
| 2022/0133531 A1 | 5/2022 | Salma et al. |
| 2022/0226206 A1 | 7/2022 | Velis et al. |
| 2022/0233863 A1 | 7/2022 | Rondoni et al. |
| 2022/0257272 A1 | 8/2022 | Wolf et al. |
| 2022/0265344 A1 | 8/2022 | Wolf, II et al. |
| 2022/0280788 A1 | 9/2022 | Verzal et al. |
| 2022/0288388 A1 | 9/2022 | Rondoni |
| 2022/0296887 A1 | 9/2022 | Johnson et al. |
| 2022/0338892 A1 | 10/2022 | Iyer et al. |
| 2022/0346852 A1 | 11/2022 | Anderson et al. |
| 2022/0387091 A1 | 12/2022 | DeBenedictis et al. |
| 2022/0401725 A1 | 12/2022 | Dieken et al. |
| 2022/0401727 A1 | 12/2022 | Rondoni et al. |
| 2023/0000669 A1 | 1/2023 | Babkin et al. |
| 2023/0028322 A1 | 1/2023 | Velis et al. |
| 2023/0031549 A1 | 2/2023 | Velis et al. |
| 2023/0046154 A1 | 2/2023 | Mazor et al. |
| 2023/0046673 A1 | 2/2023 | Velis et al. |
| 2023/0054472 A1 | 2/2023 | Hill et al. |
| 2023/0240887 A1 | 8/2023 | Gonzales et al. |
| 2024/0341830 A1 | 10/2024 | Kannan et al. |
| 2024/0341831 A1 | 10/2024 | Kannan et al. |
| 2025/0134915 A1 | 5/2025 | Gonzales et al. |
| 2025/0135004 A1 | 5/2025 | Gonzales et al. |

FOREIGN PATENT DOCUMENTS

| | | |
|---|---|---|
| AU | 2020272238 A1 | 10/2021 |
| AU | 2020412601 A1 | 7/2022 |
| AU | 2021324991 A1 | 3/2023 |
| CA | 3023821 A1 | 11/2017 |
| CA | 3044020 A1 | 7/2018 |
| CA | 3065606 A1 | 9/2018 |
| CA | 3115260 A1 | 4/2020 |
| CA | 3135707 A1 | 10/2020 |

(56) References Cited

FOREIGN PATENT DOCUMENTS

| | | |
|---|---|---|
| CA | 3162660 A1 | 7/2021 |
| CN | 108836619 A | 11/2018 |
| EP | 1890627 B1 | 6/2012 |
| EP | 2111172 B1 | 10/2013 |
| EP | 2094328 B1 | 8/2014 |
| EP | 2676623 B1 | 9/2015 |
| EP | 2162083 B1 | 12/2015 |
| EP | 2499984 B1 | 1/2016 |
| EP | 2967706 A1 | 1/2016 |
| EP | 2687174 B1 | 10/2016 |
| EP | 3099258 A1 | 12/2016 |
| EP | 3099260 A2 | 12/2016 |
| EP | 3182918 A1 | 6/2017 |
| EP | 2802279 B1 | 8/2017 |
| EP | 3104796 B | 4/2019 |
| EP | 3488833 A1 | 5/2019 |
| EP | 3541345 A1 | 9/2019 |
| EP | 3342379 B1 | 10/2019 |
| EP | 3506846 A4 | 1/2021 |
| EP | 3099262 B1 | 2/2022 |
| EP | 4081746 A1 | 11/2022 |
| GB | 2423023 B | 10/2009 |
| HK | 40011648 A | 7/2020 |
| IL | 266662 A | 6/2019 |
| IL | 269038 A | 10/2019 |
| JP | H01-223961 A | 9/1989 |
| JP | 2022126649 A | 8/2022 |
| MX | 2019010396 A | 7/2020 |
| SG | 11201908076 | 9/2019 |
| SG | 11202103368 | 4/2021 |
| SG | 11202103636 | 5/2021 |
| WO | WO97/44092 A1 | 11/1997 |
| WO | WO99/003411 A1 | 1/1999 |
| WO | WO2003/078596 A2 | 9/2003 |
| WO | 2007101039 A1 | 9/2007 |
| WO | 2007127924 A2 | 11/2007 |
| WO | 2007133839 A1 | 11/2007 |
| WO | 2008016730 A2 | 2/2008 |
| WO | 2008039556 A1 | 4/2008 |
| WO | 2008039557 A1 | 4/2008 |
| WO | 2008060423 A2 | 5/2008 |
| WO | WO2008/055243 A2 | 5/2008 |
| WO | 2008143678 A1 | 11/2008 |
| WO | 2009011708 A1 | 1/2009 |
| WO | WO2009/026471 A1 | 2/2009 |
| WO | WO2010/036732 A1 | 4/2010 |
| WO | WO2010/127315 A2 | 11/2010 |
| WO | WO2011/091293 A1 | 7/2011 |
| WO | WO2011/091431 A1 | 7/2011 |
| WO | 2012012296 A1 | 1/2012 |
| WO | WO2012/103242 A1 | 8/2012 |
| WO | WO2012/103315 A2 | 8/2012 |
| WO | 2014151850 A2 | 9/2014 |
| WO | 2014151872 A2 | 9/2014 |
| WO | WO2016/033384 A1 | 3/2016 |
| WO | WO2017/223417 A1 | 12/2017 |
| WO | WO2018/044825 A1 | 3/2018 |
| WO | 2019046236 A2 | 3/2019 |
| WO | 2020142519 A1 | 7/2020 |
| WO | WO2022/169699 A1 | 8/2022 |
| WO | 2022229277 A1 | 11/2022 |
| WO | 2023278891 A1 | 1/2023 |
| WO | 2023064528 A1 | 4/2023 |

OTHER PUBLICATIONS

Coleman et al., Clinical Efficacy of Noninvasive Cryolipolysis and Its Effects on Peripheral Nerves, Aesth. Plast. Surg., 33: 482-488; Mar. 2009.
Day et al.; Popsicle Panniculitis; Pediatric Emergency Care; 8(2); 91-93; Apr. 1992.
Epstein et al.; Popsicle Panniculitis; NEJM; 282(17); 966-967; Apr. 23, 1970.
Gage et al.; Critical temperature for skin necrosis in experimental cryosurgery; Cryobiology; 19(3); pp. 273-282; Jun. 1982.
Kim et al.; Tongue fat and its relationship to obstructive sleep apnea; Sleep; 37(10); pp. 1639-1648; Oct. 2014.
Medicalxpress; Study shows that tongue size and fat may predict sleep apnea risk in obese adults; 3 pages retrived from the interenet (https://medicalxpress.com/news/2014-09-tongue-size-fat-apnea-obese.html) on Nov. 27, 2018.
Nelson et al., Cryolipolysis for Reduction of Excess Adipose Tissue; Semin. Cutan. Med. Surg., 28(4): 244-249; Dec. 1, 2009.
Rajkumar et al.; Popsicle Panniculitis of the Cheeks; Clinical Pediatrics.; 15(7); 619-621; Jul. 1976.
Zelickson et al., Cryolipolysis for Noninvasive Fat Cell Destruction: Initial Results from a Pig Model; Dermatol. Surg., 35: 1462-1470; Oct. 2009.
Gonzalez et al., U.S. Appl. No. 18/058,159 entitled "Apparatus and Methods for Treatment of Obstructive Sleep Apnea Utilizing Cryolysis of Adipose Tissues," filed Nov. 22, 2022.
Extended European Search Report mailed Apr. 9, 2018 in European Patent Application No. 15846755.5, 9 pages.
Extended European Search Report mailed Aug. 19, 2022 in European Patent Application No. 19907538.3, 8 pages.
Extended European Search Report mailed Dec. 15, 2023 in European Patent Application No. 21756850.0, 8 pages.
International Search Report mailed Dec. 28, 2015 in International Patent Application No. PCT/US15/51903, 10 pages.
International Search Report mailed Jun. 29, 2021 in International Patent Application No. PCT/US21/18926, 12 pages.
International Search Report mailed Jun. 6, 2023 in International Patent Application No. PCT/US22/82620, 11 pages.
International Search Report mailed May 1, 2020 in International Patent Application No. PCT/US19/69113, 11 pages.
International Search Report mailed May 16, 2012 in International Patent Application No. PCT/US12/22697.
Office Action mailed Jul. 18, 2017 in Canadian Patent Application No. 2,825,624, 3 pages.
Office Action mailed Jul. 18, 2018 in Canadian Patent Application No. 2,825,624, 4 pages.
Office Action mailed Jul. 25, 2023 in Japanese Patent Application No. 2021-538451, 7 pages, English Translation.
Office Action mailed Oct. 27, 2021 in Canadian Patent Application No. 2,962,920, 5 pages.
Office Action mailed Sep. 13, 2023 in Canadian Patent Application No. 3, 168,812, 4 pages.
Office Action mailed Sep. 22, 2023 in Canadian Patent Application No. 3, 125,291, 5 pages.
Chakrabarti, P. et al., "FoxO1 controls insulin-dependent adipose triglyceride lipase (ATGL) expression and lipolysis in adipocytes," Journal of biological chemistry, 2009, vol. 284, No. 20, pp. 13296-13300.
Decision of Dismissal of Amendment mailed Nov. 12, 2024 in Japanese Patent Application No. 2021-538451, 4 pages, with English Translation.
Examination Report mailed Aug. 15, 2024 in Canadian Patent Application No. 3,125,291, 5 pages.
Examination Report mailed Aug. 15, 2024 in Canadian Patent Application No. 3, 168,812, 4 pages.
Examination Report mailed Jul. 10, 2024 in European Patent Application No. 19907538.3, 4 pages.
Examination Report mailed Sep. 16, 2024 in Australian Patent Application No. 2019419502, 4 pages.
Ichioka, M. et al., "Increased expression of macrophage-inducible C-type lectin in adipose tissue of obese mice and humans," Diabetes, 2011, vol. 60, pp. 819-826.
International Search Report and Written Opinion mailed Jan. 31, 2025 in International Patent Application No. PCT/US24/51836, 10 pages.
Keuper, M. et al., "An inflammatory micro-environment promotes human adipocyte apoptosis," Molecular and cellular endocrinology, 2011, vol. 339, pp. 105-113.
Office Action mailed Apr. 16, 2024 in Japanese Patent Application No. 2021-538451, 4 pages, English Translation.

(56) References Cited

OTHER PUBLICATIONS

Tanaka, M. et al., "Macrophage-inducible C-type lectin underlies obesity-induced adipose tissue fibrosis," Nature communications, 2014, vol. 5, article:4982, pp. 1-13.

* cited by examiner

| Mandibular arch dimension | Females, n=101 Mean (SD) | CV | Males, n=113 Mean (SD) | CV | T value |
|---|---|---|---|---|---|
| a Inter-canine distance | 25.20 (1.69) | 6.71 | 25.43 (1.51) | 5.93 | 0.93 |
| b Inter-first molar distance | 42.91 (2.45) | 5.70 | 45.07 (2.28) | 5.06 | 5.91* |
| c Inter-second molar distance | 50.22 (2.71) | 5.40 | 55.34 (2.97) | 5.57 | 7.07* |
| d Anterior arch length | 4.70 (1.27) | 26.94 | 5.46 (0.74) | 13.57 | 4.74* |
| e Molar arch length | 24.78 (2.12) | 8.55 | 25.06 (1.93) | 7.70 | 0.90 |
| f Total arch length | 38.36 (2.73) | 7.12 | 38.37 (2.22) | 5.79 | 0.02 |

SYSTEMS AND METHODS FOR TREATMENT OF OBSTRUCTIVE SLEEP APNEA

CROSS REFERENCE TO RELATED APPLICATIONS

This application claims the benefit of priority to U.S. Provisional Application No. 62/978,653, filed Feb. 19, 2020, entitled "Systems and Methods for Treatment of Obstructive Sleep Apnea," and to U.S. Provisional Application No. 63/132,869, filed Dec. 31, 2020, entitled "Systems and Methods for Treatment of Obstructive Sleep Apnea," the disclosures of which are herein incorporated by reference in their entirety.

INCORPORATION BY REFERENCE

All publications, including patents and patent applications, mentioned in this specification are herein incorporated by reference in their entirety to the same extent as if each individual publication was specifically and individually indicated to be incorporated by reference.

FIELD

The present disclosure relates generally to minimally invasive treatment of obstructive sleep apnea.

BACKGROUND

Obstructive sleep apnea (OSA) is a sleep disorder that affects up to 20% of the adult population. OSA generally occurs during sleep when soft tissue enlarges and obstructs the pharyngeal airway, creating cessation of, or impeding, breathing due to the decrease in size of the upper airway, resulting in the breathing of the patient to repeatedly stop and restart. Obstruction can occur at one or more levels including the retropalatal and retrolingual areas, and if untreated could leave to the development of serious complications, including atrial fibrillation and heart failure.

This enlargement of the tongue generally occurs due to excess body weight, causing adipose tissue to accumulate within the tongue. With the accumulation of adipose tissue, organs in the oral cavity, including the tongue, become enlarged and lose their firmness and grow in volume. Due to their inability to maintain their tone and their increase in size, they move into the airway and restrict airflow. One condition that is particularly concerning occurs when there is excess fat near the base of the tongue, which is adjacent the airway.

Surgical correction (such as glossectomy) of such obstructions remains a challenge, specifically for the retrolingual area. Removal or ablation of tongue tissue has been utilized with poor results due to complications, such as severe bleeding, abscess formation, and/or the inability to move the tongue anterior enough to relieve the obstruction. Medical devices such as tongue trainers also result in limited mobility or inconvenience to the patient.

Continuous positive airway pressure (CPAP) is a more noninvasive technique in relieving OSA than surgical operation, but is a remedy and not a permanent solution. Applying a stream of compressed air through the pharyngeal airway to overcome the collapsing soft tissue results in the patient being uncomfortable and fully dependent on the machine and its limitations, such as a stuffy nose, claustrophobia, skin irritation, pressure sores, and dry mouth. Additionally, the mechanics of the machine result in the CPAP mask possibly falling off during sleep, bothersome noises, and a leaky mask, all while being costly and electrically dependent. These factors lead to the patient having trouble falling asleep, demonstrating a faulty solution to curing OSA, since the patient will never be cured of their disease and will still have complications during sleep.

Adipose cryolysis is the use of cold to selectively target the submucosal adipose tissue, leading to a reduction in tissue volume via the removal of effected fat cells. However, it is known that the effect of cold on cells depend on various factors, including the cell type, duration that the cells are exposed to cold, rate of cooling and warming, as well as the number of cooling and warming cycles. When the adipocytes are exposed to temperatures below −15° C., necrosis occurs. At temperatures around −10° C., adipocytes are forced into a pathway that is reminiscent of apoptosis. When the temperatures are in the range of −5° C. to +10° C., cells may move into a hyper-metabolic state, resulting in thermogenesis, which may also reduce the lipid volumes, or result in adipocyte cell death.

Above observations may indicate that the exposure to temperatures in the range of +5° C. to −15° C. for 1-100 minutes may cause maximum damage to the adipose tissue while minimizing the damage to muscle. Furthermore, even when the 70-80% of the skeletal muscle is damaged, muscle does recover within few days, thanks to its regenerative capacity. These facts can be used during the design of the devices that can be used for the selective elimination of the adipose tissue while preserving the other types of tissues such as the skeletal muscle, blood vessels and the nerves.

The removal of adipocyte tissue (fat) from the tongue is expected to reduce the volume of tissue in the oropharynx, and the reduction of this tissue is known to cure or reduce the severity of obstructive sleep apnea, as demonstrated by the clinical outcomes of other procedures, such as the glossectomy of the tongue and the mandibular advancement. Furthermore, the removal of the fat from within key tongue muscles, such as the genioglossus muscle, will improve the ability of these muscle groups to function, which in turn may result in the reduction of obstructive sleep apnea. These muscles do keep the tongue from falling back into the airway, in both their activated and passive states. Adipose tissue that is interspersed within the muscle act as a restriction to the muscle due to the mass and inability of the adipose tissue to move in the same manner as the adjacent muscle fibers.

To date, however, cryolitic treatment of OSA has involved procedures analogous to ablation, merely substituting cryolitic cold for electrolytic heat and non-selectively destroying all tissues in a similar manner—and with the same complications as the non-cryolitic therapies.

It is known that patients with OSA have a higher percentage of adipose deposits in the areas of obstruction, specifically, the soft palate and uvula, base of tongue and lateral pharyngeal walls. The adipose tissue may be up to or greater than 40% of the total volume of tissues in these areas. Removal of the fat deposits in these areas would permit relief from OSA symptoms while preserving surrounding tissue. To date, however, cryolitic treatment of OSA has involved procedures analogous to ablation, merely substituting cryolitic cold for electrolytic heat and nonselectively destroying tissue in a similar manner—and with the same complications.

Technologies that are used for the treatment of obstructive sleep apnea range from non-invasive ones such as continuous positive air pressure (CPAP), to surgical modifications such as glossectomy where the part of the tongue is removed, to medical devices such as tongue trainers. Unfortunately, many of these technologies either provide limited results or create much inconvenience to the patients. Hence, there is an unmet medical need to build a minimally invasive technique for the treatment of the patients with obstructive sleep apnea.

SUMMARY OF THE DISCLOSURE

The present invention employs adipose cryolysis in a tissue-selective manner by selectively removing fat cells from the tissues responsible for the OSA, such as the oropharyngeal tissues, and exploits the fact that adipocytes have a heightened to susceptibility to cooling compared to other types of cells, resulting in the slow and steady digestion of the effected tissues by the surrounding macrophages. Related systems, methods of use, and design parameters are provided herein.

In various embodiments, this disclosure exploits the particular cryolitic vulnerability of adipose tissue to provide a medical device to treat OSA without damaging and/or reducing the function of oropharyngeal tissue. Certain embodiments of the medical device may include engagement members that are formed in the shape of each specific area to be cooled, or are configured to cool multiple organs at once. Some embodiments may utilize grasping portions configured to grasp or pinch targeted anatomical structures, such as the soft palate, base of the tongue and the soft tissues of the pharynx, which are known to be associated with OSA, thereby cooling the tissue between the grasping portions and ensuring good mechanical contact during cooling. In some embodiments, the medical device may pierce the mucosa to cool the underlying tissues. The medical device may also be configured to inject a cooling agent into the underlying tissue to reduce the temperature of the deeper tissues. Additionally, the medical device may include engagement members configured to pierce the lower submaxillary triangle in order to reach more inaccessible areas of the adipose tissue on the lower tongue.

A device configured for treatment of obstructive sleep apnea is provided, comprising a temperature determinant configured to chill and heat a circulating fluid, the temperature determinant including a chiller, a heater, and a pump, an applicator configured to receive the circulating fluid, the applicator being sized and configured to contact an oropharyngeal tissue, an adjustable fixation system configured to couple to the applicator and provide adjustment of the applicator with respect to a patient, and a controller configured to facilitate heat transfer between the applicator and the circulating fluid.

In some embodiments, the device further comprises open foam insulation disposed on all surfaces of the applicator that are not intended to come in contact with tissue.

In other embodiments, the device further comprises closed foam insulation disposed on all surfaces of the applicator that are not intended to come in contact with tissue.

In other embodiments, the device further comprises a cryoprotectant sheet disposed on the applicator.

In some examples, the applicator comprises an insulator disposed on all surfaces of the applicator that are not intended to come into contact with tissue, the applicator further comprising a cryoprotectant sheet that covers the applicator including the insulator.

In another embodiment, the device includes a first temperature sensor disposed on a fluid inlet of the applicator, a second temperature sensor disposed on a fluid outlet of the applicator, a third temperature sensor disposed on a tissue contacting surface of the applicator, and a fourth temperature sensor disposed on or in a cryoprotectant sheet of the applicator.

In some embodiments, the device includes channels disposed within the applicator for wire management.

In another embodiment, the adjustable fixation system is configured to apply a predetermined force from the applicator to the tissue.

In some embodiments, the temperature determinant has fail safe features of stored heat for thawing, fast heating, and cooling at a minimum rate of 1° C./sec and is configured to hold a temperature of the circulated fluid within ±1° C. of a target temperature.

A device for treatment of obstructive sleep apnea is also provided, comprising a temperature determinant configured to chill and heat a circulating fluid, the temperature determinant including a chiller, a heater, and a pump, an applicator configured to receive the circulating fluid, the applicator being sized and configured to contact an oropharyngeal tissue, a guidance device configured to aid in positioning the applicator, an adjustable fixation system configured to couple to the applicator and provide adjustment of the applicator with respect to a patient, and a controller configured to facilitate heat transfer between the applicator and the fluid.

In some embodiments, the guidance device is an endoscope. In other embodiments, the guidance device is an intra-oral or external ultrasound probe. In another embodiment, the guidance device is an electrical impedance measurement device. In some embodiments, the guidance device is mounted on the applicator. In another embodiment, the guidance device is not mounted on the applicator.

A device for treatment of obstructive sleep apnea is provided, the device comprising of a temperature determinant configured to chill and heat a circulating fluid, the temperature determinant including a chiller, a heater, and a pump, an applicator configured to receive the circulating fluid, the applicator being sized and configured to contact an oropharyngeal tissue, an adjustable fixation system configured to couple to the applicator and provide adjustment of the applicator with respect to a patient, a feedback system, and a controller configured to facilitate heat transfer between the applicator and the circulating fluid based on the feedback system.

In some embodiments, the feedback system comprises a set of temperature sensors disposed on the applicator. In one embodiment, the controller is configured to adjust the temperature of the circulating fluid and a treatment duration based one or more temperature measurements from the set of temperature sensors. In another embodiment, one or more temperature measurements comprise a morphology that includes time constants, discontinuities, rate of change, area under the curve, and oscillations.

In some embodiments, the feedback system comprises at least one pressure sensor. In some embodiments, the at least one pressure sensor is configured to sense a contact force of the applicator with the tissue. In another embodiment, the at least one pressure sensor is configured to sense a rigidity of the tissue to determine if there is frost formation and/or thawing of the tissue.

In some examples, the feedback system comprises at least one electrical impedance sensor disposed on the applicator. In one embodiment, the at least one electrical impedance sensor is configured to sense contact of the applicator with the tissue. In another embodiment, the at least one electrical impedance sensor is configured to sense the changes in an electrical impedance of the tissue to determine if there is frost formation and/or thawing of the tissue.

In some embodiments, the feedback system comprises an ultrasound sensor. In one embodiment, the ultrasound sensor identifies when the applicator is in contact with the tissue. In another embodiment, the ultrasound sensor is configured to sense a change in acoustic impedance of the tissue to determine if there is frost formation and/or thawing of the tissue.

A device for treatment of obstructive sleep apnea in a patient is also provided, comprising a temperature determinant configured to chill and heat a circulating fluid, the temperature determinant including a chiller, a heater, and a pump, an applicator configured to receive the circulating fluid, the applicator being sized and configured to contact an oropharyngeal tissue, an adjustable fixation system configured to couple to the applicator and provide adjustment of the applicator with respect to the patient, and a controller configured to facilitate heat transfer between the applicator and the circulating fluid.

A method of treating sleep apnea in a patient is provided, comprising placing an applicator into contact with a target surface of an oropharyngeal tissue or an underlying tissue, cooling a fluid with a temperature determinant, circulating the fluid through the applicator, continuously measuring a temperature of the fluid with at least one temperature sensor disposed on or in the applicator, adjusting a temperature of the fluid with the temperature determinant based on the measured temperature, and cooling the target surface of the oropharyngeal tissue with the applicator for a fixed period of time when the temperature of the fluid reaches a target temperature.

In some embodiments, the target surface of the oropharyngeal tissue includes one or more of: a soft palate, a uvula, a tongue, or a pharyngeal wall.

In another embodiment, the cooling surface is configured to be placed in contact with the surface of the oropharyngeal tissue between approximately one minute and approximately thirty minutes to cause cryolysis of adipose tissue within the oropharyngeal tissue.

In some embodiments, cooling the target surface of the oropharyngeal tissue or the underlying tissue in the subject with obstructive sleep apnea for a time sufficient to cause cryolysis of adipose tissue within the oropharyngeal tissue includes cooling the adipose tissue to a temperature of between about 0° C. and a body temperature.

In one embodiment the at least one temperature sensor is disposed within an inlet/outlet of the applicator. In another embodiment, the at least one temperature sensor is disposed on a tissue contacting surface of the applicator. In some embodiments, the at least one temperature sensor is disposed on or in a cryoprotectant layer of the applicator.

A method of treating sleep apnea in a patient is provided, comprising the steps of placing an applicator into contact with a target surface of an oropharyngeal tissue or an underlying tissue, circulating a chilled fluid at a target temperature through the applicator, cooling the target surface of the oropharyngeal tissue with the applicator for a first fixed period of time, activating one or more RF heaters disposed on the applicator for a second fixed period of time to warm the underlying tissue at a target depth, and repeating the cooling and activating steps until a total cooling treatment time is reached to cause cryolysis of adipose tissue within the oropharyngeal tissue.

In some embodiments, the target depth is between 4-5 mm.

A method of treating sleep apnea in a patient is provided, comprising the steps of placing an applicator into contact with a target surface of an oropharyngeal tissue or an underlying tissue, circulating a chilled fluid at a target temperature through the applicator for a first cooling duration, measuring a tissue compliance of the target surface with one or more sensors disposed on the applicator, wherein if the tissue compliance is used to determine that the target surface is frozen after the first cooling duration, continuing to circulate the chilled fluid though the applicator for a second cooling duration, wherein if the tissue compliance is used to determine that the target surface is not frozen after the first cooling duration, reducing the target temperature of the chilled fluid and continuing to monitor the tissue compliance of the target tissue until it is determined that the target surface is frozen, then continuing to circulate the chilled fluid though the applicator for the second cooling duration.

In some embodiments, after the second cooling duration, the method further comprises warming the fluid to a target warming temperature and circulating the fluid through the applicator at the target warming temperature for a heating duration.

In some embodiments the first cooling duration is different than the second cooling duration.

In one embodiment, the second cooling duration is configured to cause cryolysis of adipose tissue within the oropharyngeal tissue.

In some embodiments, the one or more sensors comprise pressure sensors.

In other embodiments, the one or more sensors comprise electrical impedance sensors.

In additional embodiments, the one or more sensors comprise ultrasound sensors.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1A:
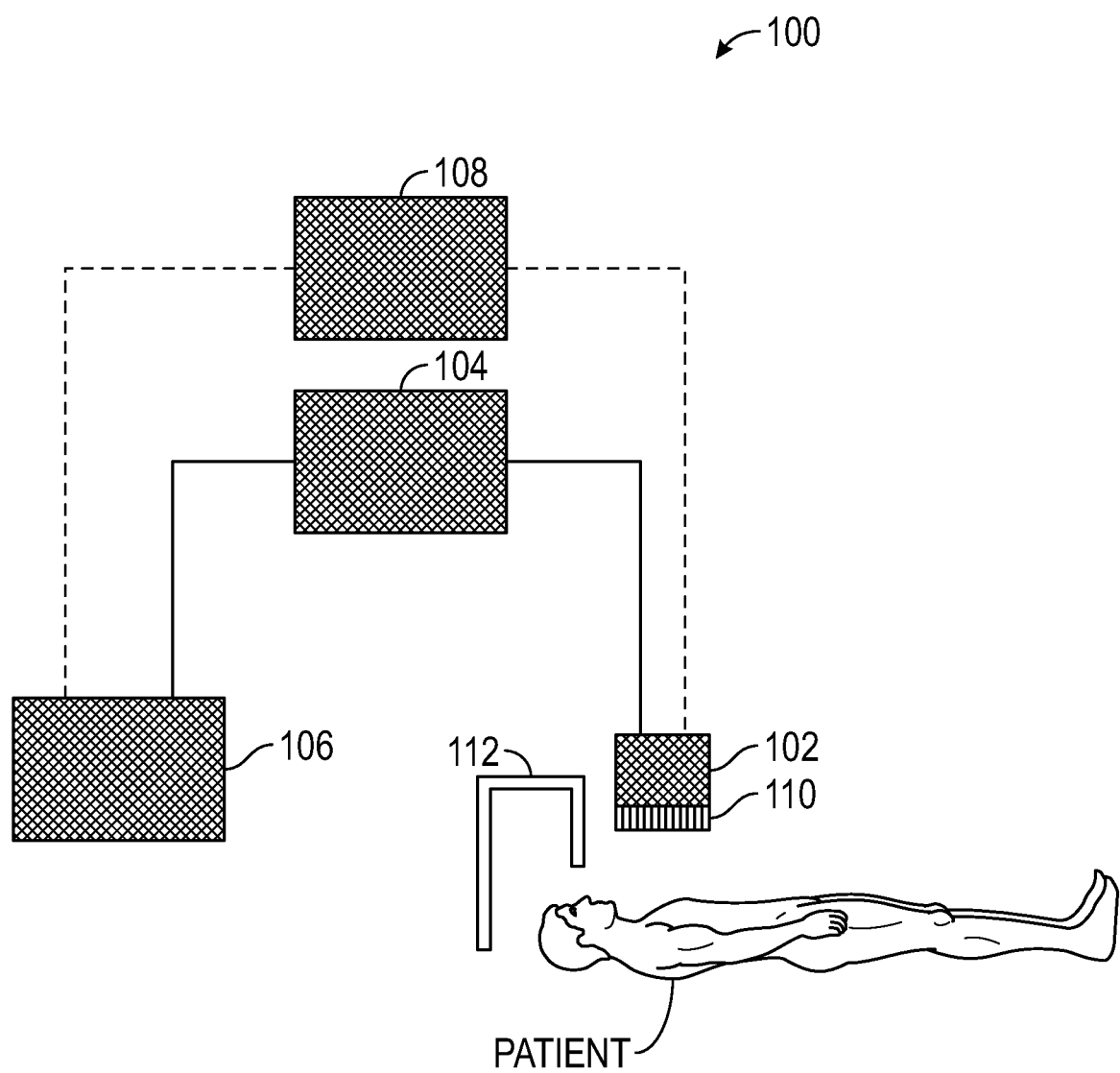
FIG. 1 illustrates an embodiment of a sleep apnea treatment system.

Provided herein are devices and methods to treat obstructive sleep apnea. A sleep apnea treatment system 100, illustrated in FIG. 1, can include many components including an oral applicator 102, a pump 104, a temperature determinant (heater/chiller) 106, an electronic controller 108, one or more sensors 110, and a fixture arm 112. The following description provides details and examples of design and operation of the overall system and its individual components. Other objects, features and advantages of the present invention will become apparent to those skilled in the art from the following detailed description. It is to be understood, however, that the detailed description and specific examples, while indicating some embodiments of the present invention are given by way of illustration and not limitation. Many changes and modifications within the scope of the present invention may be made without departing from the teachings of the present invention, and the invention includes all such modifications.

FIG. 1 demonstrates one overall configuration of a sleep apnea treatment system 100 in a clinical setting, in which a controller 108 is connected to a temperature determinant 106, which has one or more lines connected to an oral applicator 102. The applicator 102 can be sized and configured to be placed into contact with oropharyngeal tissues. These lines to the applicator may be connected or disjointed. In some embodiments, the lines may be connected by an additional line, incorporating a valve with the connection to turn on and off flow through this channel. In some implementations, the system can be configured to run a pre-cooling agent through the lines before treatment to ensure that the temperature throughout the lines is uniform and not effected by the temperature of the lines itself.

The temperature determinant 106 can be configured to store, generate, or produce a chilled or heated medium via a pump 104 to the applicator. For example, the temperature determinant can be a simpler refrigerant chiller that couples the cold to a recirculating fluid that goes through the applicator. In another embodiment, the temperature determinant can also be a Peltier device, either positioned locally on the chiller temperature probe or remotely from the applicator, whereby the Peltier device chills a recirculating fluid that goes through the applicator. In this example, there can also be a secondary loop of coolant to cool the Peltier device. Gas expansion systems could also be used by allowing a compressed gas to expand in or near the applicator resulting in rapid cooling. In some examples, the temperature determinant can be a heating device configured to provide a heated gas or fluid to the applicator. In some embodiments, the temperature determinant can be a separate heater and chiller with two separate tubes for delivery and removal of the heated/chilled medium from the temperature determinant to the applicator.

The controller 108 can be an electronic controller governed by a human operator or computer/CPU system and be configured to control the overall operation of the system 100. The intricacy of the controller 108 can contain a control system with operations that range from very basic to very complex. In the most basic installments, the control system may only control and stabilize the temperature of the temperature determinant 106. In another example, the control system may prompt the user for the steps of the procedure (such as switching from cooling to heating), and issue warnings when the sensor measurements are out of range, requiring manual input to change the incorrect parameters. In more advanced installments, the controller may govern the main operations of the system, including turning on/off the pump, facilitating the outputs of pump speed, chiller temperatures, and heater temperatures, and terminating the therapy at the end of the session or in case of an anomaly. In the case where the control system is the most governing, the controller regulates the system based on feedback data from one or more sensors of the system and calculating overall system time constants, working as a PID system, allowing the controller to individualize the patient's treatment, which will be described in more detail below.

The controller 108 may run operations based on measurement and guidance systems within the sleep apnea treatment system, or simply output data for interpretation by the operator. This measurement system can consist of multiple sensors located on or within the devices of the heater/chiller and the applicator. The measurement system may collect information consisting of fluid flow rate, fluid pressure, temperatures of the chiller, heater, or applicator, applicator pressure on the tissue, contact detection, etc. The electronic controller can also be used for data acquisition, timing therapy duration, monitoring temperatures, governing temperature of the temperature determinant, and medical billing.

The applicator 102 of the sleep apnea treatment system is designed and configured to be placed either interiorly or exteriorly to the oral cavity of the subject. The applicator is the part of the system that is in direct contact with the target tissue or tissues of the patient to be treated, such as oropharyngeal tissues. In some examples, the applicator is constructed using metal, plastic, or ceramic components and can be sanitized or sterilized before use. The applicator can be rigid or flexible, depending on the target tissue. Furthermore, the applicator can also be reusable or disposable. The applicator is designed and configured to both remove and deliver heat at rates in the range of 0.1 Watts to 195 Watts to and from the tongue of a patient for a period of 1 minute to 100 minutes. The applicator can include one or more sensors 110 which can include, for example, temperature sensors, flow sensors, pressure sensors, etc. A retractor or fixture arm 112, which will be described in detail below, can be configured to hold the applicator in place adjacent to a patient during treatment.

In some embodiments, the applicator is composed of multiple parts. Each part of the applicator may be connected to another part of the applicator or may be independent of the other parts of the applicator. Each part of the applicator is capable of extracting heat and/or delivering heat from the tissue segments that it gets in contact. Furthermore, each segment could be different shape and size, and maybe designed to treat different parts of the tissues in the oral cavity. Coolant flow to these individual parts of the applicator could be configured to be in parallel, series or in combination of parallel or series. Furthermore, the design of each applicator part may be different. For example, the applicator part that is treating the tongue could be a rigid metal device while the applicator part that is treating the lateral walls could be balloon type.

Since the anatomy of the oral structures vary from subject to subject, it is advantageous to design a range of applicators and select the one that is most suitable for a given patient. Alternatively, the applicator can be made from a compliant or a deformable material. In one embodiment of the invention, the applicator is a constructed using a soft and stretchable elastic material, allowing it to have characteristics of an inflatable balloon. In that case, the balloon is initially advanced into place in the oral cavity and then inflated using a warm fluid to make sure that it makes firm contact with the surfaces. Afterwards, the fluid is chilled while maintaining the pressure to deliver the cryolysis therapy. At the end of the treatment period, the liquid that is in the applicator is warmed and the applicator is deflated before its removal. In some embodiments of the invention, the compliant balloon has uniform thermal conductivity and delivers the therapy to all surfaces that it comes in contact with. In other embodiments, the balloon has thermal insulation features, consisting of different materials and thickness at different sites, or additional air-filled chambers, to form thermal insulation to protect the oral structures that are not supposed to experience cold temperatures.

Various sensors 110 can be incorporated within the system 100. In some embodiments, sensors such as temperature sensors can be incorporated into the applicator 102 itself to measure either the temperature of the applicator, the temperature of the target tissue, or the temperature of fluid/coolant flowing through the system. Sensors can also be incorporated into the tubing/lines and/or into the other components of the system, such as in the pump 104, the temperature determinant 106, and/or the fixture arm 112. Various sensors are contemplated in all aspects of the system, including temperature sensors, flow sensors or meters, pressure sensors, RPM meters, etc.

In some embodiments, a RPM meter can be used for monitoring of the fluid flow rate during a given treatment session. The RPM meter can be incorporated within the pump 104 or alternatively, can be a separate measuring device. If a sensed tissue temperature is warmer than the desired one, then the operator or the system can increase the fluid flow rate, i.e., the pump RPM, to increase the heat extraction rate. Conversely, the operator or the system can reduce the RPM to decrease the heat extraction, and in return the tissue temperature increases.

The fixture arm 112 can be configured to position the applicator, maintain a constant force/pressure between the applicator and the tissue, and aid with visualization. Additional details of the fixture arm (also referred to as a force traction system) are provided below.

Figure 2A:
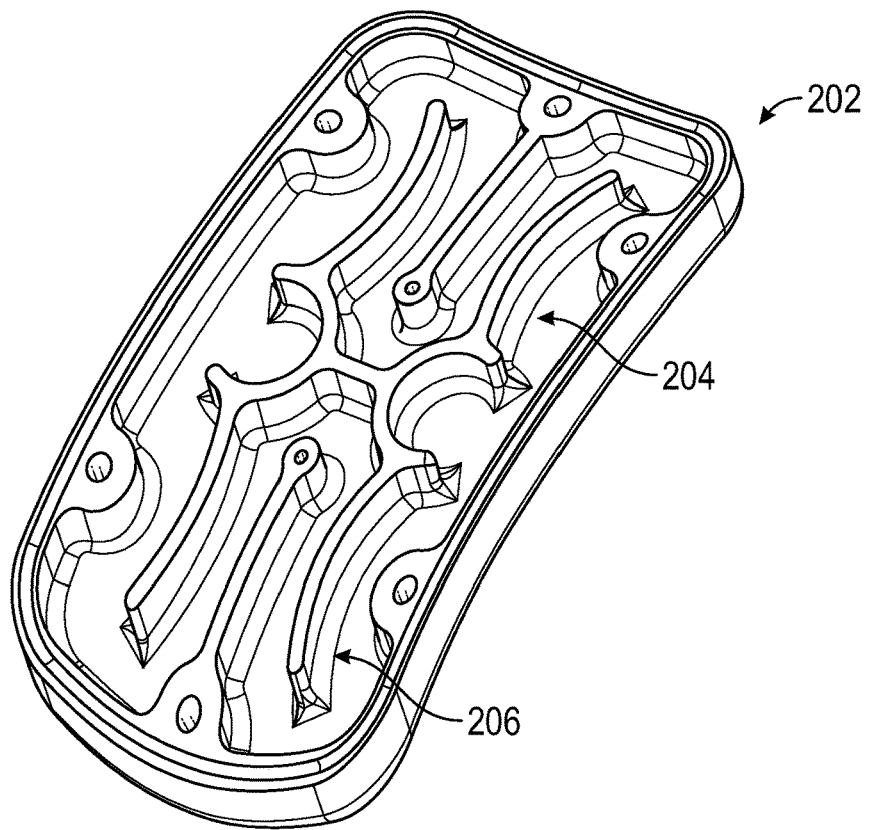
FIGS. 2A-2B illustrate one example of an applicator with an internal flow channel.
Figure 2B:
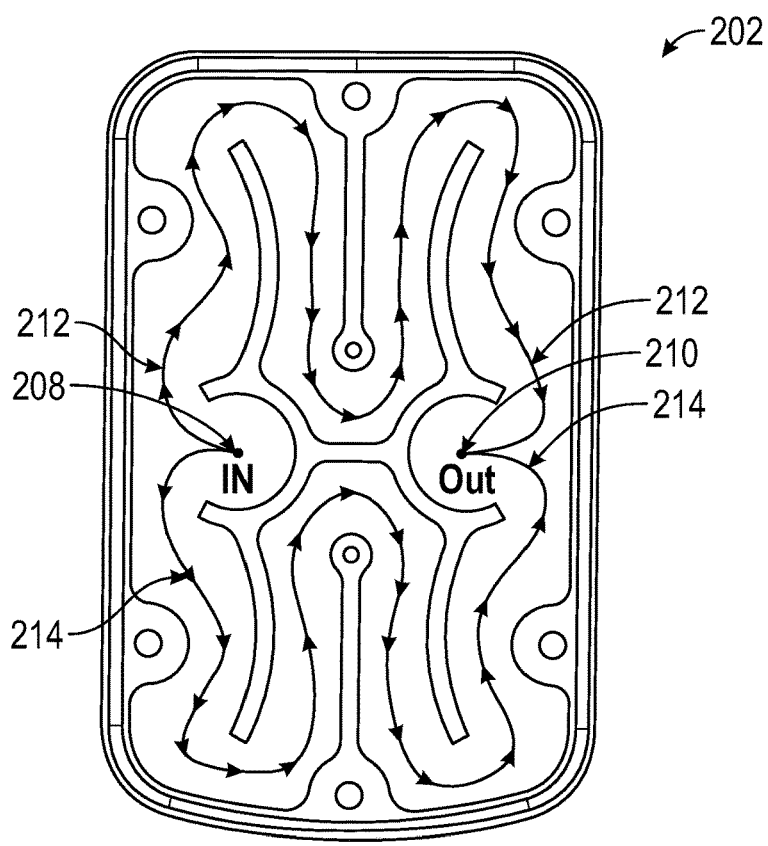

The applicator of the present disclosure can include two or more pieces, e.g., top and bottom, machined out of a metal or other suitable material such as aluminum, plastic, or stainless steel, and combined together by screws, adhesive, or other similar techniques. FIGS. 2A-2B illustrate one example of an applicator half 202 that includes one or more fluid flow channels 204. In one embodiment, the applicator fluid flow channels can be formed with walls 206 in the applicator half. The walls can be integral to the half (e.g., machined, stamped, or molded) or can be separately added to the applicator half. The fluid flow channel within the applicator can be designed and configured such that it maintains a relatively constant cross section from the inlet to the outlet of the applicator. In one embodiment, the average flow channel width is 5 mm and the average height is 3 mm. This design allows the fluid to flow at a relatively constant rate within the applicator without having large fluctuations in the pressure and flow rate, which in turn minimizes the temperature variations on the applicator surface while providing uniform heat extraction from the tissue.

Referring to FIG. 2B, the applicator half can include an inlet 208 and an outlet 210 configured to receive and return, respectively, coolant or cooling fluid from the temperature determinant of the system. As shown in FIG. 2B, the flow channels can be designed such that cooling fluid flowing in through the inlet 208 can travel along a first flow path 212 the flow channels from the inlet 208 towards the outlet 210. Similarly, the cooling fluid flowing in through the inlet 208 can travel along a second flow path 214 along the flow channels from the inlet 208 towards the outlet 212. In some embodiments, the first flow path can be distinct and separate from the second flow path. In another example, the first flow path can comprise fluid flow in a clockwise direction from the inlet to the outlet, and the second flow path can comprise fluid flow in a counter-clockwise direction from the inlet to the outlet.

Figure 3A:
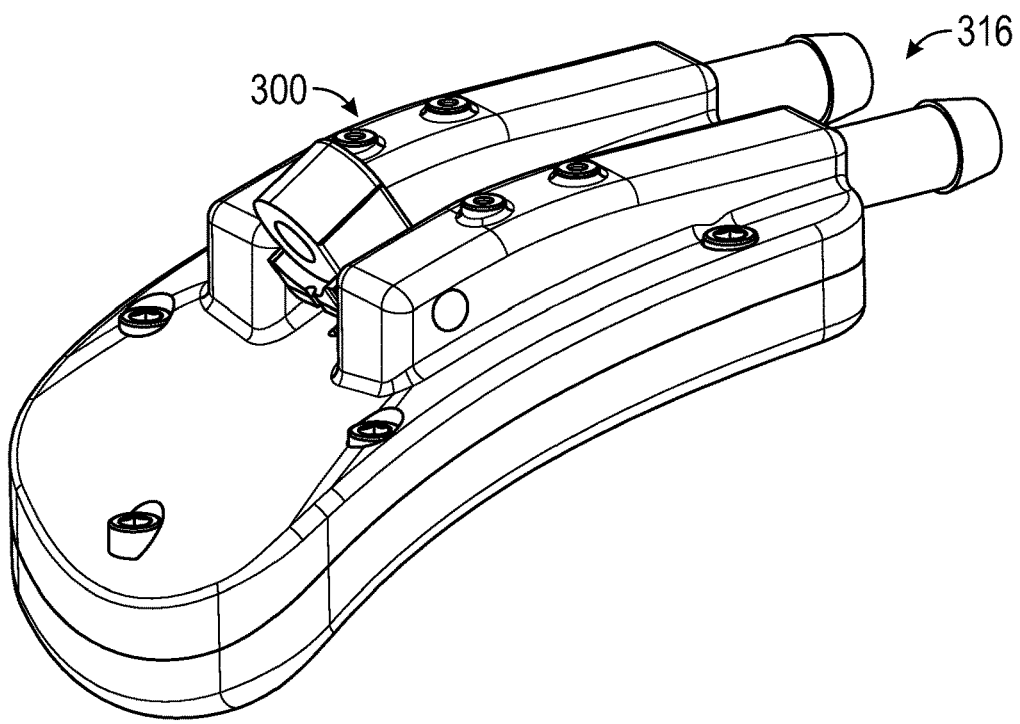
FIGS. 3A-3B illustrate an applicator half with ports for making attachments to fluid inlet and outlet tubes.
Figure 3B:
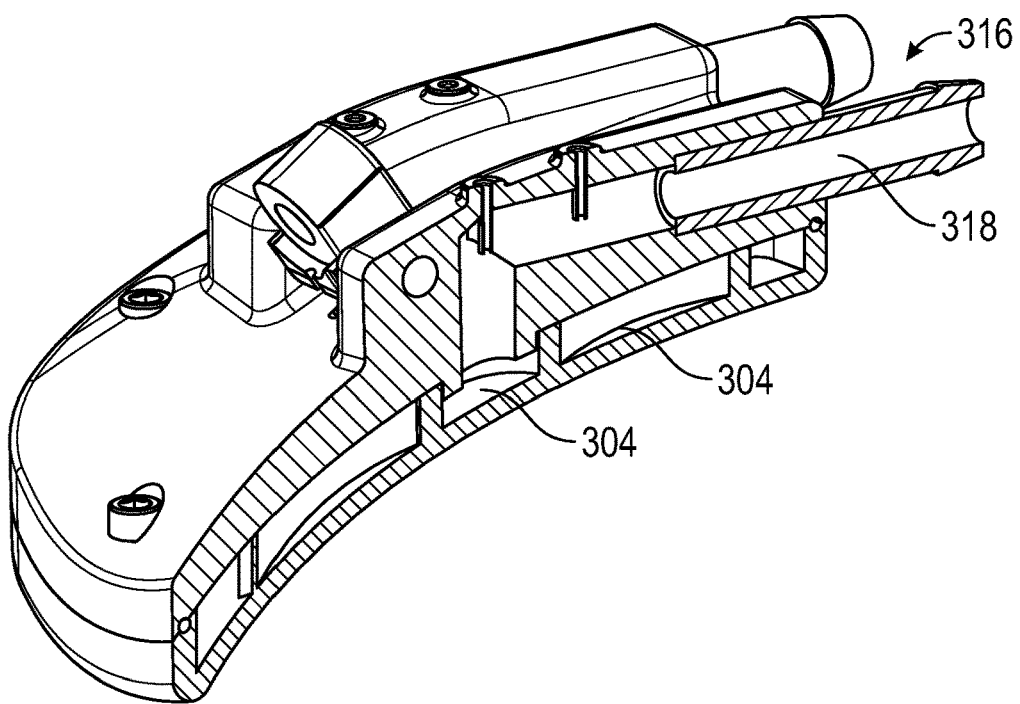

Referring to FIGS. 3A-3B, in addition to the fluid channel that is in the applicator 300, the other half of the applicator can include a plurality of ports 316 for making attachments to the fluid inlet and outlet tubes (not shown). This design allows the placement of one or two pairs of temperature sensors, typically thermistors, thermocouples, or semiconductor temperature sensors, to sense the temperature of the fluid at the inlet and the outlet. For example, the temperature sensors can be placed within the ports near where they connect to the inlet and outlet tubes, or alternatively, can be placed within the applicator itself. For example, they can be placed at or near inlet 208 or outlet 210 in FIG. 2B. The cross-sectional view in FIG. 3B shows the flow channel 304 within the applicator, along with outlet 310 within the applicator that leads to an outlet lumen 318 which exits through a port 316 and into the outlet tube (not shown).

Figure 4A:
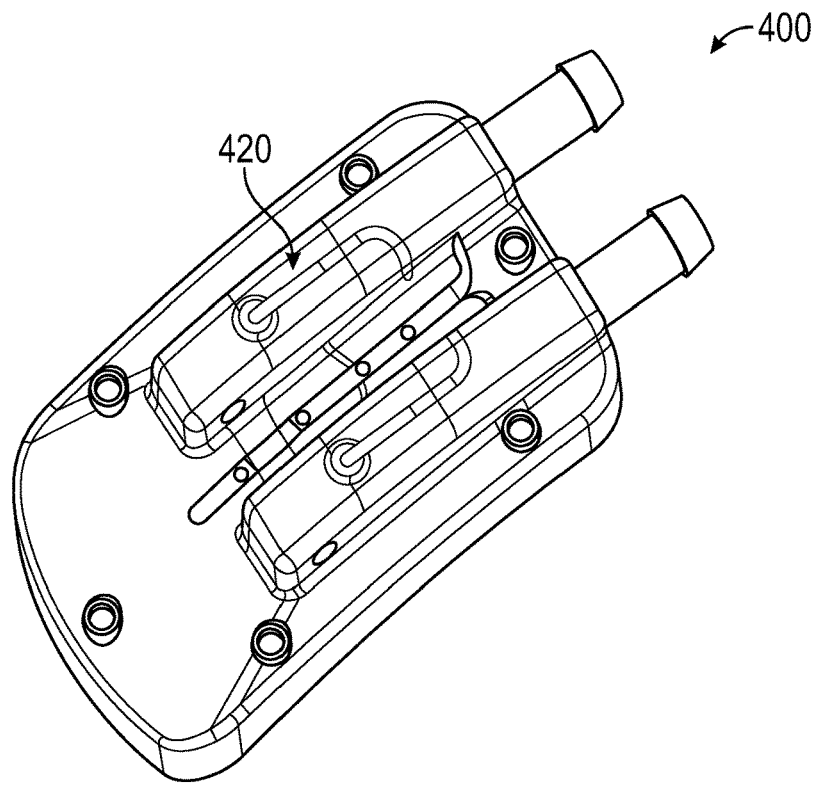
FIGS. 4A-4B show an applicator with sensors disposed on a bottom (e.g., tissue contacting) portion.
Figure 4B:
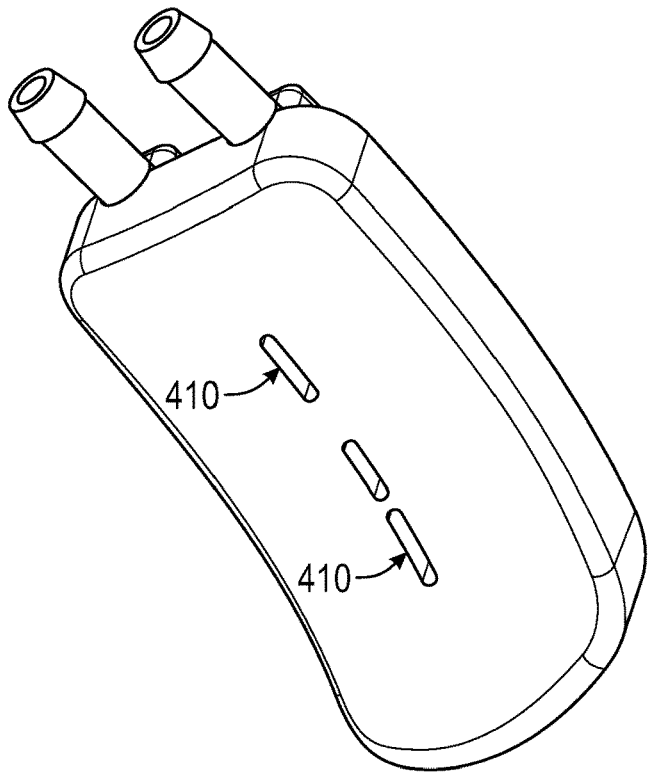

Additional passages can be provided on or within the applicator to allow the placement of sensors on the bottom surface of the applicator, such that the wiring for these sensors can come from the top side of the applicator, as it can be seen in FIGS. 4A-4B. Referring to FIG. 4A, leads 420 within the top half of the applicator 400 can pass through to the bottom half of the applicator terminating in sensors 410, which can be, for example, temperature sensors configured to sense the temperature of the target tissue. These sensors may be connected to an arm of the applicator by way of an electrical circuit, for example, an incorporated flex circuit within the arm of the device. In this implementation, although the passageways for the wiring allow the travel of the wires for the temperature sensors from the top side to the bottom side, these passageways are not in contact with the fluid channel that is within the applicator.

Figure 5:
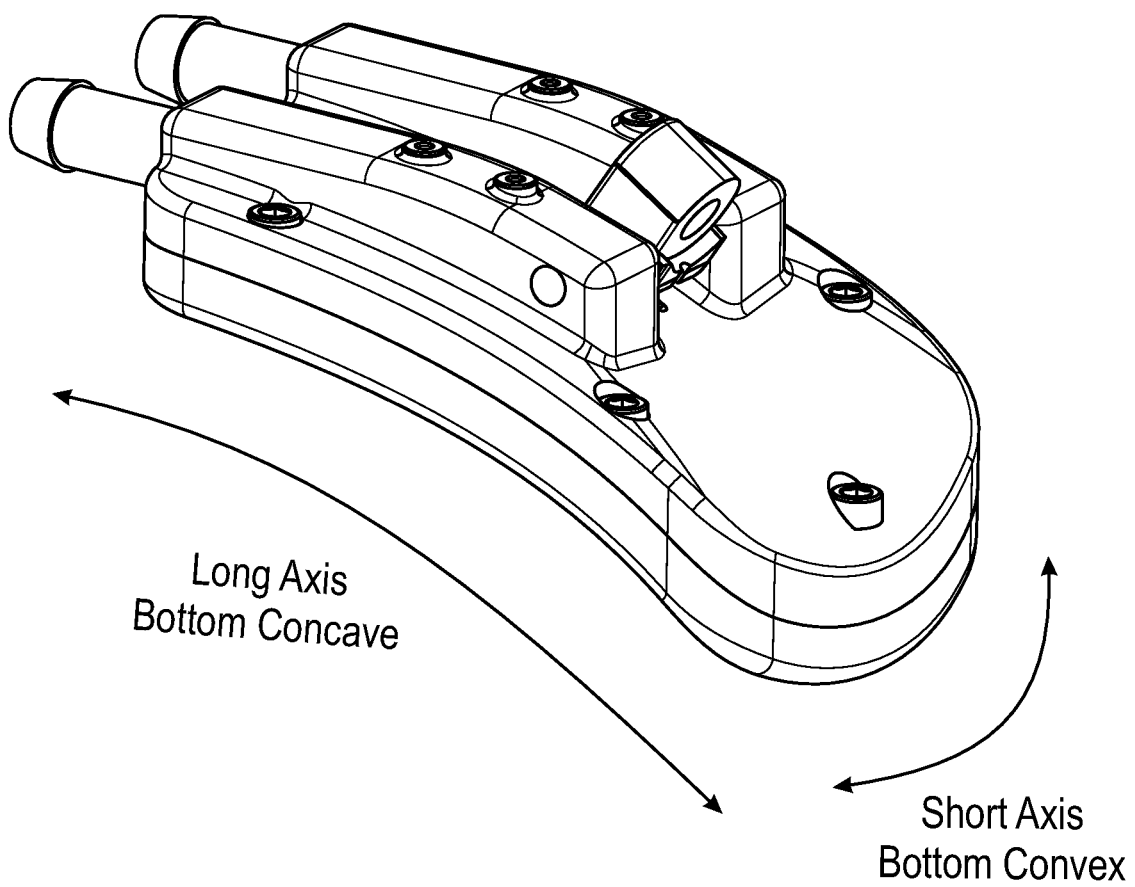
FIG. 5 illustrates one embodiment of an applicator.

The applicator bottom surface (e.g., tissue contacting surface) can have many shapes. In one embodiment, shown in FIG. 5, the curvature of the device along its long axis is such that it has a concave surface with decreasing radius of curvature (more curved) toward the distal end, which is configured to be placed in the posterior part of the mouth. In this embodiment, the cross-sectional view of the applicator along its short axis, which is parallel to the coronal axis of the body when the device is placed in the mouth, has a convex curvature. This design allows the applicator to press down on the tongue and make firm contact with the tongue tissue. The typical long axis length of the applicator is 45±30 mm and short axis length of 28±18 mm.

Figure 6A:
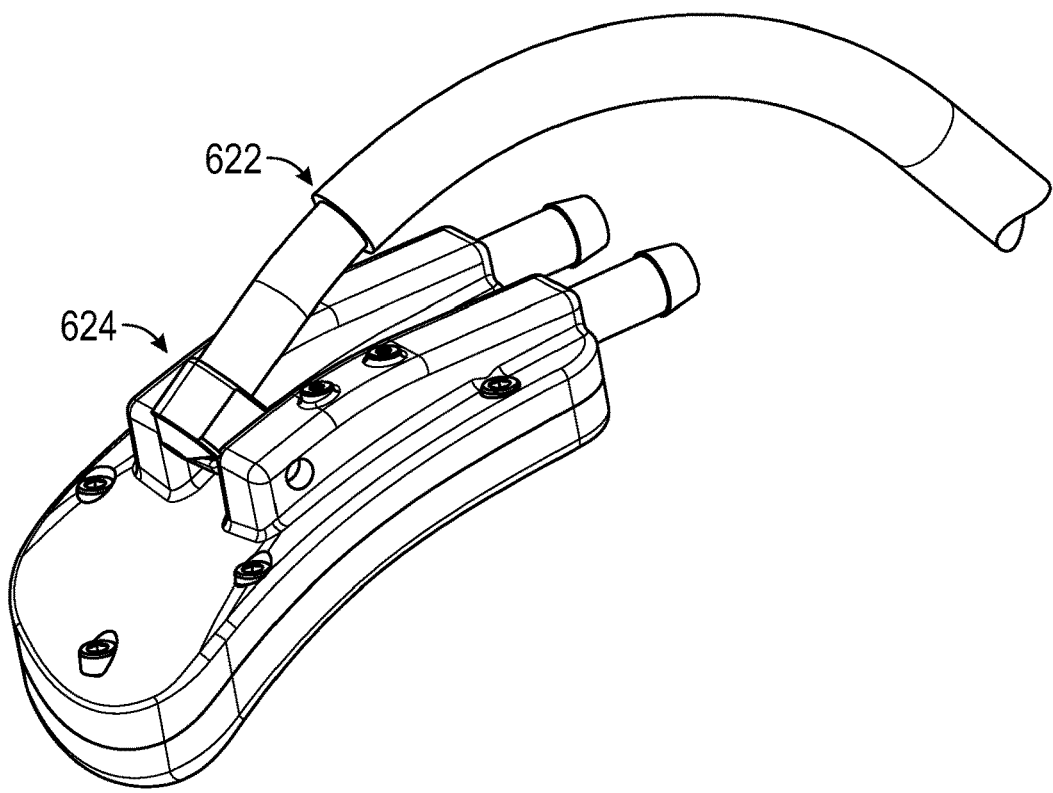
FIGS. 6A-6B illustrate an applicator that is attached to a fixation arm with a joint.
Figure 6B:
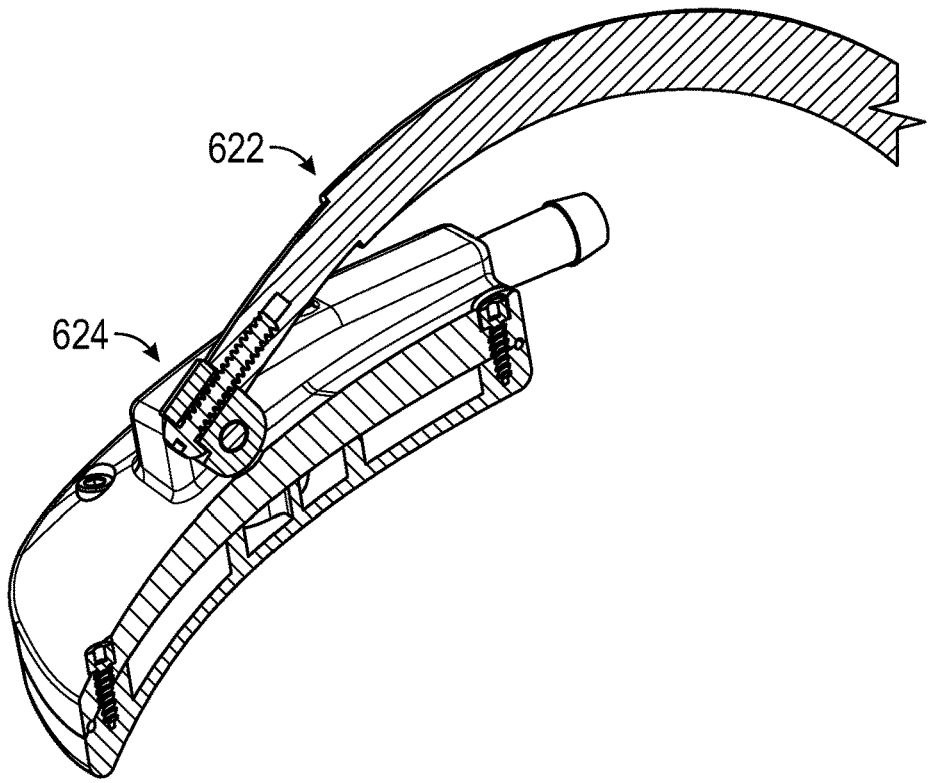

Referring to FIGS. 6A-6B, the applicator can be attached to a fixture arm 622 via joint 624 that might have 1, 2, 3, or more degree of freedom, i.e., pitch, roll and yaw. In one embodiment, the arm and joint can comprise a gimbal type attachment that allows the force that is applied by the fixture arm to be distributed more uniformly over the target tissue surface. The fixture arm might have many different shapes and curvatures, which is determined based on the rest of the fixation system, also known as the force traction system, which is described in detail below.

Figure 7A:
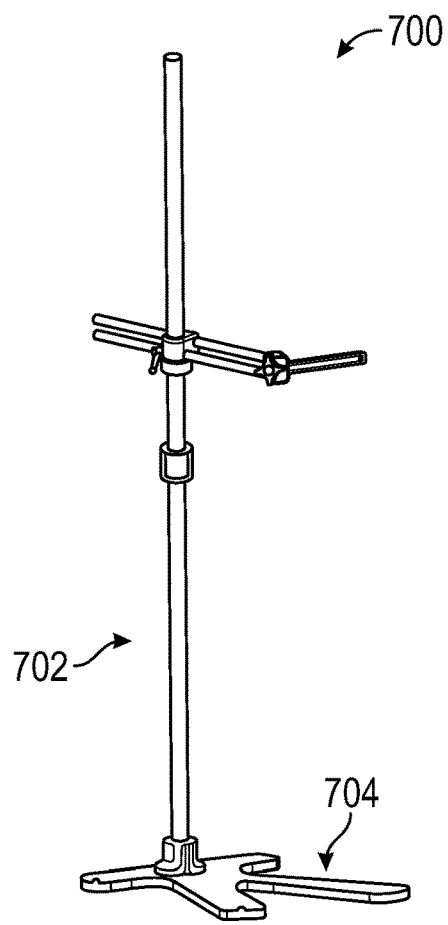
FIGS. 7A-7C illustrate one example of a force traction system with an attached alignment gauge.
Figure 7B:
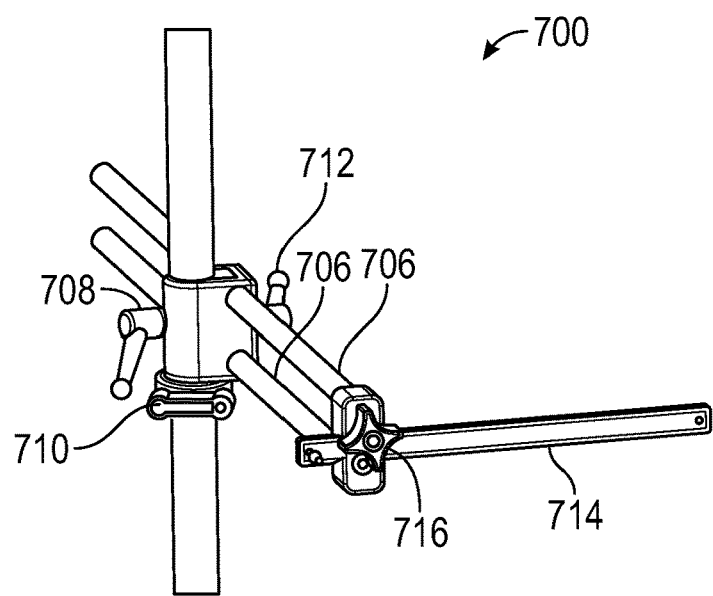
Figure 7C:
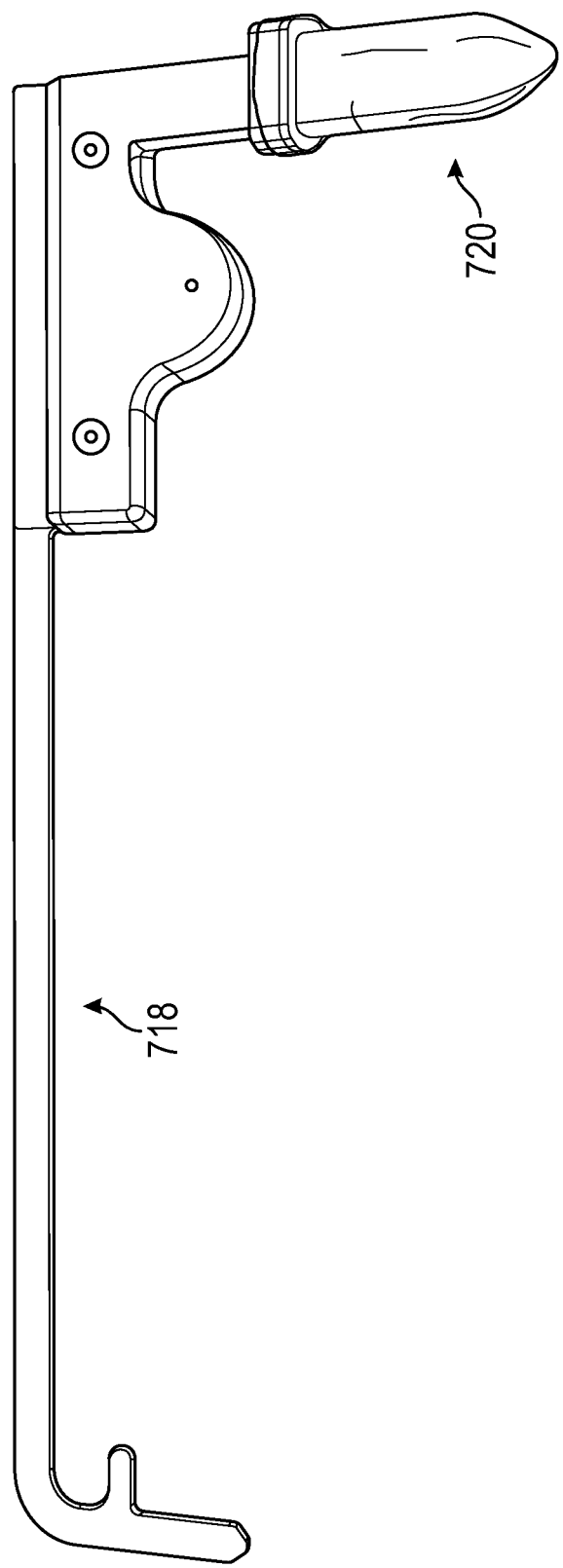

FIG. 7A-7C illustrates one embodiment of the mechanical design of a fixture arm or force traction system 700. FIG. 7A provides detail of the overall stability of the stand, in which a traction stand 702 can be connected to a baseplate 704, or attached to a surgical table or other structure, such as a Mayo stand or tray, depending on the height and stability of the stand. The Mayo tray may be positioned over the patient in order to allow proper positioning and stability of the alignment gauge.

FIG. 7B provides additional mechanical details of the force traction system. A crossbar 706 can be used to connect the traction rail 714 to an alignment gauge 718 (FIG. 7C) of the sleep apnea device. The crossbar may be held in place along the Z-axis by a crossbar upright lock 708, allowing motility to provide adjustment in height based on the patient's chest depth while also facilitating 360-degree rotation. This rotational maneuverability facilitates placement of the traction frame 704 but allows the frame to be out of the operating field during placement. A crossbar collar 710 may also be placed along the traction stand 702 to restrict movement of the crossbar 706 along the Z-axis. This placement ensures the crossbar 706 will not injure the patient if the crossbar upright lock were to malfunction. The crossbar 706 may also have a crossbar extension clamp 712 to allow extension and retraction of the crossbar 706 to aid in proper placement of the sleep apnea device. A traction rail 714 can be connected to the crossbar 706 by way of a traction rail locking knob 716.

Referring to FIGS. 7B and 7C, traction rail 714 can be used as a guiding agent for an alignment gauge 718 of the sleep apnea system, where the traction rail locking knob 716 stabilizes and locks the traction rail 714 into place. This traction rail 714 allows for angular and positional alignment along the frame with the arm guide. The alignment gauge can be inserted into or on the traction rail 714 to properly position the patient relative to the force traction system prior to treatment. Then the alignment gauge 718 can be swapped out for the sleep apnea treatment device (including the applicator and arm described above) for perfect alignment of the sleep apnea treatment device (including the applicator) and treatment and therapy can begin. A probe cover 720 (FIG. 7C) may be placed on the alignment gauge to prevent cross contamination during the exam.

Figure 8A:
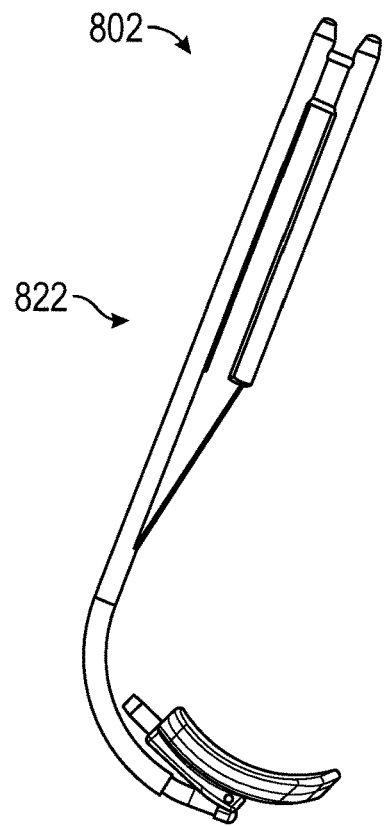
FIGS. 8A-8B illustrate a close-view of the arm of a sleep apnea treatment system.
Figure 8B:
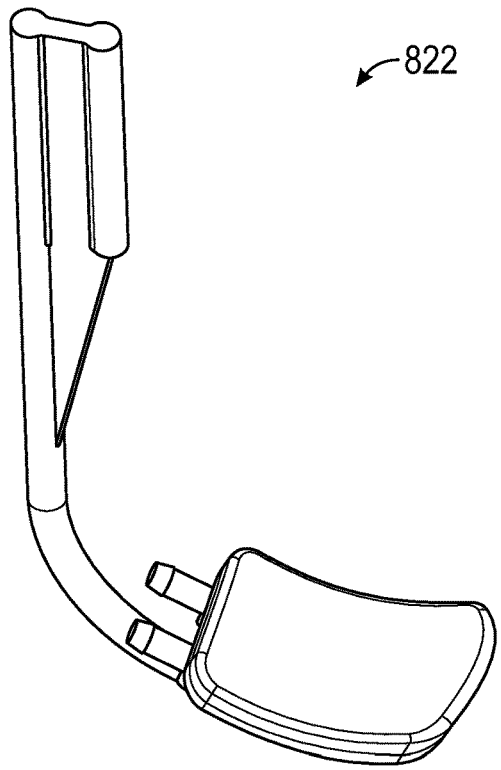

FIGS. 8A-8B illustrate a close-view of a fixture arm 822 of the sleep apnea system, which can include an attachment point 802 for the constant force system described above and to the applicator. The arm can have a profile/radius that corresponds with the radius of the human hard palate. Referring to FIG. 8B, the arm can include a cross-section that provides guide features that provide stability and eliminate unintended rotation.

Figure 9:
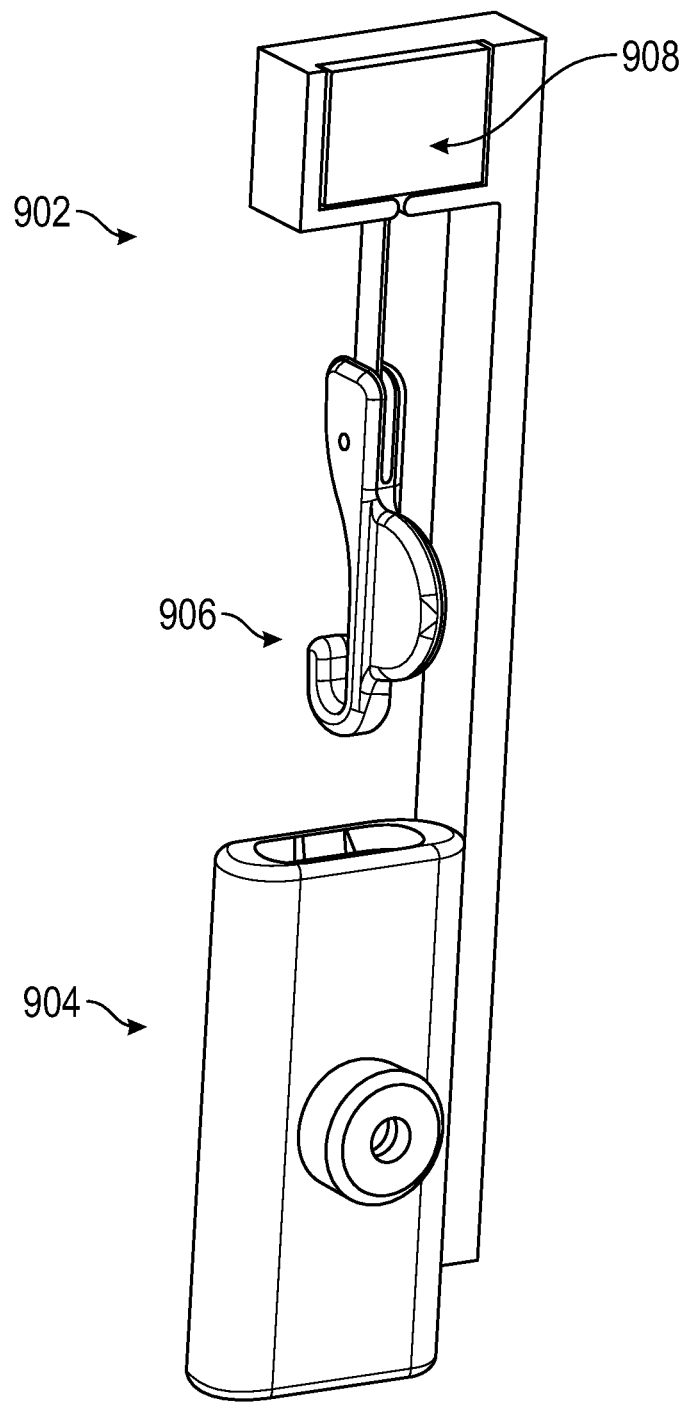
FIG. 9 is a close-up view of a constant force system.

FIG. 9 is a close-up view of a constant force system 902, which can include an arm guide 904 configured to receive the arm of the sleep apnea treatment system. The constant force system can be attached to or integrated within the fixture arm or force traction system described above. The arm guide can include a threaded hole and locking knob configured to lock the arm into place. The constant force system can further include a hook 906 that attaches to the arm and a constant force spring 908 which is configured to pull on the hook and arm. When the constant force system 902 is connected to the arm of the sleep apnea treatment system, the constant force system is configured to apply a constant force to the sleep apnea treatment device, so as to maintain a constant force/pressure between the applicator and the tissue. In one embodiment, the hook and arm of the constant force system can be configured to interface with a corresponding feature on the sleep apnea treatment device (e.g., on a proximal end of the arm of the applicator) to ensure that the applicator applies a constant force to the tissues of the patient.

FIGS. 10A-10D illustrate additional embodiments of force traction systems. The embodiment of FIG. 10A allows for adjustability along the XZY axis. This embodiment includes a traction stand 1002, a baseplate 1004, a crossbar 1006, and a traction rail 1014 that is configured to receive an alignment gauge of the sleep apnea treatment device, as described above. As shown, the force traction system provides superior/inferior adjustment 1016 of the alignment gauge. This embodiment can be side mounted to allow easier patient placement under the system. In one example, the pivot points can be smaller or closer to the size of the device to minimize bulkiness.

Figure 10A:
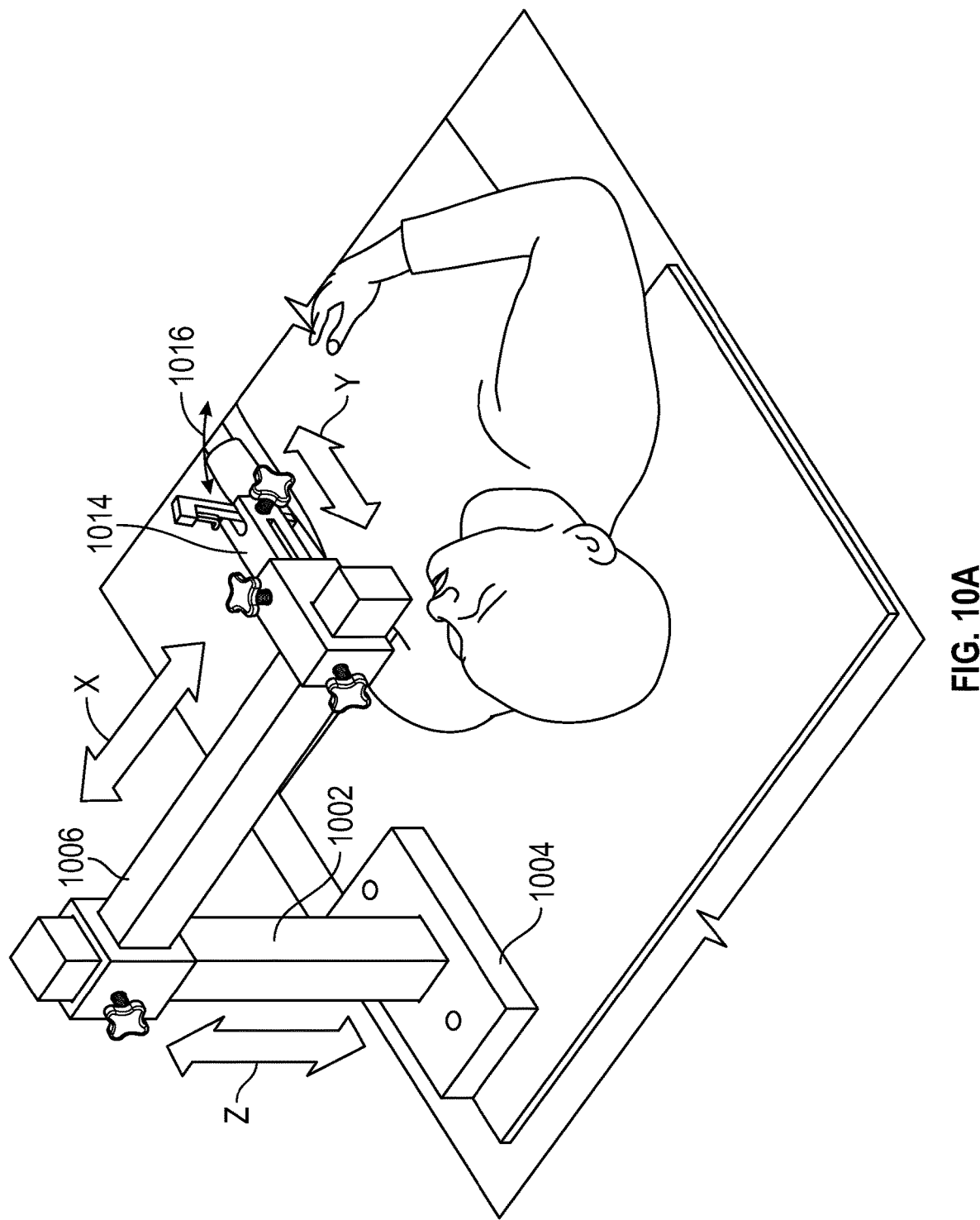
FIGS. 10A-10D illustrate embodiments of a force traction systems.
Figure 10B:
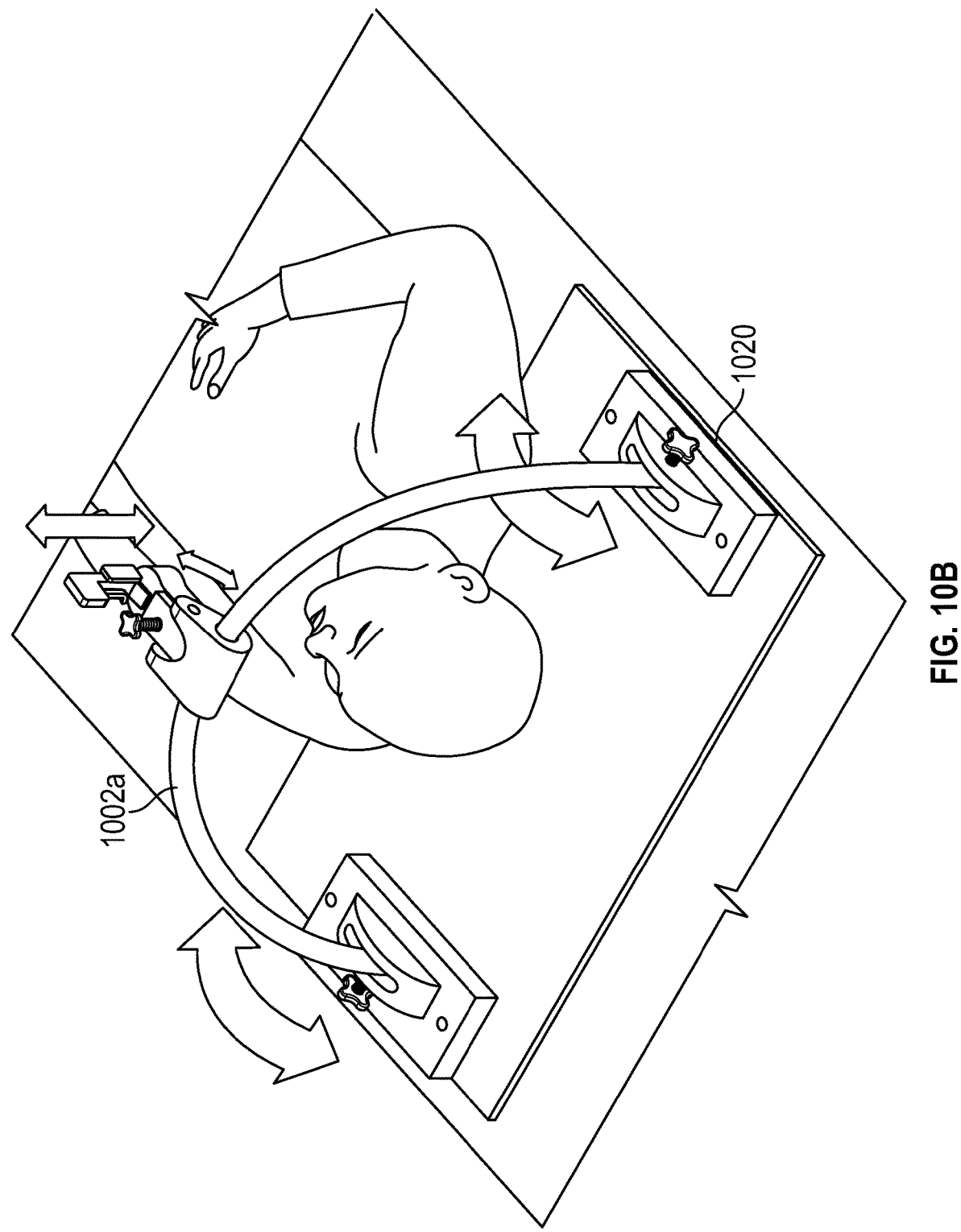

The embodiment of FIG. 10B provides an arc-shaped support 1002a in which the entire fixture pivots 1020 at the base for ease of positioning around the patient. The pivot can not only adjust the height of the arc-shaped support with respect to the patient, but also the angle of the arm to the patient.

Figure 10C:
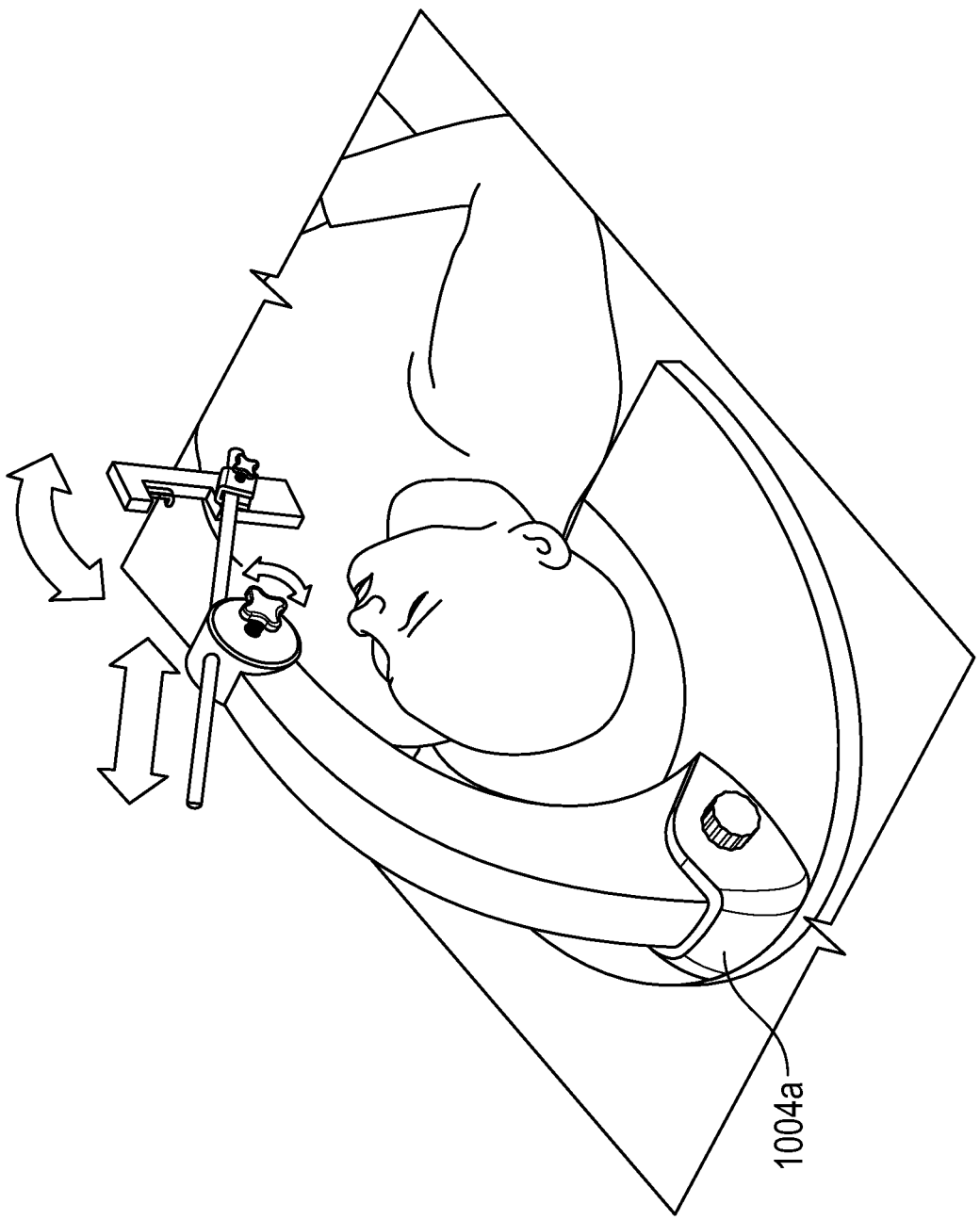

The embodiment of FIG. 10C includes a plate 1004a that holds the patient's head and provides stabilization for the fixture. The system can pivot at the plate to allow for length and angle adjustability. The length and pivot may include separate locks.

Figure 10D:
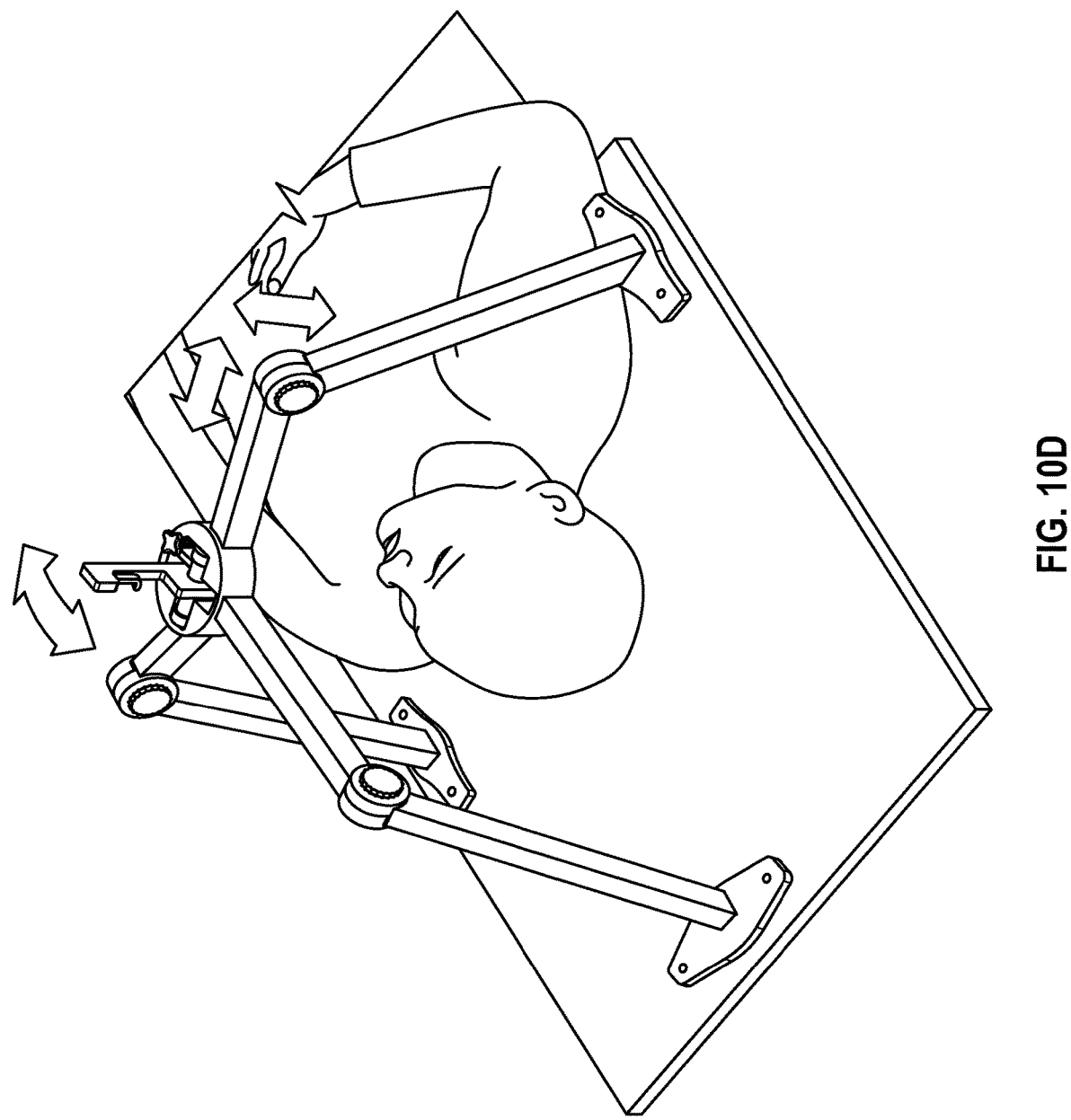

FIG. 10D illustrates another embodiment of the force traction system which can include a tripod design which provides for exact positioning around the patient. Each leg of the tripod can be pivoted and locked in place during positioning.

Figure 11:
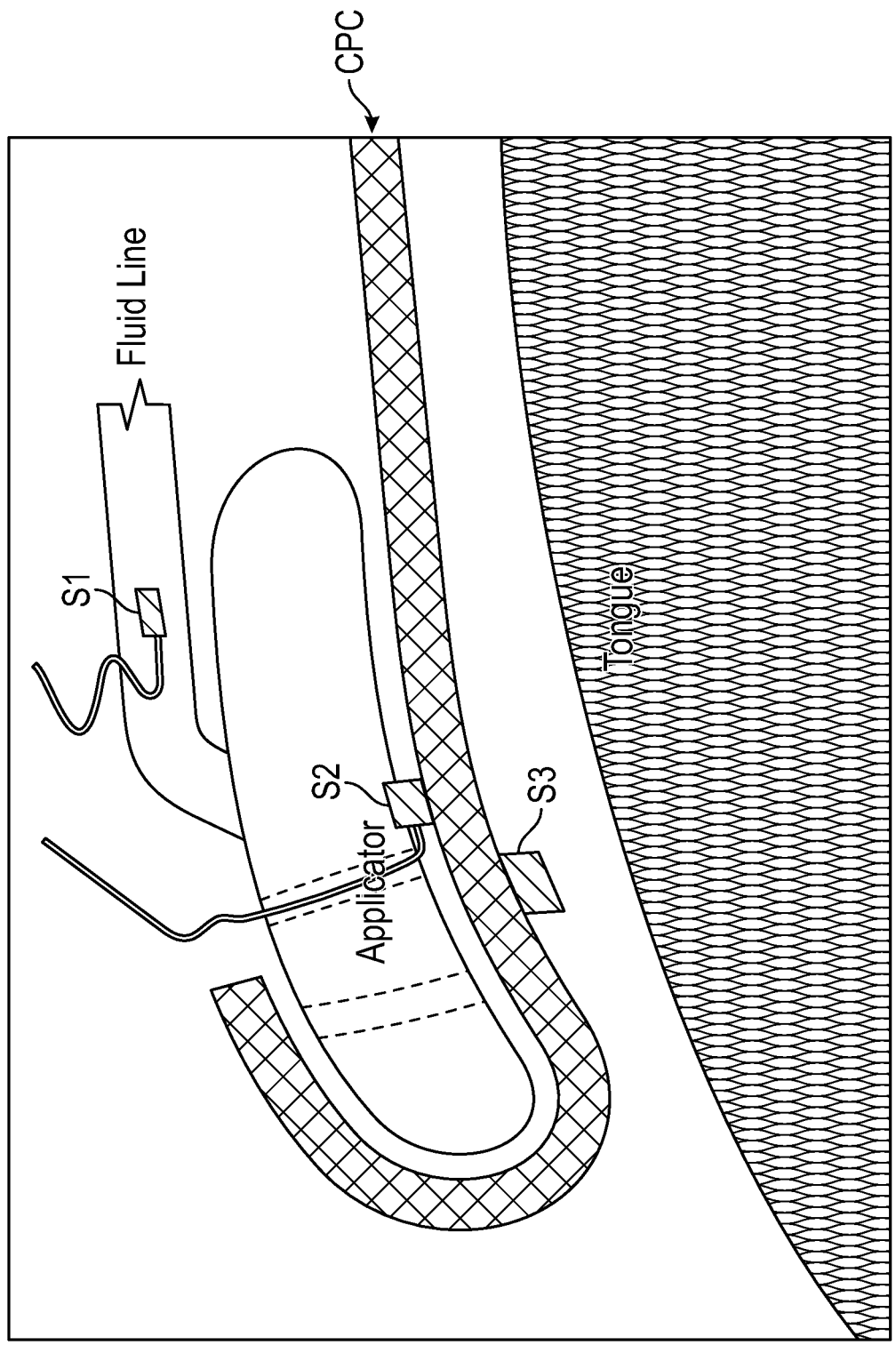
FIG. 11 shows one example of the placement of temperature sensors in and around an applicator.

FIG. 11 shows one example of the placement of temperature sensors in and around an applicator. Briefly, a cryoprotectant combination (CPC) which will be described later, is placed around the applicator. In FIG. 11, the CPC is shown as the cross hatched area Inline temperature sensors, such as S1, can be used to measure the temperature of the fluid that is passing through the inlet and outlet ports of the applicator. Block surface temperature sensors, such as S2, can be used to measure the temperature of the applicator surface while the tissue temperature sensors such as S3 are used to measure the surface temperature of the tongue. In some embodiments, silicon may be placed between the sensors and applicator face. While the block temperature sensors can be adhered to the surface of the applicator, the tissue temperature sensors may be stitched to the fabric of the cryoprotectant combination (CPC). Although there is no limit to how many temperature sensors can be used, in one example 5 sensors can be used in the applicator and CPC, where the first sensor is used to measure the fluid temperature at the inlet, the second at the outlet, the third sensor at the face of the applicator to measure the block temperature, and the last two attached to the CPC to measure the issue temperature.

Cryoprotectant combinations (CPC) can include a cryoprotectant agent and fabric sheet. A cryoprotectant agent can be pure glycerin or glycerol, or propylene glycol or any other non-toxic cryoprotectant compound, natural or synthetic, that reduces ice formation in tissue at low temperatures, such as ethanol mixed with distilled water. The fabric sheet can be a porous textile material, made out of natural or synthetic fibers with overall sheet thickness in the order of 0.1 to 1.0 mm, preferably 0.4 to 0.5 mm. The fabric sheet can be wrapped around the applicator and fixed mechanically or manufactured in the form of a sleeve and placed around the applicator followed by cinching of a pre-installed thread for securing it in place. In either case, the fabric sheet that is soaked in cryoprotectant agent is used as a carrier for the agent.

Cooling and the heating of the applicator is provided by convection where the fluid that is chilled or heated elsewhere is pumped through the applicator. Typically, the chiller is set at a temperature in the range of −25 C to −30 C to produce applicator surface temperatures around −22 C. By monitoring the temperature difference between the inlet and outlet fluids and knowing the flow rate, one can determine the amount of heat being extracted by the applicator:

Heat extracted=(OutletTemp−InletTemp)×(SpecificHeatOfFluid)×FluidFlowRate.

Alternatively, one can calculate the heat extracted by monitoring the temperature differential between the Tissue Temperature Sensor and the Applicator Temperature Sensor, S2 and S3 in FIG. 11 respectively. In that case: Heat extracted=(TempS3−TempS2)/(ThermalResistanceOfCPC). Another option for the calculation of the heat extracted is the monitoring the temperature differential between the Coolant Temperature and the Applicator Temperature Sensor, S1 and S2 in FIG. 11, respectively. In that case: Heat extracted= (TempS2−TempS1)/(ThermalResistanceOfApplicatorBase).

Monitoring of the temperatures during a clinical procedure provides additional utility for device function. For example, a reading where one Tissue Temperature Sensor on the face of the applicator indicates a much colder temperature at a location compared to another Tissue Temperature Sensor might suggest that the applicator may not be making a firm, contact with the tissue at the location of the first Tissue Temperature Sensor, thus not uniformly distributing the cooling agent on the desired regions. Significant differences in the measured temperatures by tissue temperature sensors, such as 2° C., may indicate insufficient treatment being applied, and may necessitate corrective actions by the operator or the controller, such as the removal of the excess fluids in the oral cavity or additional reductions in the temperature settings.

Monitoring of the temperatures during a clinical procedure provides additional utility for therapeutic efficacy. For example, oscillations and notches that are seen in Applicator Surface Temperature Sensors or Tissue Temperature Sensors might indicate that the deeper tissues may not be freezing completely. This could be caused when the applicator is not sufficiently cold to freeze the deep tissues and keep them frozen. Initially, the deeper tissues may freeze, but since solids conduct heat better than the liquids, warmth from even deeper tissues may reach to the frozen section causing it to thaw. Thermal resistance of the thawed tissue increases, allowing it to freeze again, and the cycle repeats and resulting in the observation of thermal oscillations, which reduces the effectiveness of the adipocyte cryolysis. This freeze—thaw cycle can be avoided by lowering the applicator temperature to halt the oscillations to keep the deeper tissues in frozen state and reduce the number of phase changes. Hence, during a clinical procedure, one can monitor the Applicator Surface Temperature and/or the Tissue Surface Temperature, and upon the observation of an oscillation, intervene by reducing the chiller temperature and/or increasing the fluid flow rate to increase the rate of heat extraction.

Warming of the applicator during treatment can occur in a number of ways. A first option is to produce a warming curve in which the warmth is applied fast at first and then slowed down, without going above 37° C. A second option is to apply warmth as fast as possible to 40° C. For situations of re-warming, a PID control system may be used to achieve a specific rate of change or used to produce a curved that fits to a predefined curve with various rates. For example, a first rate that is very fast followed by a second rate that is much slower. To further utilize the warming procedure, the energy required to warm the tongue and/or the slope rate of warming the tongue could be used to calculate how much the tongue was cooled, as an efficacy indictor to verify good treatment. In one example, this could be calculated by mathematically measuring the area under the curve to assess how much cooling agent was applied to the tissue.

Warming of the applicator during an emergency or at the end of the clinical treatment must be done at a high rate also to minimize the unintentional damage to the tissues that are near the surface. Minimum heating rate is 0.25 C/sec, preferably 0.4 C/sec or higher. This can be done by flowing warm fluid in the applicator. Heating for this can be a direct inline heater, a heating reservoir or an aluminum bead reservoir which has the additional advantage of eliminating the need to store water. Having a heater that stores a warm mass with large heat capacity is beneficial in case of loss of heating ability or partial power failure. Similarly, a direct inline chiller or a cold reservoir may also be maintained in the case of an emergency where the tissue cooling demand during the initial part of the treatment exceeds the capacity of the chiller.

There are additional clinical tools that can be used during the treatment procedure. One of them is the cryoprotectant brush that can be used for the application of the cryoprotectant agent to the all oral structures, such as the vallecula, tongue, epiglottis and even the palate. The brush can have bristles, or could be shaped as round or oval structure resembling a large Q-tip or look like a back scrubber. In either case, a cryoprotectant brush can be dipped into the cryoprotectant agent, and rubbed against the oral structures before the procedure to coat them with the cryoprotectant agent.

Figure 12:
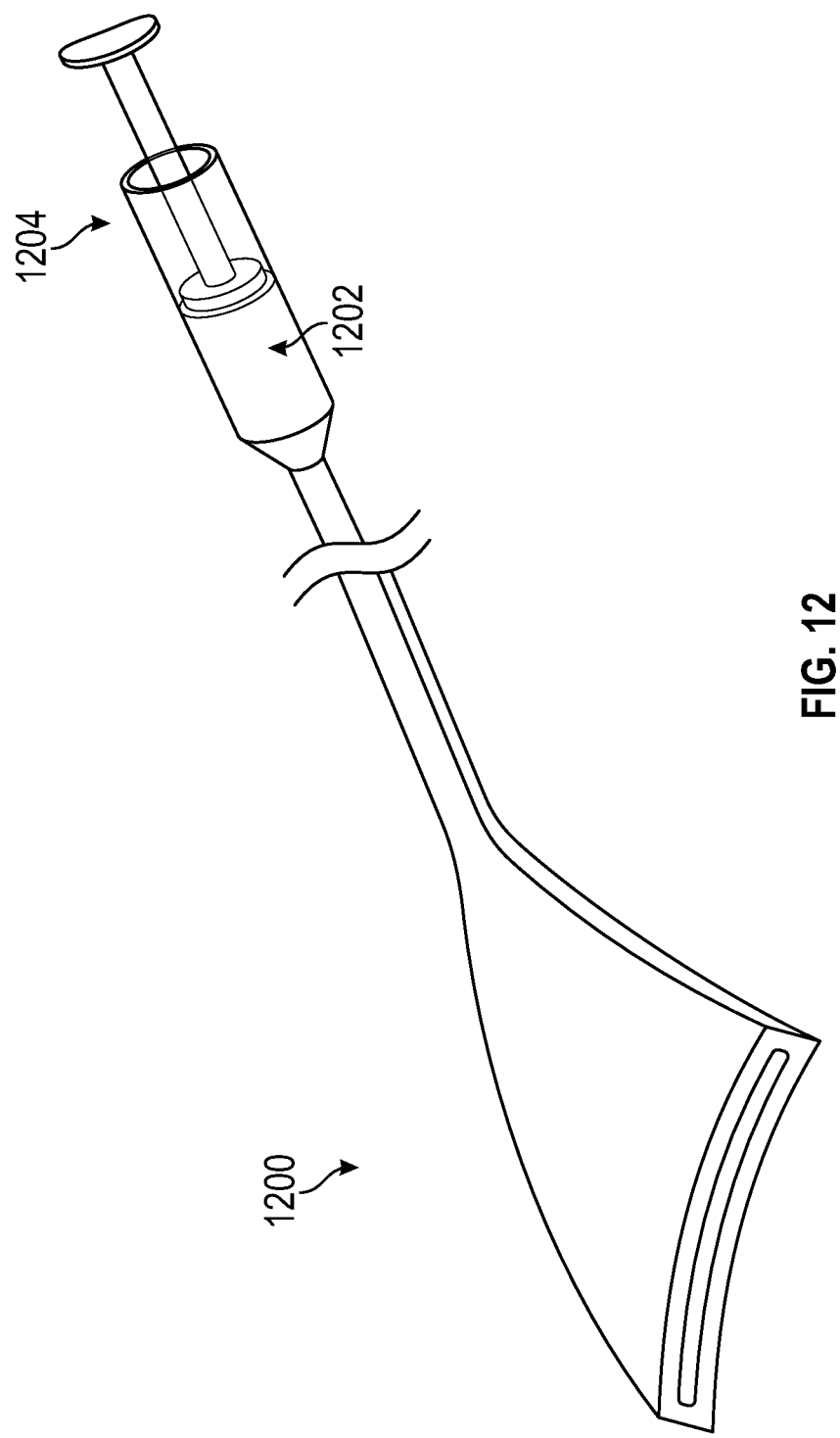
FIG. 12 illustrates another device that can be used for the preapplication of the cryoprotectant agent in the shape of an oral spatula.

Another device that can be used for the preapplication of the cryoprotectant agent is an oral spatula 1200 as illustrated in FIG. 12. The illustrated device can be fairly flat and used to reach to the back of the mouth to deliver cryoprotectant agent 1202 that is pushed in from a proximally mounted syringe 1204. This device has the advantage of delivering known amounts of cryoprotectant agent to desired locations.

Figure 13:
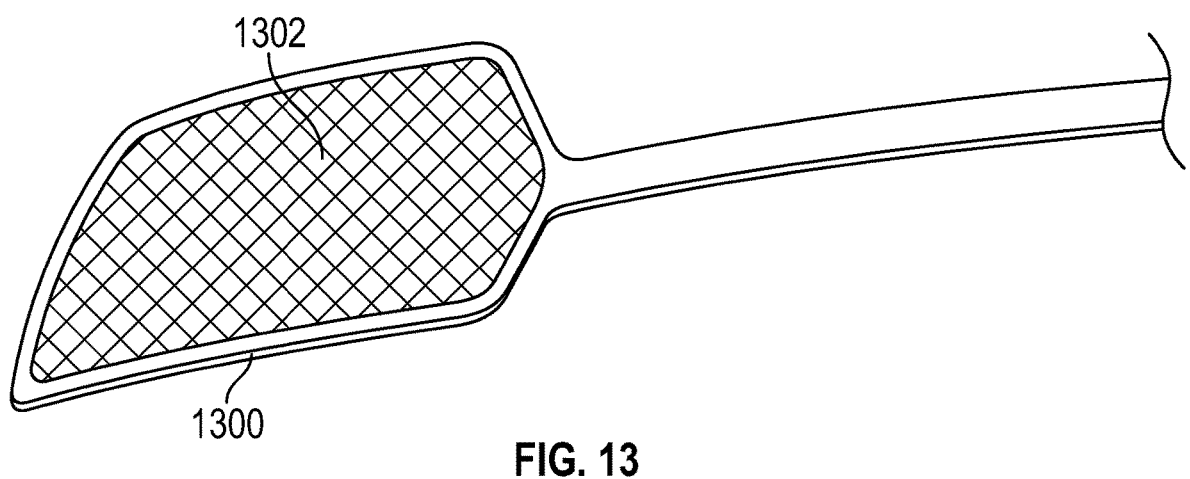
FIG. 13 illustrates another device for the preapplication of cryoprotectant.

An alternative, and simpler device is shown as cryoprotectant applicator 1300 in FIG. 13. This device resembles a fly swatter where a relatively rigid frame, constructed out of metal or plastic is used to hold in place a mesh 1302 containing the cryoprotectant agent. In this case, the mesh can be first soaked in cryoprotectant agent, and then the entire device can be positioned on the tongue for a predetermined amount of time before the procedure to apply the cryoprotectant to the tongue surface.

Figure 14A:
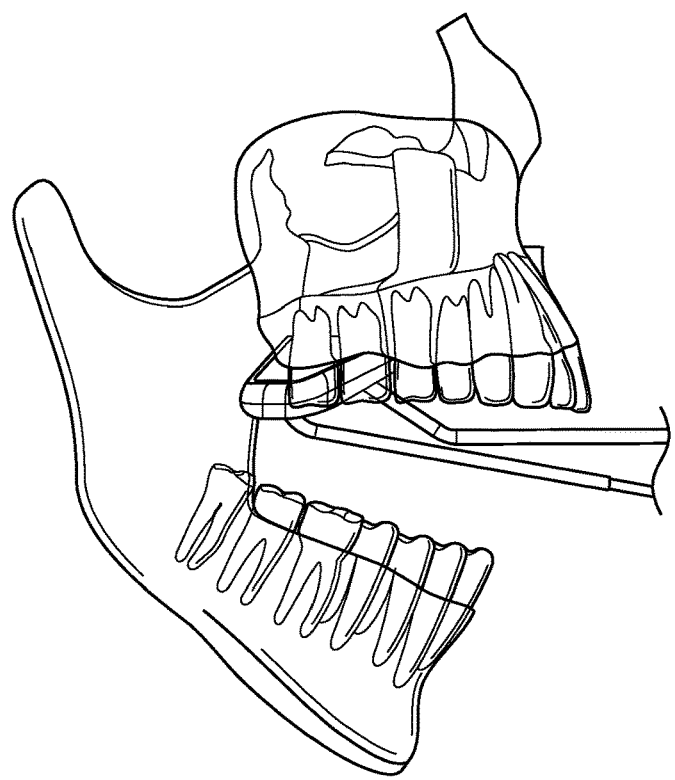
FIG. 14A-14E illustrate various additional embodiments of a noninvasive applicator.
Figure 14B:
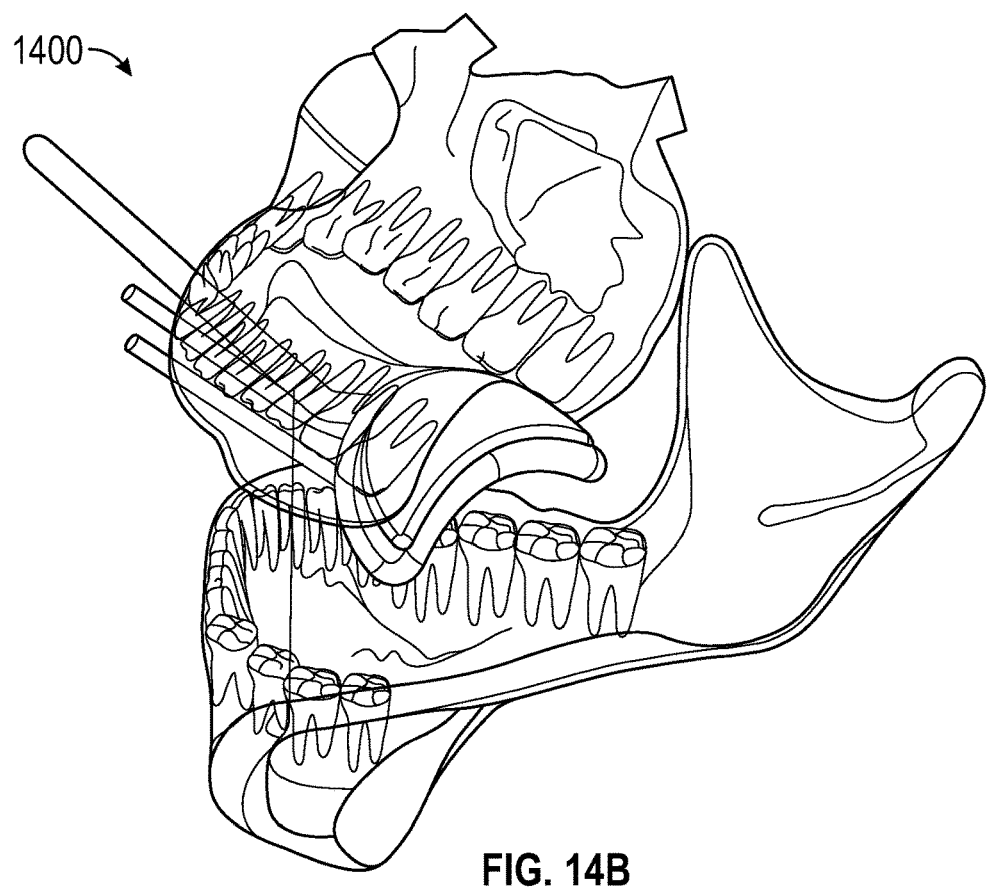

FIGS. 14A-14E illustrate various additional embodiments of an applicator designed to perform non-invasive cryolipolysis. Referring to FIGS. 14A-14B, the applicator 1400 can be designed and configured for reduction of fat at the palate. For example, referring to the embodiment of FIG. 14B, the applicator can have a generally semicircular shape configured to conform to the palate. In the illustrated embodiment, the applicator can be generally convex. As shown, the distal portion of the applicator that is placed in contact with the back of the mouth near the uvula can curve slightly inwards towards the applicator arm to avoid contact with sensitive tissues of the mouth.

Figure 14C:
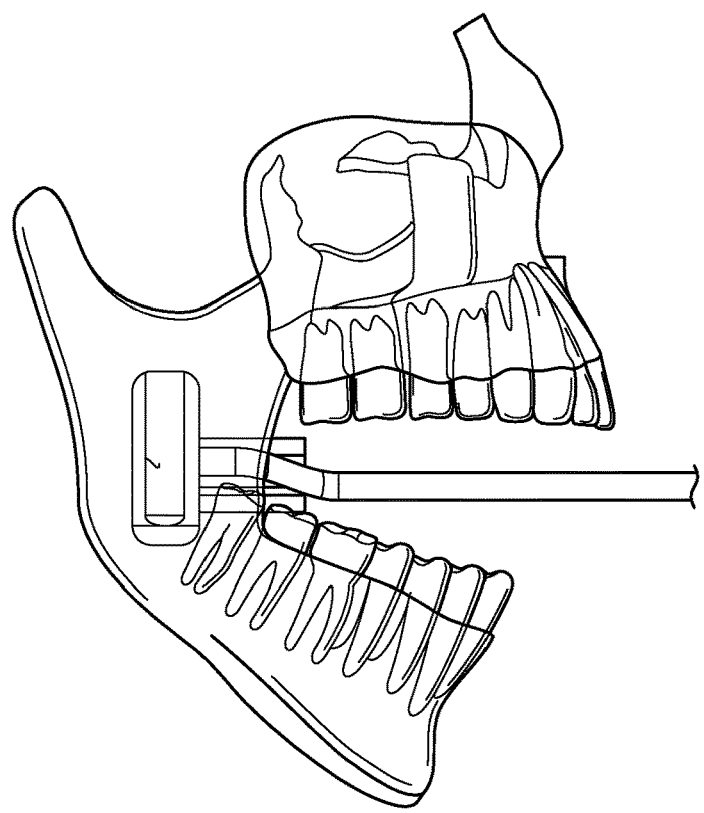
Figure 14D:
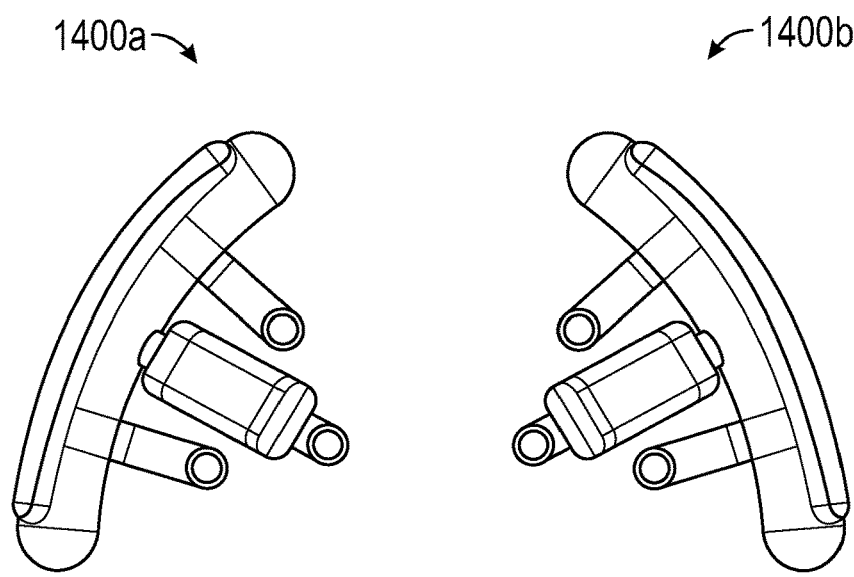
Figure 14E:
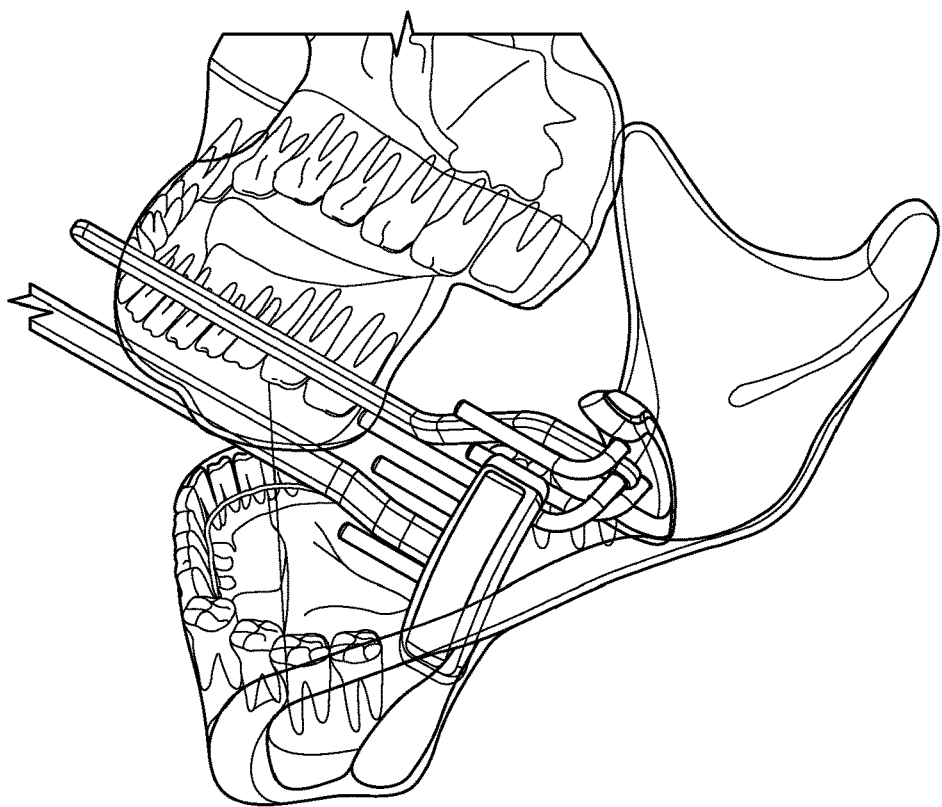

Another embodiment is shown in FIGS. 14C-14E of an applicator comprising two parts 1400a and 1400b is configured to treat the lateral walls of a patient. Referring to FIG. 14D, the applicator can comprise a pair of generally tubular applicators that can also be curved to generally conform to the lateral walls of the patient. Any of the applicators shown and described in FIGS. 14A-14E can be used with the sleep apnea treatment system described herein.

Figure 15A:
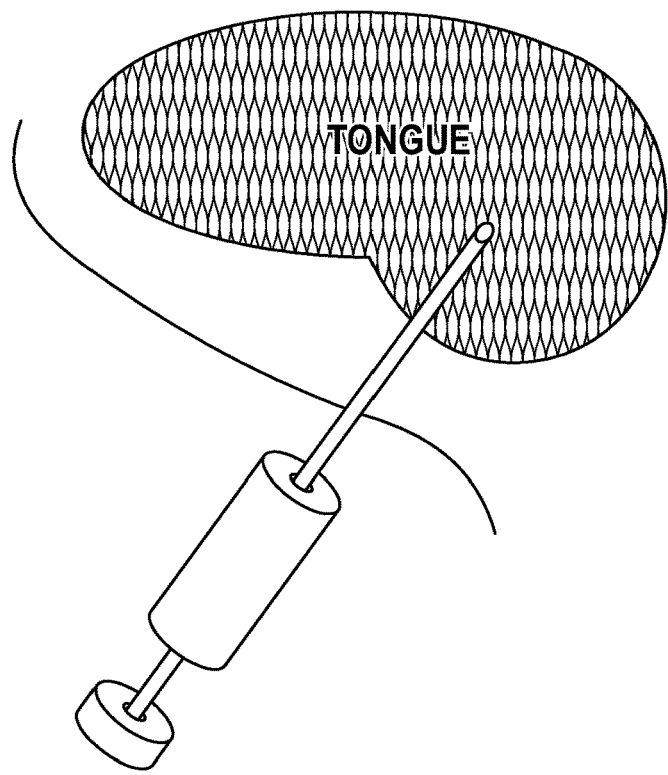
FIG. 15A-15B illustrate various embodiments of an invasive applicator.
Figure 15B:
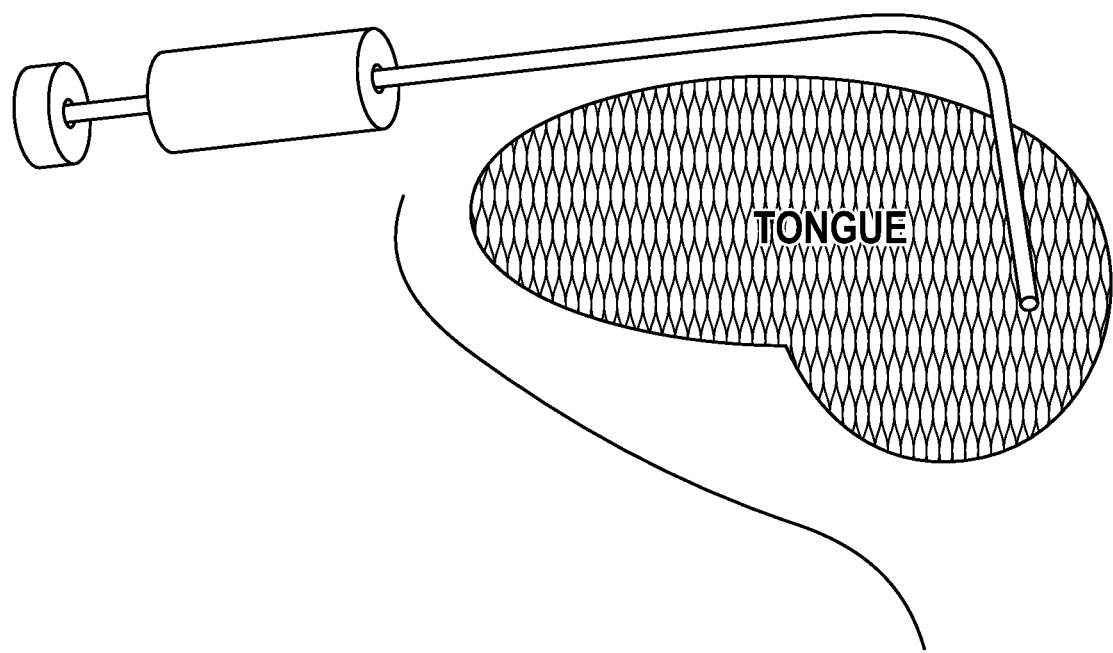

FIGS. 15A and 15B illustrate various additional embodiments of a needle applicator designed to perform invasive cryolipolysis. In such embodiments, the needle applicator may penetrate the tissue to deliver a cooling agent within the tissue. In some examples, this cooling agent may include of an ice slurry, composed of an ice content of preferably 20 to 40 percent, saline solution, and glycerol. In others, the needle applicator may penetrate the tissue to administer vasoconstrictors and cryoprotectants to reduce blood flow and prevent unwanted ice formation. The needle applicator may also penetrate and cool the tissue with surface contact.

Referring to FIG. 15A, a needle applicator can be introduced through the subcutaneous layer, under the chin and into the tongue, in order to penetrate the targeted tissue and administer a cooling agent. Referring to FIG. 15B, a needle applicator can be placed intraorally, injecting a cooling agent into the dorsal surface of the tongue. Although not shown, the needle applicator can be placed either midline or laterally through the lingual frenulum as well. Small needles can be used to inject the slurry directly into the soft palate, or to the lateral walls. Needle applicator may have a stopper to prevent over penetration, e.g., 2 mm, into the lateral walls to avoid contact with the carotid arteries. The needle applicator can be designed to target the vallecula area of the lateral walls with a padded device with curved needles. In some embodiments, these protruding needles could also be curved.

In such embodiments, the needle applicator is not limited to the number of penetrable attachments. The needle applicator may be detachable or attachable to the non-invasive applicator. Each penetrable attachment could be a different length, shape, or circumference. For example, the penetrable needle could be straight or curved. The needle applicator may contain sensors at or near the needle tip in order to measure temperature, flow rate, depth of the needle, or pressure. Multiple attachments could also be applied to the needle applicator to improve the efficacy of the penetration. For example, in one embodiment a needle applicator could incorporate a suction system using a porous foam or plastic material that is not highly thermally conductive to pull the applicator to the tissue firmly. Once properly placed, the needle applicator may then inject small short needles into the tissue to administer a cooling agent to the targeted area. In another embodiment, a micro pump and syringe pump could be used in order to carefully monitor the amount and infusion rate of the cooling agent. In addition to, temperature sensors—which are typically thermistors—may record measurements at or near the needle tip and induce changes on the flow rate depending on the readings. In one example, if the temperature senor measured that the injection of the cooling agent was too warm, the flow rate could then be increased to maintain −5° C. In another embodiment, the needle applicator could consist of a vacuum insulated needle in order to protect the tissue that the needle passes through and to keep the liquid as cold as possible until it reaches a targeted tissue.

Figure 16:
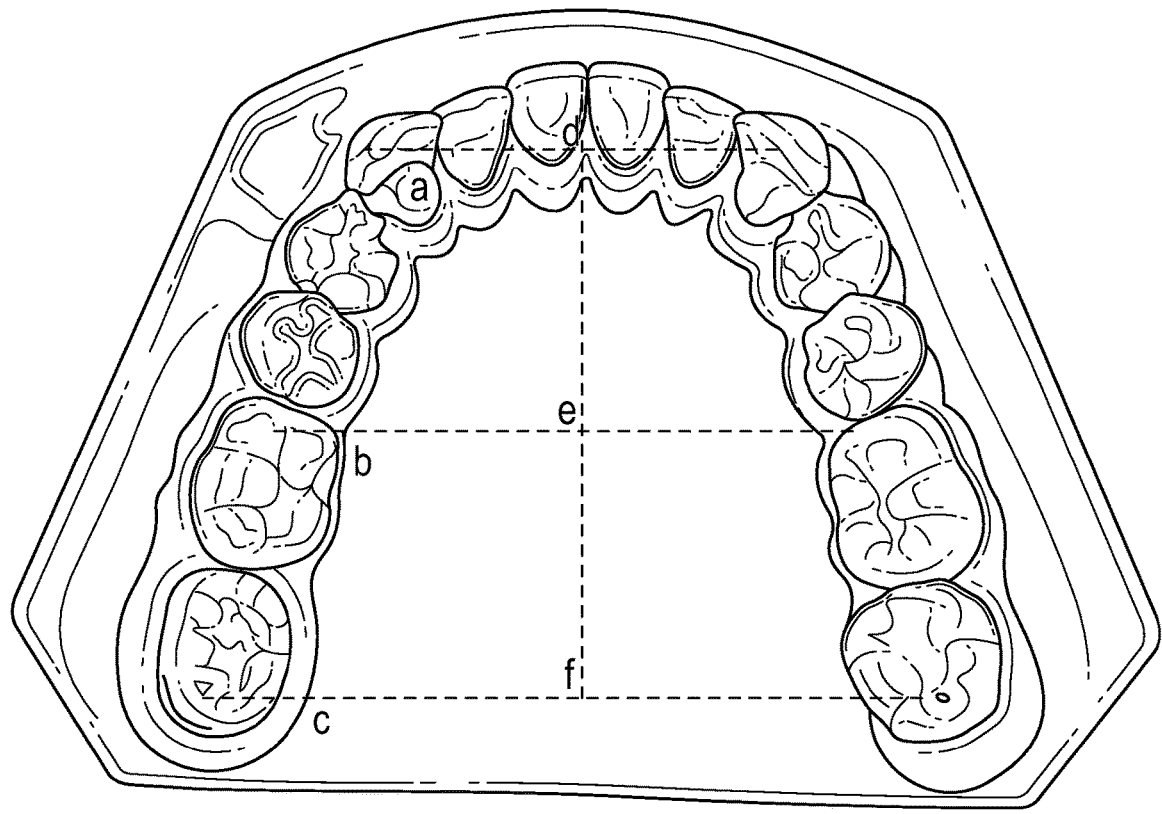
FIG. 16 illustrates on example of various dimensions of an applicator based on the mean dimensions of a human patient's mouth.

FIG. 16 illustrates an example of various dimensions of a group of human patients' mouth that can be used for the design of an applicator. The size of the tongue, and thus the size of the applicator, is limited by the size of other oral structures. Applicators according to the present disclosure can be designed at different sizes, including having widths ranging from 20 mm to 40 mm and so on. Alternatively, the applicator can be designed small enough to fit the majority of the population, e.g., 90%.

Figure 17:
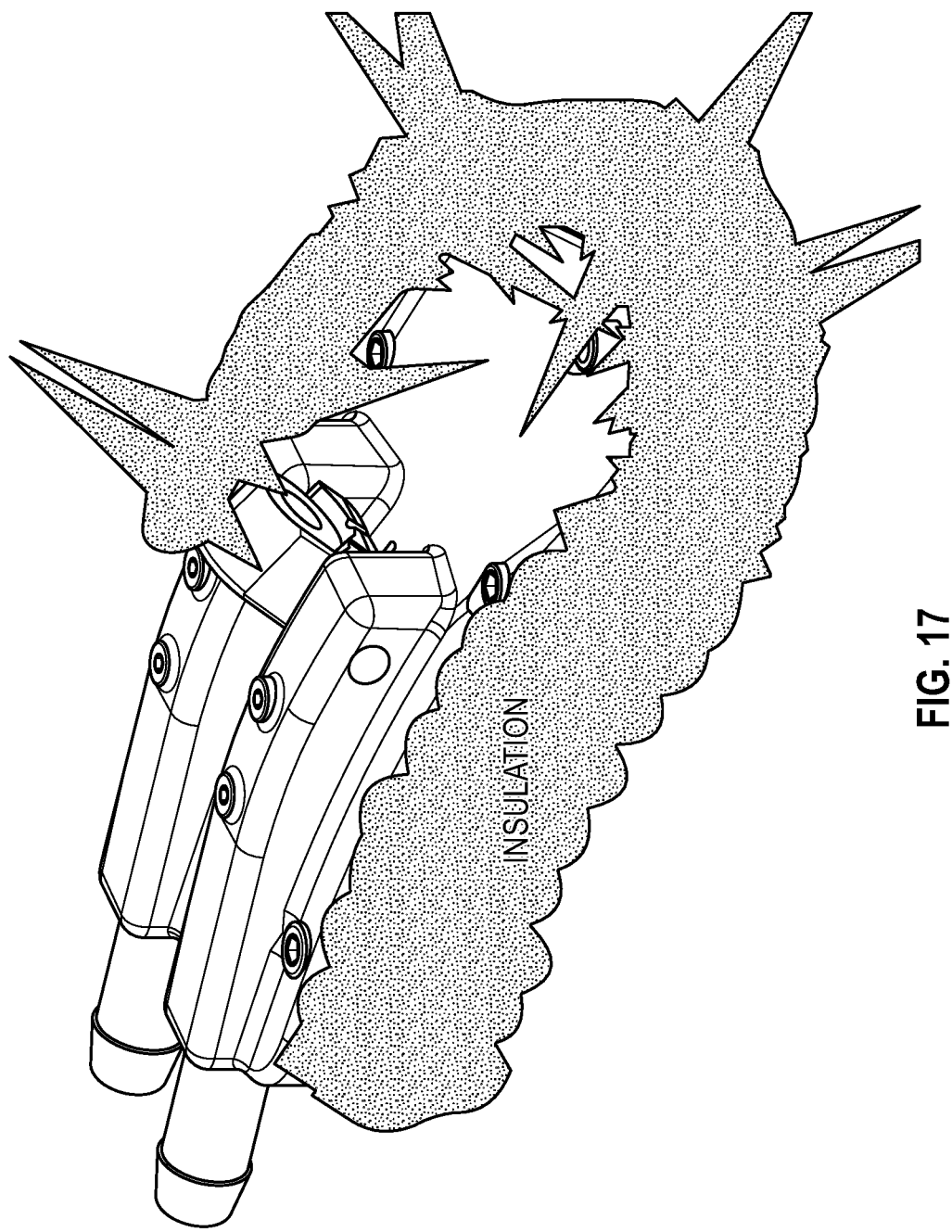
FIG. 17 is an example of an applicator with insulation.

FIG. 17 illustrates one embodiment of an applicator with insulation. The thermal insulation can surround the applicator and can be designed to prevent the cryoablation of tissues that are to be preserved (i.e., non-target tissues). The insulation can be designed and configured to keep tissues that are in contact at or above +20 deg C. even when the applicator is at cold temperatures, such as −30 deg C. The thermal insulator may cover the sides as well as the top surface of the applicator, but must not physically damage the tissues that come in contact with the insulation. In some examples, the insulation is solid or a structure with void spaces. The insulator may be plastic, or may be open or closed cell foam. The insulator can be a void filled with gas or vacuum.

Figure 18:
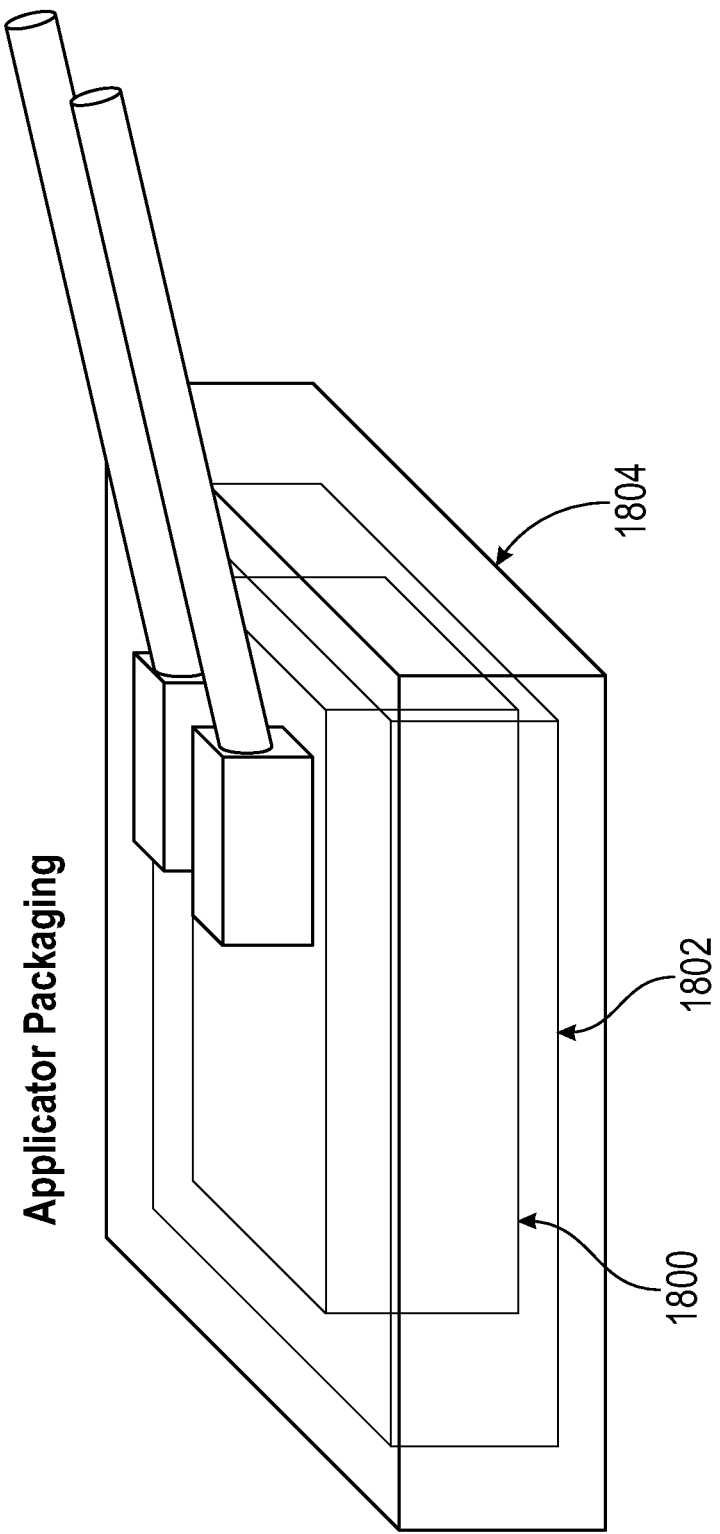
FIG. 18 is an embodiment showing on example of applicator packaging.

FIG. 18 is an embodiment showing one example of applicator packaging. The applicator 1800 can be surrounded by a thermal insulator 1802 covering all surfaces except for the bottom (e.g., tissue contacting) surface. A cryoprotectant combination 1804, including a cryoprotectant agent and a sheet, can cover all surfaces of the applicator including the bottom surface. The sheet can be, for example, soaked in cryoprotectant that is attached to the applicator.

Figure 19:
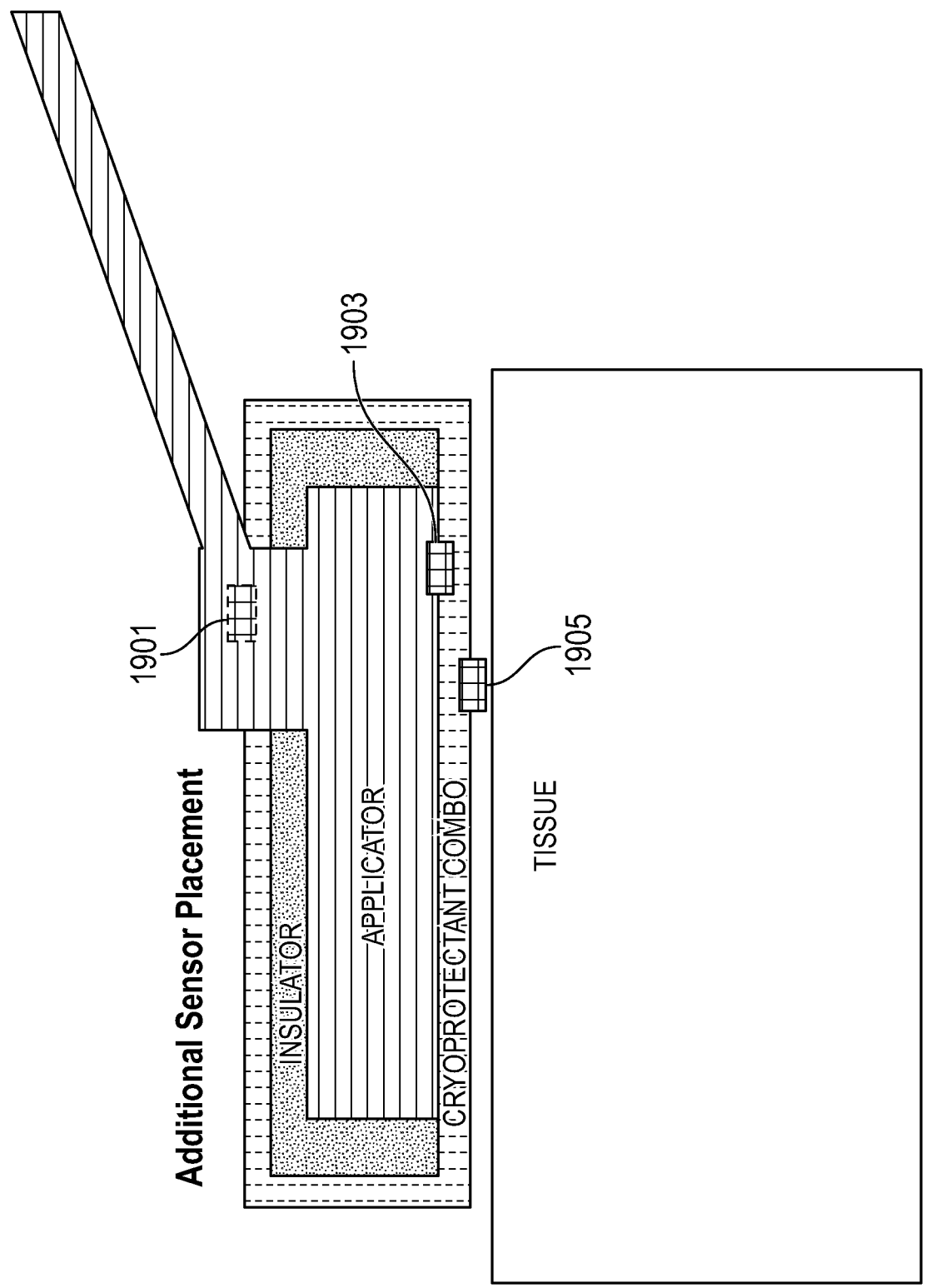
FIG. 19 is an embodiment of an applicator with additional sensor placements.

FIG. 19 is an embodiment of an applicator with additional sensor placements. Referring to FIG. 19, these sensors may be placed in a way for non-invasive measures. These additional sensors may consist of pressure, fluid flow, contact, electrical impedance, temperature sensors, etc. For example, the applicator can include an inline fluid temperature sensor 1901, an applicator surface temperature sensor 1903, and a tissue interface temperature sensor 1905. In other examples, pressure sensors may be utilized to monitor fluid pressure at different locations to detect leaks and system anomalies, or to monitor the force and pressure that the applicator is putting on the tissue. Referring to FIG. 19, these sensors may also be placed in a way by invasive means. In one embodiment, the applicator can include a temperature sensor to monitor the tissue temperature by penetrating into the tissue, under the applicator. For example, a nitinol needle could be flat on the applicator during placement, but when a temperature change occurs, the needle changes shape and penetrates into the tissue to allow temperature measurements at a predetermined depth.

Figure 28:
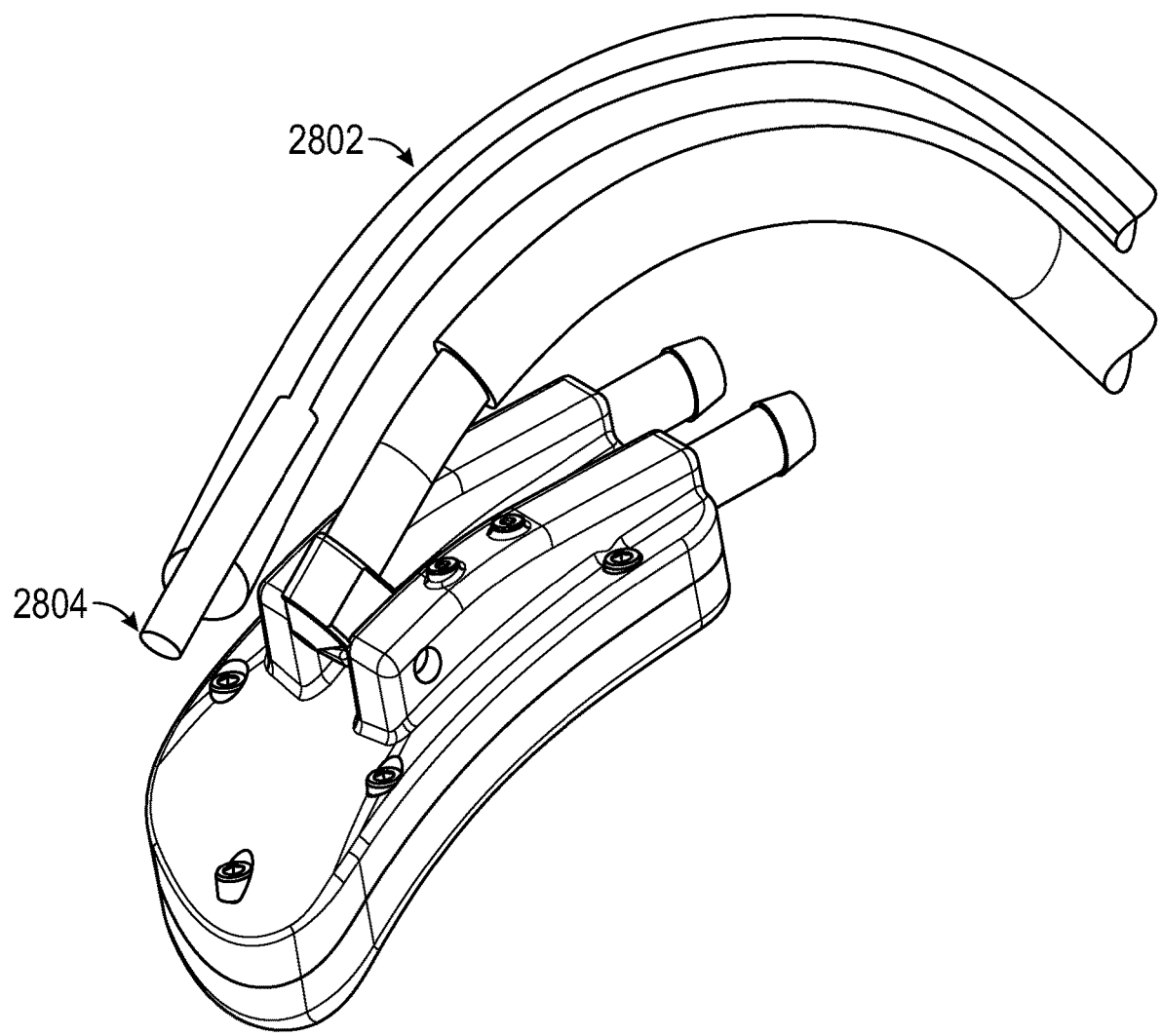
FIG. 28 illustrates an additional method of visualization that can be used during the placement of the applicator.

Guidance systems can provide additional aid with proper placement of the applicator and treatment for the patient. These guidance systems may include MRI imaging, ultrasound imaging, and electrical impedance tomography (EIT). In one example, MRI imaging or ultrasound imaging of the patient before treatment can provide patient anatomy, utilized as a guide for applicator placement. Motor actuators may also be included based off of this imaging for aid with position the applicator. Further utilization of these devices will be discussed in more detail below. FIG. 28 illustrates an additional method of visualization that can be used during the placement of the applicator. In addition to the applicator and the arm that are introduced into the oral cavity, a sheath 2802 may also placed for the passage of an optical instrument 2804, which can be a camera or an endoscope. The sheath may be separate or attached to the arm of the device. The optical device that is introduced through the sheath can be used during the placement of the applicator to assure that the applicator is in the desired location and contact area is limited to the target zone, and no other structures, such as the epiglottis or the uvula, are going to be exposed to cryo temperatures.

Figure 20:
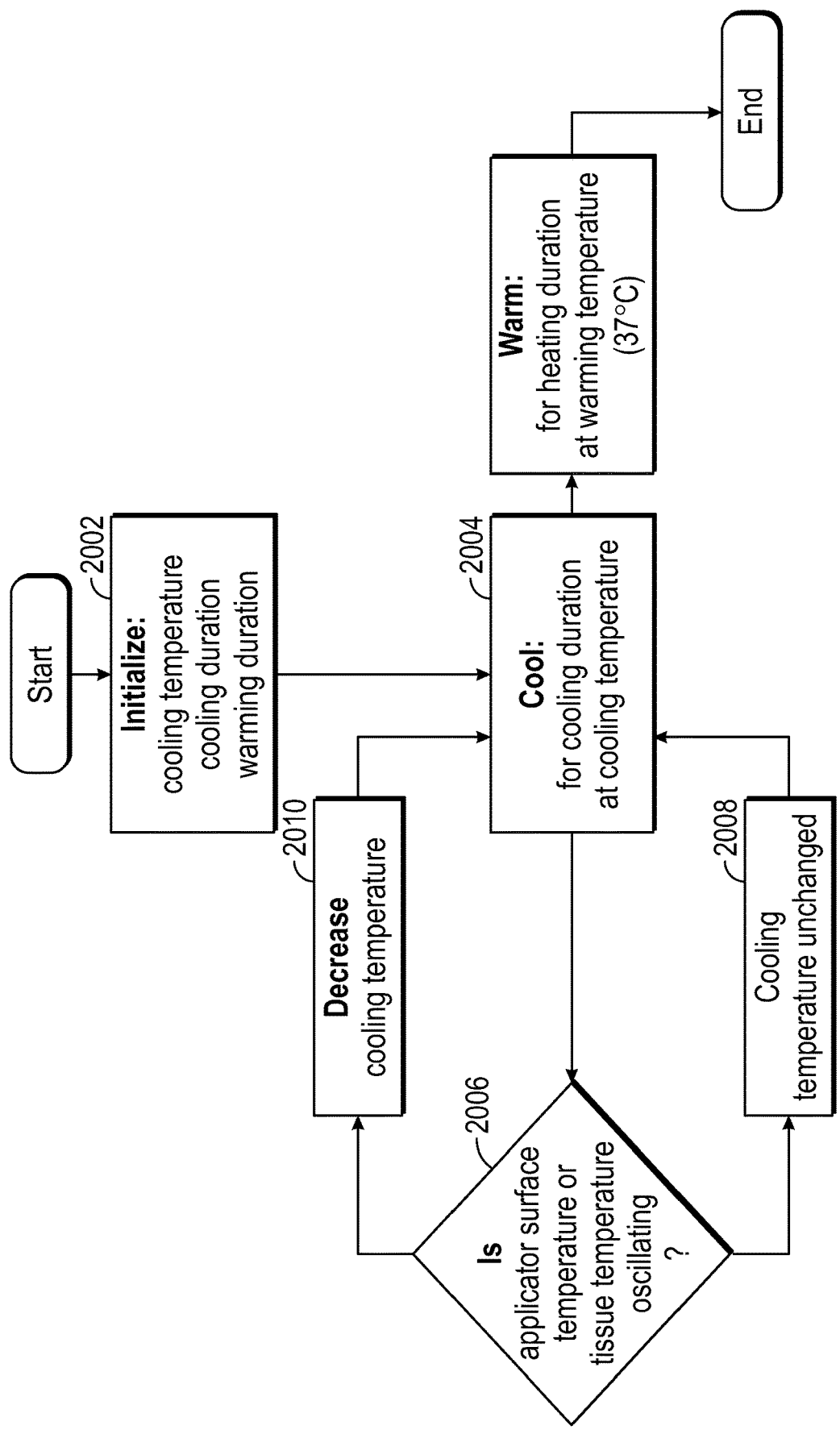
FIG. 20 illustrates a control algorithm flowchart.

FIG. 20 illustrates a control algorithm flowchart, according to one embodiment. When the algorithm begins, at step 2002, the treatment system can initialize the cooling temperature, the cooling duration, and the heating duration of the applicator. The system can then apply the cooling to the tissue for the cooling duration at the cooling temperature at step 2004. During the application of cooling, at step 2006, temperature sensors disposed at the surface of the applicator can measure the temperature and be used by a controller to determine if the surface or tissue temperature is oscillating or changing. If not, then the cooling temperature is not changed at step 2008. If, however, the surface or tissue temperature is changing, the cooling temp can be appropriately adjusted at step 2010. After the application of cooling for the cooling duration, at step 2012, the applicator can be warmed at the warming temperature for the heating duration. Then the treatment process is ended.

Figure 21A:
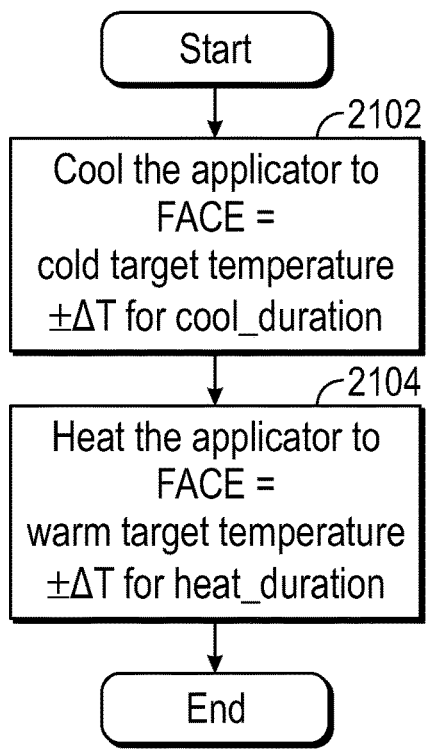
FIGS. 21A-21G illustrate various feedback algorithms for the control system.

Multiple sensory feedback systems and control algorithms can be combined to further enhance the safety and efficacy of treatments. FIG. 21A-G illustrates multiple embodiments of a control algorithm flowchart during the initialization, cooling, and warming processes, in which the controller can perform different feedback algorithm operations, or none at all. The embodiment of FIG. 21A provides no sensory feedback from the tissue. The treatment is initialized by a predetermined and fixed cooling duration at step 2102, denoted Cool_Duration, in which the system cools the applicator face for a predetermined and fixed amount of time, reaching a desired cooling temperature. After the cooling process is complete, at step 2104, the system similarly warms the applicator face for a predetermined and fixed amount of time (denoted as Heat_Duration), reaching a desired warming temperature. Once reached, the treatment process is ended.

Figure 21B:
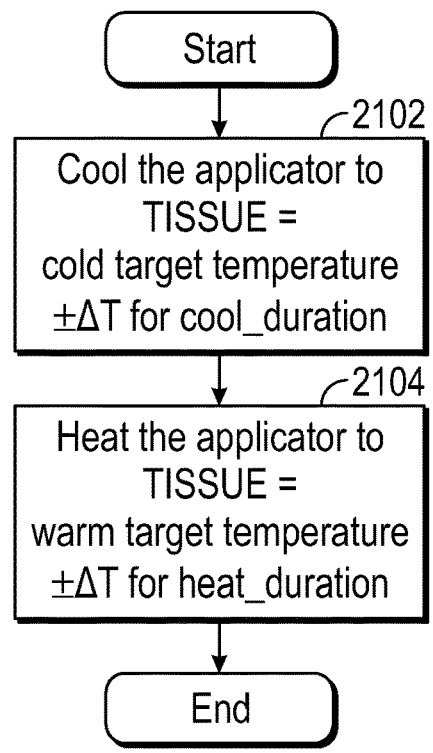

The embodiment of FIG. 21B includes sensory feedback from the surface temperature of the tissue by way of temperature transducers placed at the surface and/or inlet and outlet of the applicator. The treatment is initialized at step 2012 by the cooling duration, in which the system cools the applicator tissue for a predetermined and fixed amount of time, reaching a desired cooling temperature quantized by the temperature transducers. After the cooling process is complete, at step 2104, the system similarly warms the applicator tissue for a predetermined and fixed amount of time. Then the treatment process is ended.

Figure 21C:
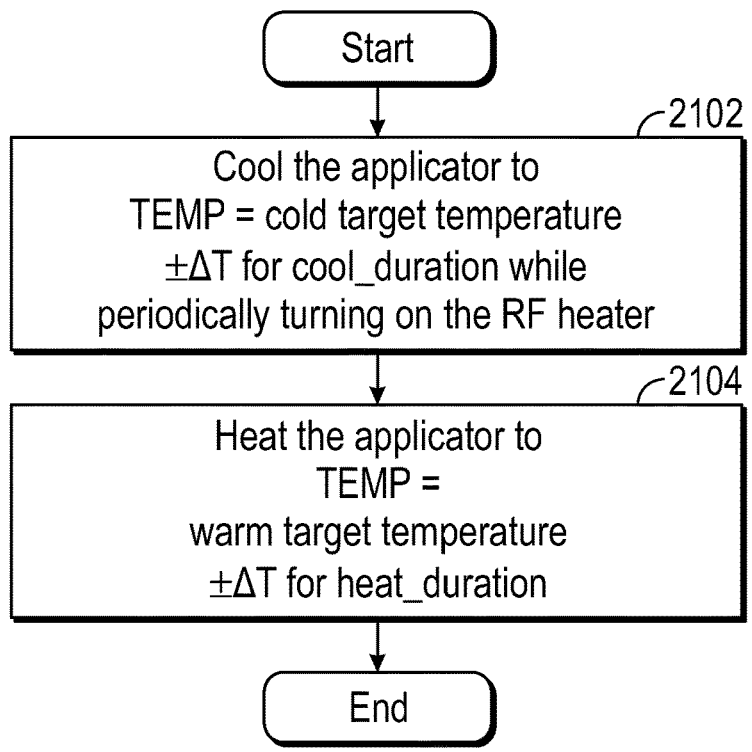

The embodiment of FIG. 21C allows the heating of the shallow tissue with RF heater electrodes attached to the bottom of the applicator to minimize mucosal damage. This embodiment cools the applicator TEMP (in which TEMP can be either the face or tissue temperature) for a predetermined and fixed cooling duration at step 2102 while periodically turning on the RF heater. After the cooling duration is reached, the applicator face or tissue temperature is warmed to a target temperature for the heating duration at step 2104, ending the treatment process.

Figure 21D:
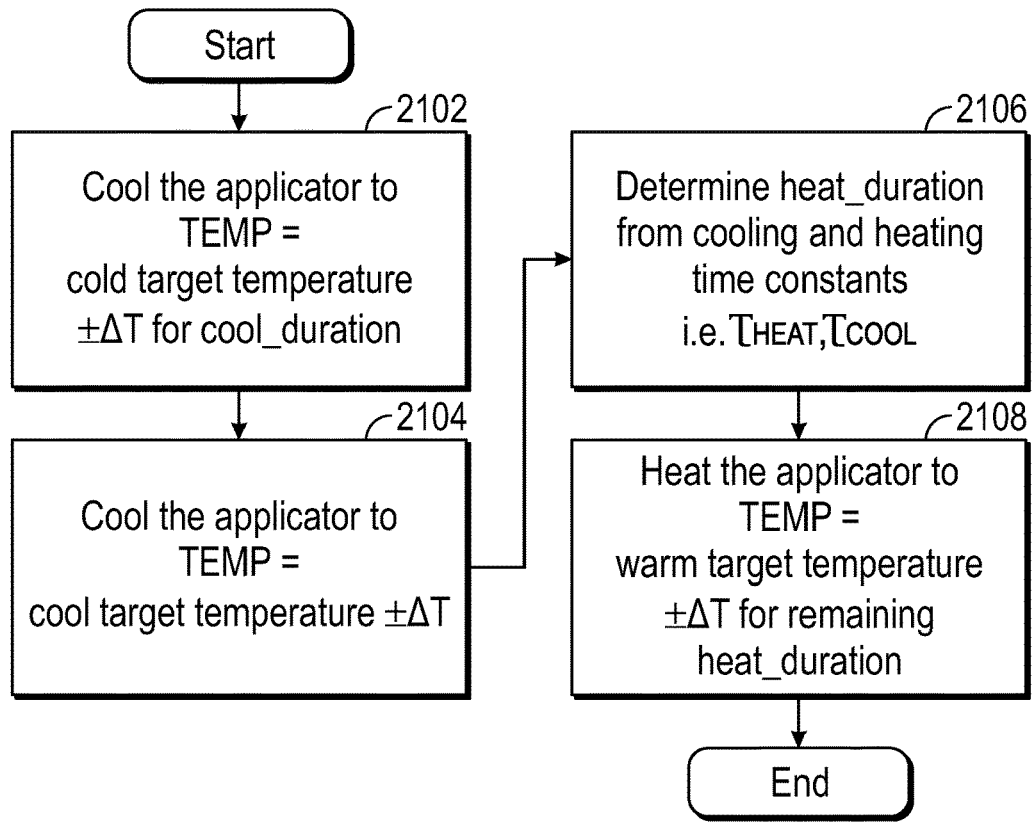

The embodiment of FIG. 21D allows sensory feedback from temperature sensors disposed at the surface and/or inlet and outlet of the applicator to control treatment duration. When the algorithm begins, the system can cool the applicator TEMP a predetermined and fixed cooling duration at step 2102, or alternatively, can cool the applicator TEMP to a target temperature at step 2104. At step 2106, during the application of cooling, temperature sensors can measure the temperature and determine the heat duration from the cooling and heating time constants ($\tau_{HEAT}$, $\tau_{COOL}$) In one example, the heat duration can follow an equation of:

$$\text{Heat\_Duration} = 5 \text{ min.} + 20 * \max(\tau_{HEAT}, \tau_{COOL})$$

Variables of the above equation is determined using the data gathered from the temperature sensor during the heating and cooling phases of the treatment process. At step 2108, the applicator TEMP is then warmed for the calculated heating duration and the treatment process is ended.

Figure 21E:
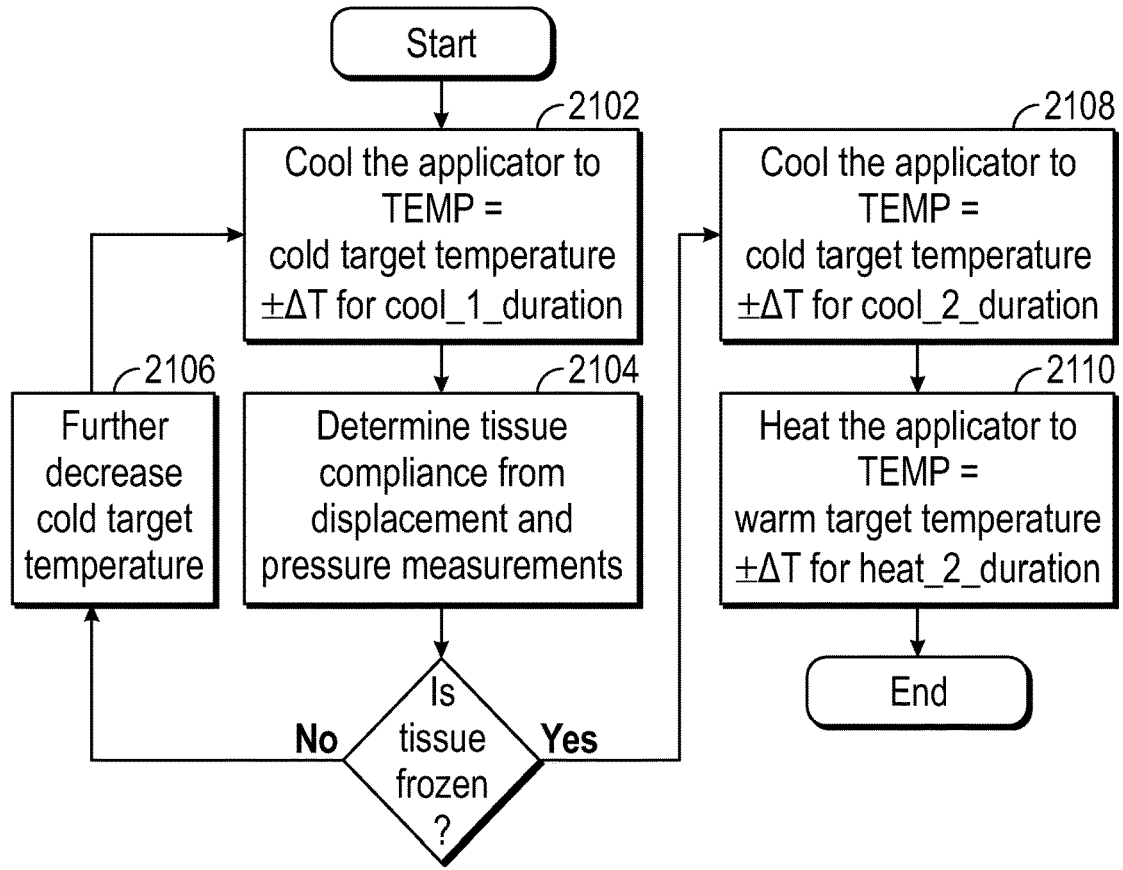

The embodiment of FIG. 21E provides sensory feedback from pressure transducers located on the face of the applicator to determine a proper cooling temperature. At step 2102, the applicator TEMP is cooled to a target temperature for a predetermined first cooling duration, where at step 2104 the force and pressure transducers determine tissue compliance from the given displacement and pressure measurements recorded to determine if ice formation occurred. If the tissue is not frozen after this stage, at step 2106, the cooling target temperature is further decreased and cooled until a frozen state is reached, repeating the same cycle. Once the tissue reaches a frozen stage, at step 2108, the applicator TEMP is cooled to the determined cooling temperature for a predetermined and fixed second cooling duration, in which this second cooling duration may be a different amount of time from the first. After this duration, at step 2110, the applicator TEMP is warmed to the target temperature for the remaining heating duration and the process is ended.

Figure 21F:
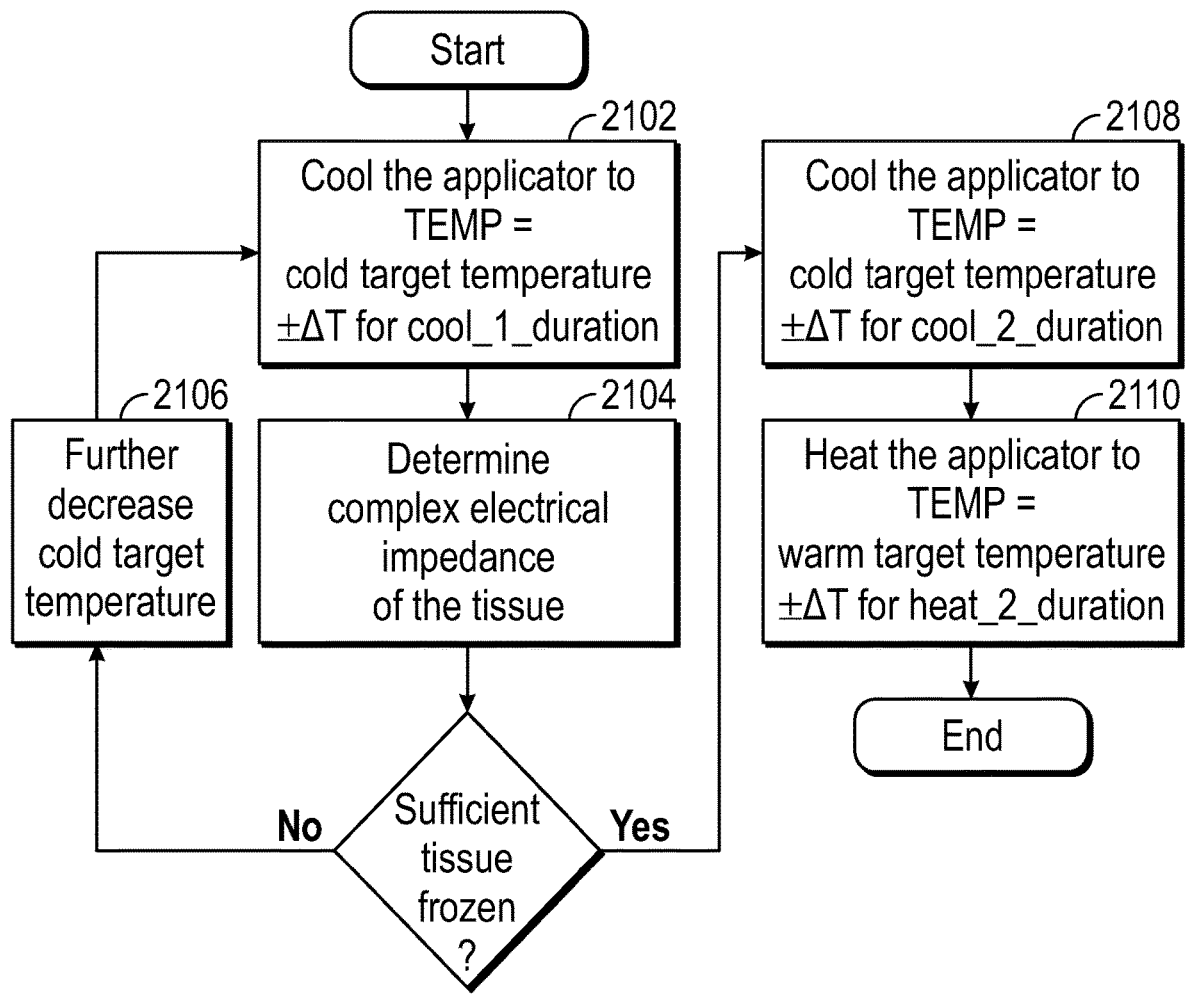

The embodiment of FIG. 21F provides sensory feedback from electrical impedance to determine the frozen tissue size and/or the composition of the tissue underneath the applicator. At step 2102, the applicator TEMP is cooled to a cold target temperature for a predetermined first cooling duration, where after the complex electrical impedance of the tissue is determined at step 2104 by use of electrical impedance sensors, registering the size of frozen sections of the tissue as electrical impedance, giving:

$$Z_{Frozen\ Tissue} \neq Z_{Unfrozen\ Tissue}$$

If the tissue is not frozen after this stage, at step 2106, the cooling target temperature is further decreased and cooled until a frozen stage is reached, repeating the same cycle. Once the tissue reaches a frozen stage, at step 2108, the applicator TEMP is cooled to the determined cooling temperature for a predetermined and fixed second cooling duration, in which this second cooling duration may be a different amount on time from the first. After this duration, at step 2110, the applicator TEMP is warmed to the target temperature for the remaining heating duration and the process is ended.

Figure 21G:
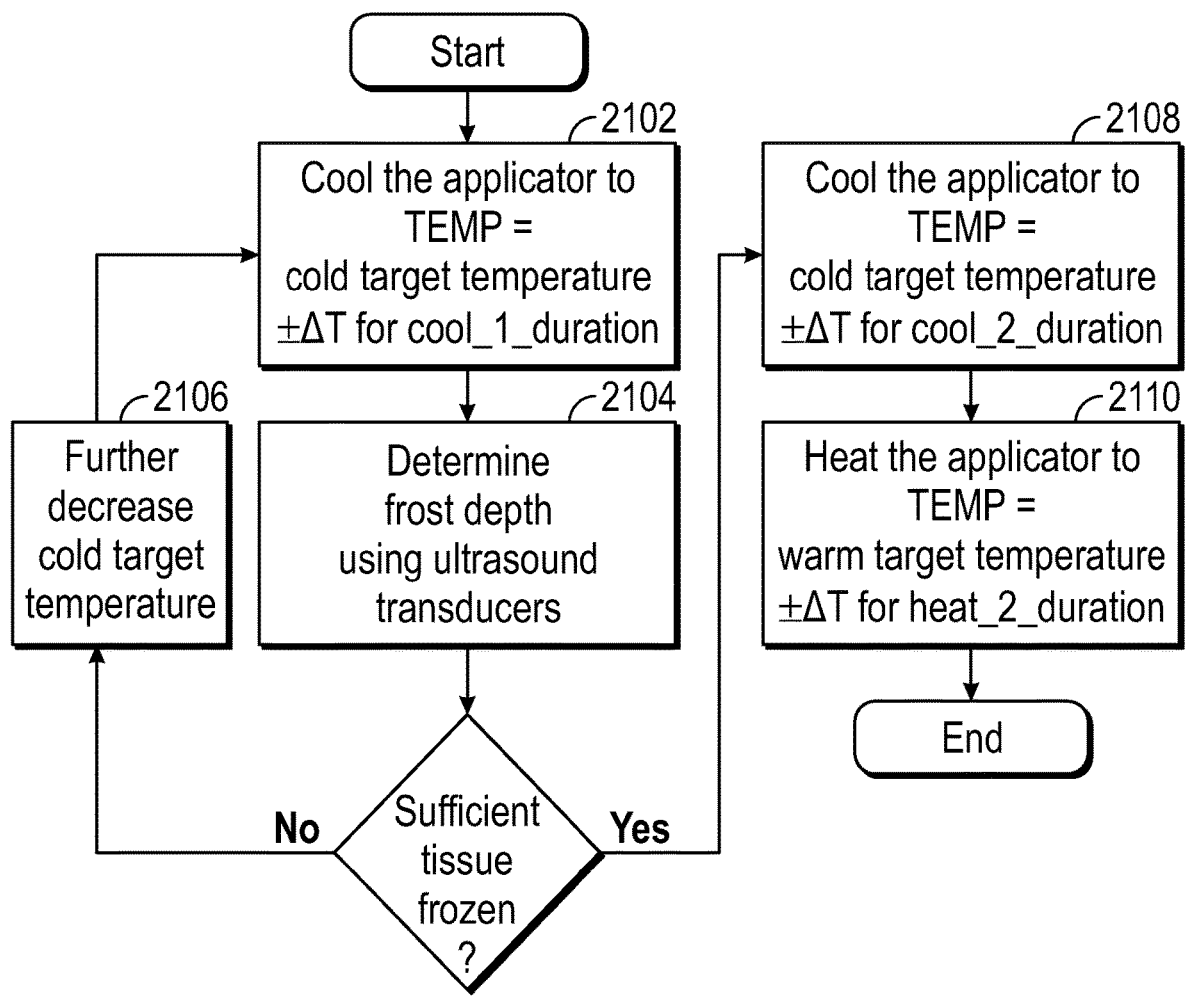

The embodiment of FIG. 21G provides sensory feedback from ultrasound transducers located on the applicator face to determine frozen tissue size. At step 2102, the applicator TEMP is cooled to a cold target temperature for a predetermined first cooling duration, where the frost depth is determined at step 2104 by the use of an ultrasound transducer by way of boundary reflection between frozen (solid) and unfrozen (soft) tissue. If a sufficient amount of tissue is not frozen after this stage, the cooling target temperature is further decreased at step 2106 and cooled until a sufficient size is attained, repeating the same cycle. Once the tissue reaches a frozen stage, at step 2108, the applicator TEMP is cooled to the determined cooling temperature for a predetermined and fixed second cooling duration, in which this second cooling duration may be a different amount of time from the first. After this duration, at step 2110, the applicator TEMP is warmed to the target temperature for the remaining heating duration and the process is ended. The embodiments of FIGS. 21B-G are not mutually exclusive and the current invention may employ all or none of the feedback algorithms described above.

Figure 22:
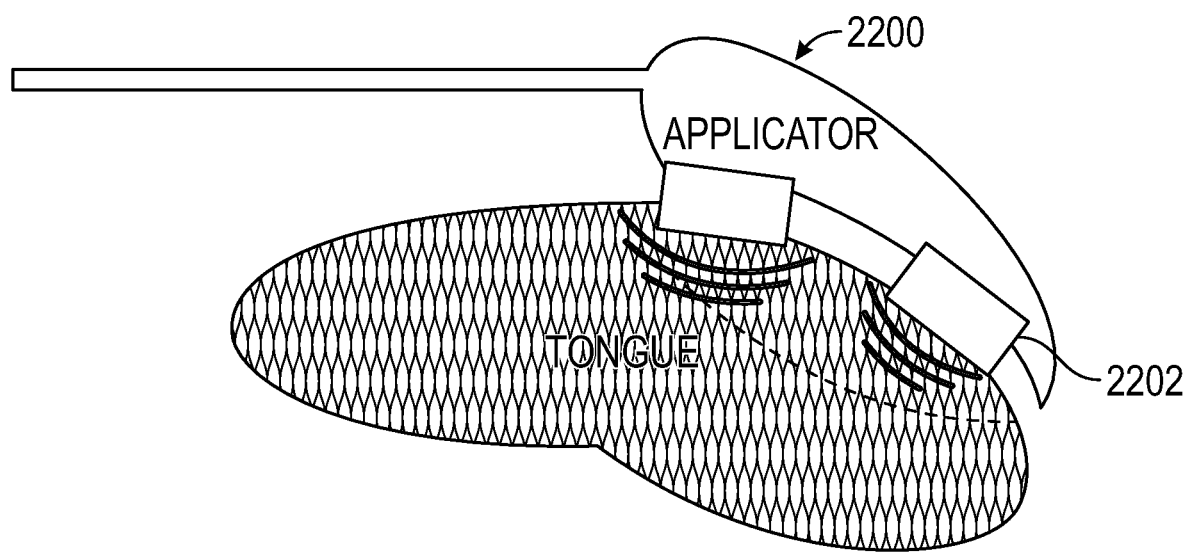
FIG. 22 illustrates an embodiment of an RF heater attached to the applicator for control regulation.

FIG. 22 depicts one physical installment of the sensory feedback system with an applicator 2200 utilizing one or more RF heaters 2202. The RF heater may be used for periodic heating of the tissue under the applicator to reduce frost bite damage. For example, the tissue that is 4-5 mm deep may be over cooled and could be beyond the reach of the cryoprotectant agent, in which a RF heater would be needed. In some embodiments, cooling therapy can be applied to the tissue for a fixed period of time, and then the RF heaters may be activated to warm up the tissues. In some embodiments, the RF heaters are used to warm tissues at a target depth (e.g., 4-5 mm deep) for a second fixed period of time. The cooling and heating steps can then be repeated until a total desired amount of cooling is applied to the target tissues.

Utilization of these feedback mechanisms described herein allows the possibility of fully automated control systems. For example, the controller may pick initial treatment parameters, such as the power to apply to start the cooling, based on population parameters, and then switch to custom values based on the patient's specific information; such as the rate of cooling per Watt. In other examples, the controller may utilize a parameter estimator. In the most advanced installment, the controller may extract information from the sensor data, and if allowed by the operator, the controller individualizes the treatment to patient, by calculating cooling energy, estimating the overall system time constant (including chiller, pump, applicator, tissue and human body) and works as a PID controller. In response to unwanted outcomes, such as oscillations in temperature control or discontinuities, the system may also make needed changes to provide proper treatment to the patient. For example, if oscillations are observed in the time vs. temperature traces, the system could respond by decreasing the applicator pressure to suppress the oscillations. In response to discontinuities caused by unknown factors, the system may interpret then based on previous observations/outcomes from other patients and adjust treatment accordingly. Having a fully automated control system is also beneficial in the case of a physical or system error, in which the system can detect the error and issue a warning or stop treatment if, for example, a leak is detected.

Figure 23:
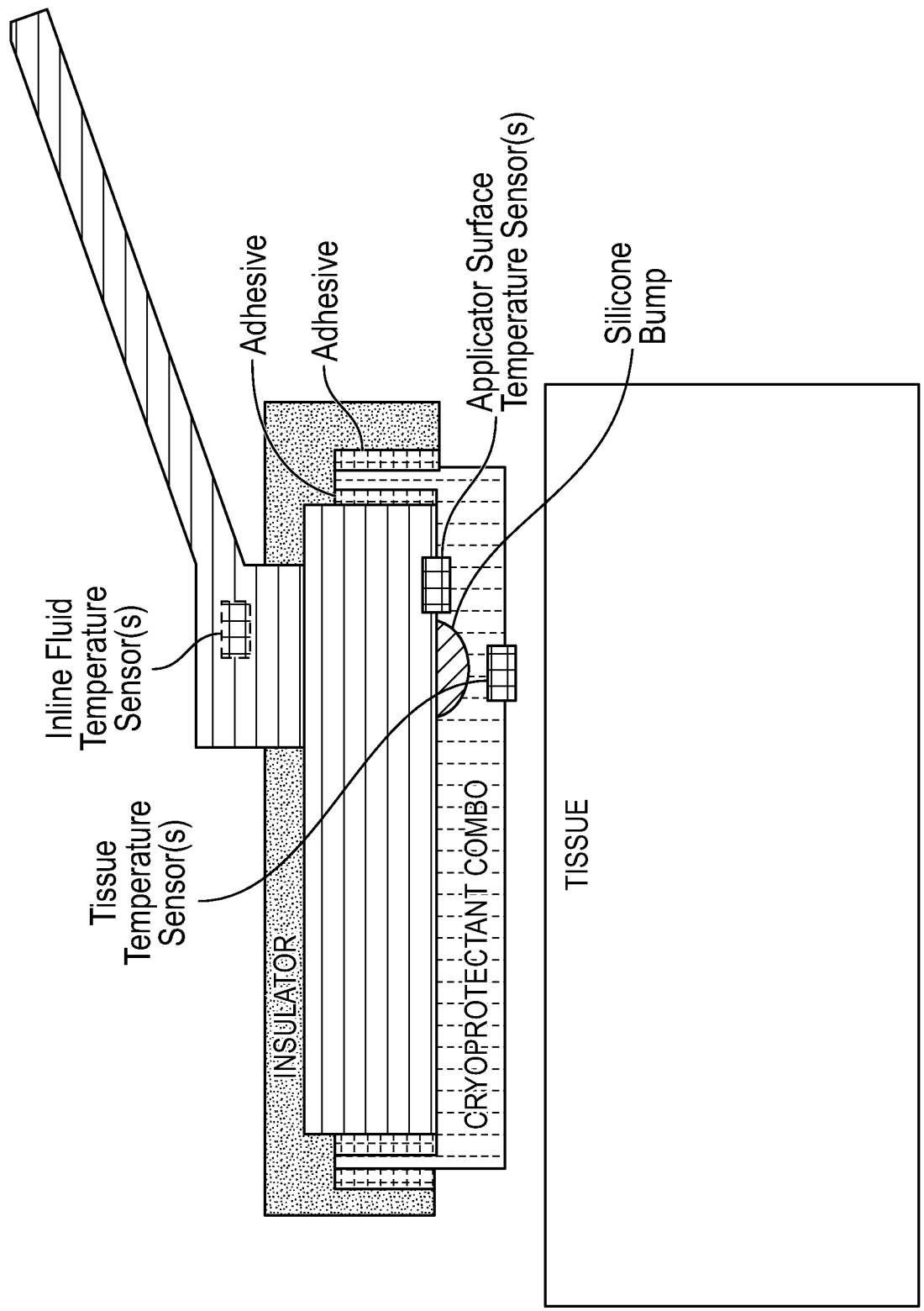
FIG. 23 illustrates an alternative embodiment of the applicator.

FIG. 23 shows an alternate embodiment of an applicator. When compared to the embodiment that is shown in FIG. 18, one can notice that the embodiment that is shown in FIG. 23 differs from that of FIG. 18 that the cryoprotectant combination is placed around the metal part of the applicator, instead of going around the insulator. Pairs of adhesive sheets can be used between the metal applicator and the cryoprotectant combination, and in between the cryoprotectant combination and the insulation. The advantage of the embodiment that is shown in FIG. 18 is the ease of manufacturing and higher reliability of the finished product.

The applicator should be placed in the correct position in the mouth of the patient for the optimal treatment efficacy, which is generally the most superior and posterior section of the tongue. Since that region falls in the back of the tongue, it tends to be difficult to verify that the applicator has been placed appropriately. In some embodiments, the systems and methods can include optical and fluoroscopy-based methods to address this problem, which will be described next.

Figure 24:
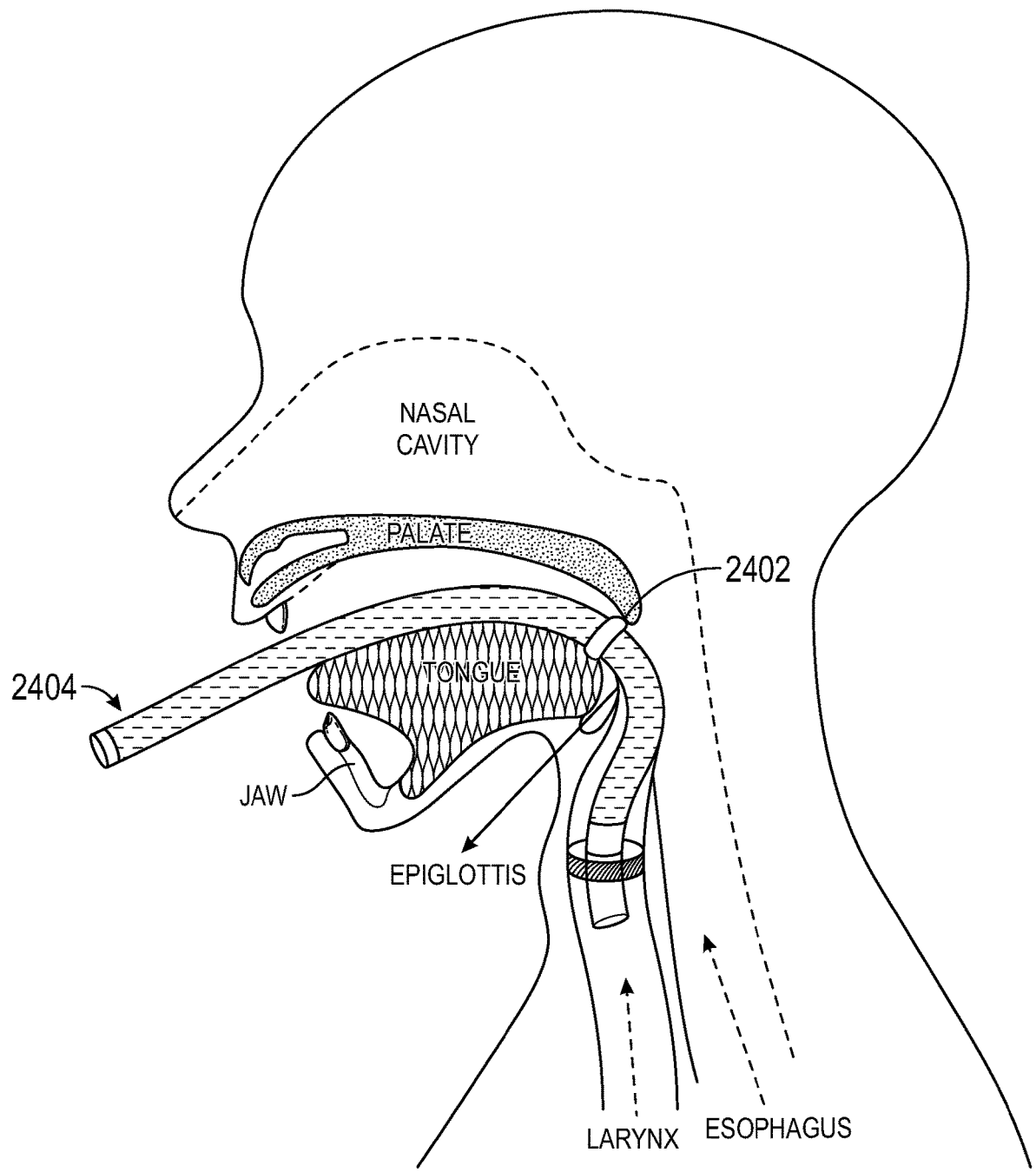
FIG. 24 illustrates a fluoroscopy-based visualization aid that can be used during the introduction of the applicator.

FIG. 24 shows a fluoroscopy-based solution for the placement of the applicator in the mouth. For that, a radio opaque ring 2402 can be placed over a trachea tube 2404 and the ring can be pushed to position near the epiglottis. Later on, the applicator can be placed in the mouth, under fluoroscopy guidance to place the applicator near or adjacent to the radio opaque ring 2402.

Figure 25:
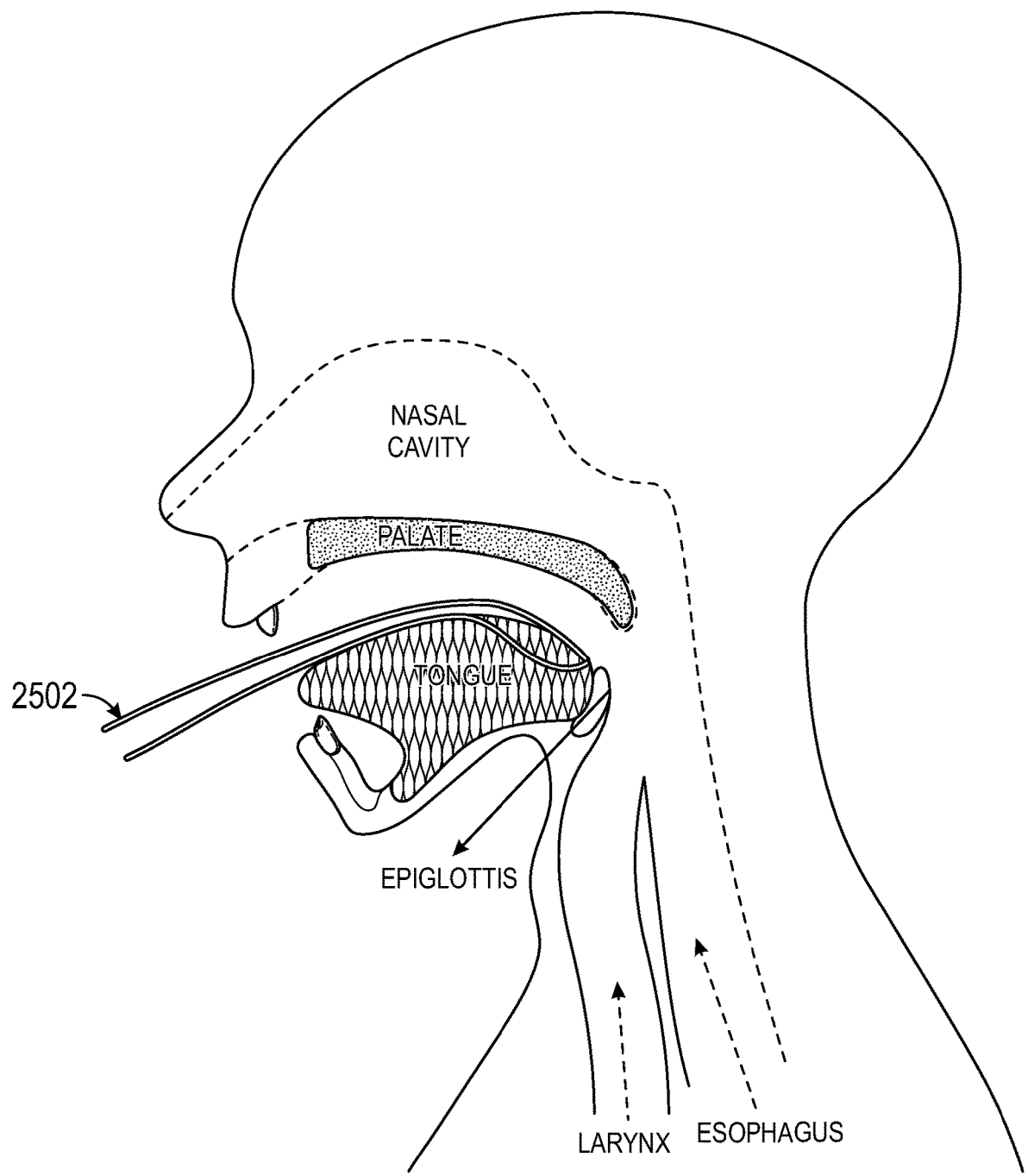
FIG. 25 illustrates another fluoroscopy-based visualization aid that can be used during the introduction of the applicator.

FIG. 25 shows another fluoroscopy-based solution for the placement of the applicator in the mouth. For that, a radio opaque frame 2502, such a steel wire, is pre-bent and placed over the tongue by pushing it all the way to the back, assuring that the distal end of the wire frame is in the vallecula. Later on, the applicator is placed in the mouth, under fluoroscopy guidance to place the applicator in the appropriate position relative to the radio opaque frame.

Figure 26:
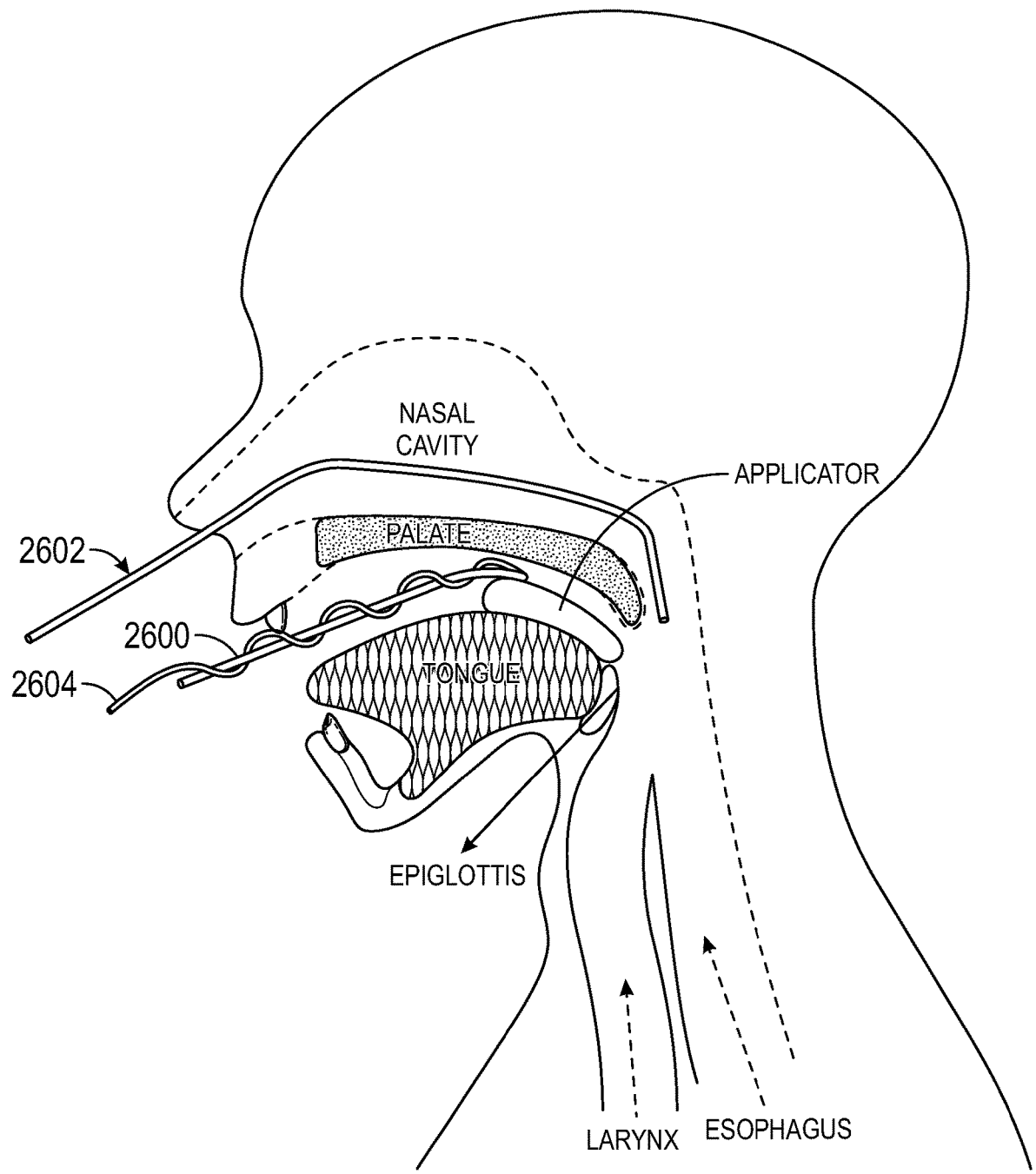
FIG. 26 illustrates an optical visualization aid that can be used during the introduction of the applicator.

FIG. 26 shows another solution placing the applicator under visualization. For that, a nasal endoscope 2602 is advanced, either through the nasal passageway, or within the oral cavity. FIG. 26 shows the path of the endoscope for a nasal passage. The applicator 2600 can then be placed in position using visual guidance from the endoscope. FIG. 26 also shows an optional enhancement where a fiber optic wand 2604 can be used for the illumination of the outer frame of the applicator. Self-illumination of the applicator allows it to be easily recognized even when it is submerged under a pool of saliva and/or cryoprotectant fluid.

Figure 27:
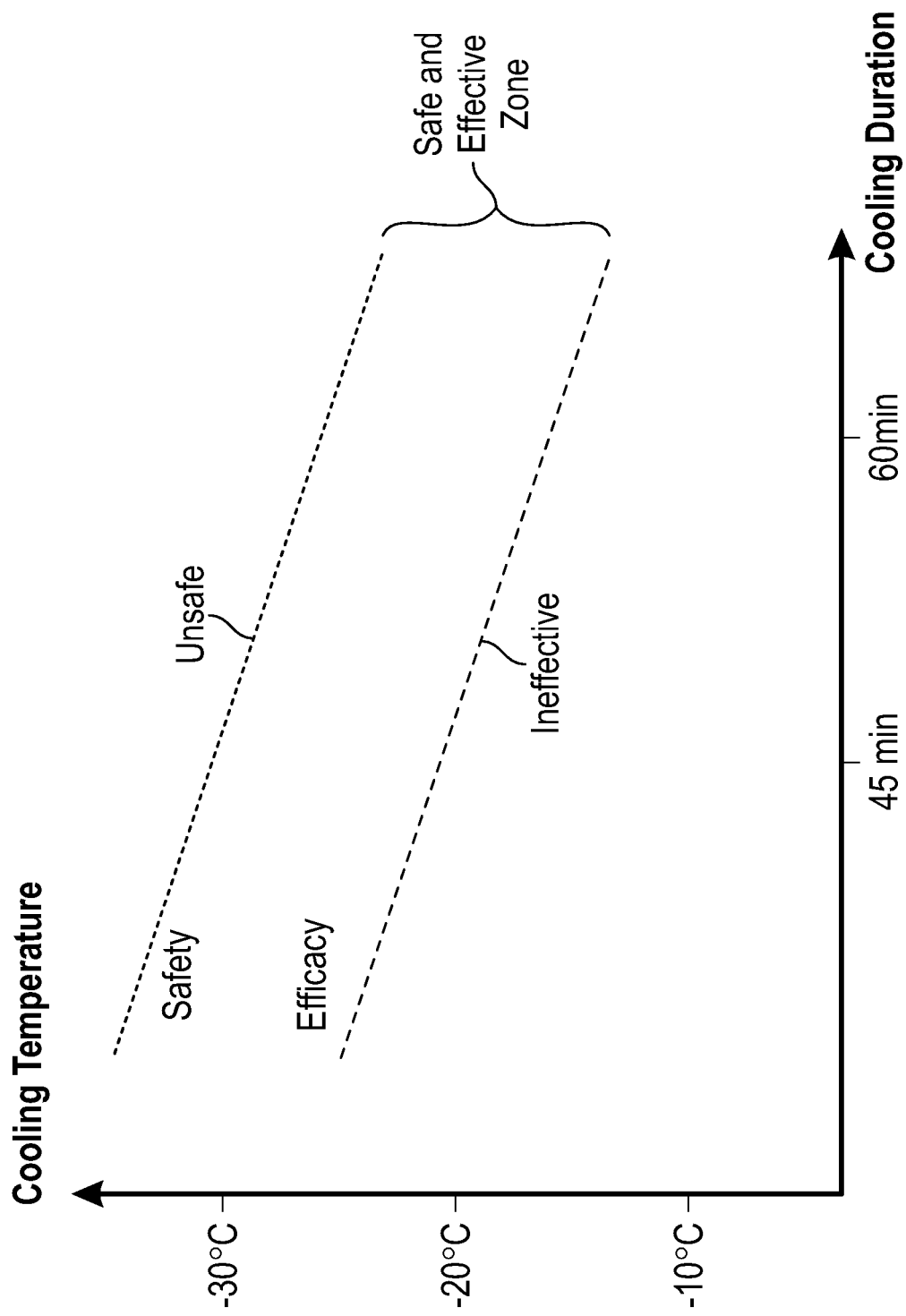
FIG. 27 illustrates the strength duration curves for the safety and efficacy of the therapy.

FIG. 27 shows a typical strength—duration curve for the therapy as a function of the therapy duration and therapy temperature. Below the efficacy line shown as a dashed line, therapy is ineffective since either the temperatures are not cold enough or the treatment is not long enough to cause cryolysis. Above the safety line shown as a dotted line, there is a potential for damage to the mucosa or the epithelium. Hence, it is preferable that the treatment parameters be chosen such that they fall within the safe and effective zone.

It is to be understood that although the above description of the applicator is based on its use on tongue tissue, nothing in the description prevents its use on the fat containing tissues including but not limited to the oropharynx, soft palate and the hard palate, the uvula, the lateral pharyngeal wall, or the lingual tonsils. Furthermore, various kinds of applicators, including but not limited to the surface contact type, penetrating type, multi-segment type and balloon type can be designed and used on one or more of the fat containing tissues as listed above.

The various illustrative embodiments of devices, systems, and methods described herein are not intended to be limited to the particular forms disclosed. Rather, they include all modifications and alternatives falling within the scope of the claims.

The various illustrative embodiments of devices, systems, and methods described herein are not intended to be limited to the particular forms disclosed. Rather, they include all modifications and alternatives falling within the scope of the claims. The claims are not intended to include, and should not be interpreted to include, means-plus- or step-plus- function limitations, unless such a limitation is explicitly recited in a given claim using the phrase(s) "means for" or "step for," respectively.

What is claimed is:

1. A device configured for treatment of obstructive sleep apnea, comprising:
   an applicator configured to receive a circulating fluid from a temperature determinant, the applicator being sized and configured to contact an oropharyngeal tissue and including—
      a bottom half having a tissue contacting surface and a temperature sensor positioned at the tissue contacting surface, and
      a top half coupled to the bottom half and having one or more leads coupled to the temperature sensor, wherein the one or more leads extend from the bottom half of the applicator to the temperature sensor;
   a fixture arm configured to be coupled to the applicator and adjust the applicator with respect to a positioning of the tissue contacting surface, the fixture arm including an electrical circuit electrically coupled to the temperature sensor; and
   a controller configured to facilitate heat transfer between the applicator and the circulating fluid.

2. The device of claim 1, further comprising open foam insulation disposed on all surfaces of the applicator that are not intended to come in contact with tissue.

3. The device of claim 1, further comprising closed foam insulation disposed on all surfaces of the applicator that are not intended to come in contact with tissue.

4. The device of claim 1, further comprising a cryoprotectant sheet disposed on the tissue contacting surface of the applicator.

5. The device of claim 1, wherein the applicator comprises an insulator disposed on all surfaces of the applicator that are not intended to come into contact with tissue, the applicator further comprising a cryoprotectant sheet that covers the applicator including the insulator.

6. The device of claim 1, further comprising a first temperature sensor disposed on a fluid inlet of the applicator, a second temperature sensor disposed on a fluid outlet of the applicator, a third temperature sensor disposed on the tissue contacting surface of the applicator, and a fourth temperature sensor disposed on or in a cryoprotectant sheet of the applicator.

7. The device of claim 1, further comprising one or more passages disposed within or on the applicator for the one or more leads.

8. The device of claim 1, wherein the fixture arm is configured to apply a predetermined force from the tissue contacting surface of the applicator to the oropharyngeal tissue.

9. The device of claim 1, wherein the applicator includes (i) one or more fluid channels for the circulating fluid to flow through the applicator and (ii) one or more passages for the one or more leads to extend from the bottom half of the applicator to the temperature sensor.

10. The device of claim 1, wherein the applicator includes (i) one or more fluid channels for the circulating fluid to flow through the applicator, and (ii) one or more passages for the one or more leads to extend from the bottom half of the applicator to the temperature sensor, wherein the one or more passages are distinct from the one or more fluid channels.

11. The device of claim 1, wherein the fixture arm includes a flex circuit electrically coupled to the temperature sensor and incorporated into the fixture arm.

12. A device for treatment of obstructive sleep apnea, the device comprising:
   an applicator configured to receive a circulating fluid from a temperature determinant, the applicator being sized and configured to contact an oropharyngeal tissue and including—
      a bottom half having a tissue contacting surface and a temperature sensor positioned at the tissue contacting surface, and
      a top half coupled to the bottom half and having one or more leads coupled to the temperature sensor, wherein the one or more leads extend from the bottom half of the applicator to the temperature sensor;
   a fixture arm configured to be coupled to the applicator and adjust the applicator with respect to a positioning of the tissue contacting surface;
   a feedback system operably coupled to the temperature sensor and configured to monitor one or more temperature measurements at the tissue contacting surface; and
   a controller configured to facilitate heat transfer between the applicator and the circulating fluid based on the feedback system.

13. The device of claim 12, wherein the controller is configured to adjust a temperature of the circulating fluid and a treatment duration based on the one or more temperature measurements from the set of temperature sensors.

14. The device of claim 12, wherein the one or more temperature measurements comprise a morphology that includes time constants, discontinuities, rate of change, area under a curve, or oscillations.

15. The device of claim 12, wherein the bottom half of the applicator has a at least one pressure sensor positioned at the tissue contacting surface, and the one or more leads are coupled to the at least one pressure sensor, and wherein the feedback system is operably coupled to the at least one pressure sensor and configured to monitor one or more pressure measurements at the tissue contacting surface.

16. The device of claim 12, wherein the fixture arm is coupled to the applicator at an attachment point and wherein the attachment point is positioned on the top half of the applicator such that a force applied to the fixture arm is distributed uniformly by the tissue contacting surface over the oropharyngeal tissue.

17. The device of claim 12, wherein the fixture arm is coupled to the applicator at an attachment point, and wherein the attachment point is a gimbal-type attachment.

18. A device configured for treatment of obstructive sleep apnea, comprising:
- an applicator configured to receive a circulating fluid from a temperature determinant, the applicator being sized and configured to contact an oropharyngeal tissue and including—
  - a bottom portion having a tissue contacting surface and a temperature sensor positioned at the tissue contacting surface, and
  - a top portion coupled to the bottom portion and having one or more leads coupled to the temperature sensor, wherein the one or more leads extend from the bottom portion of the applicator toward the temperature sensor; and
- a fixture arm configured to be coupled to the applicator and adjust the applicator with respect to a positioning of the tissue contacting surface.

* * * * *